United States Patent
Brown et al.

(10) Patent No.: US 11,640,465 B2
(45) Date of Patent: May 2, 2023

(54) METHODS AND SYSTEMS FOR TROUBLESHOOTING APPLICATIONS USING STREAMING ANOMALY DETECTION

(71) Applicant: VMware, Inc., Palo Alto, CA (US)

(72) Inventors: Darren Brown, Seattle, WA (US); Paul Pedersen, Palo Alto, CA (US); Keshav Mathur, Palo Alto, CA (US); Junyuan Lin, Bellevue, WA (US); Nicholas Kushmerick, Seattle, WA (US); Jinyi Lu, Palo Alto, CA (US); Xing Wang, Palo Alto, CA (US); Peng Gao, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 430 days.

(21) Appl. No.: 16/682,549

(22) Filed: Nov. 13, 2019

(65) Prior Publication Data

US 2021/0141900 A1  May 13, 2021

(51) Int. Cl.
*G06F 21/00* (2013.01)
*G06F 21/56* (2013.01)

(52) U.S. Cl.
CPC ...... *G06F 21/566* (2013.01); *G06F 2221/033* (2013.01)

(58) Field of Classification Search
CPC ............ G06F 21/566; G06F 2221/033; G06F 21/57
See application file for complete search history.

(56) References Cited

U.S. PATENT DOCUMENTS

| | | | |
|---|---|---|---|
| 2007/0143851 A1* | 6/2007 | Nicodemus | G06F 21/577 726/25 |
| 2014/0108640 A1* | 4/2014 | Mathis | H04L 63/1425 709/224 |
| 2014/0237595 A1* | 8/2014 | Sridhara | G06F 21/55 726/23 |
| 2016/0110549 A1* | 4/2016 | Schmitt | G06F 8/43 726/25 |
| 2017/0063888 A1* | 3/2017 | Muddu | H04L 63/1441 |
| 2018/0278647 A1* | 9/2018 | Gabaev | H04L 63/1425 |
| 2019/0124099 A1* | 4/2019 | Matselyukh | G06F 21/566 |
| 2019/0332769 A1* | 10/2019 | Fralick | G06F 21/554 |

* cited by examiner

Primary Examiner — Tri M Tran

(57) ABSTRACT

Computational methods and systems for detecting and troubleshooting anomalous behavior in distributed applications executing in a distributed computing system are described herein. Methods and systems discover nodes comprising the application. Anomaly detection monitors the metrics associated with the nodes for anomalous behavior in order to identify an approximate point in time when anomalous behavior begins to adversely impact performance of the application. Anomaly detection also monitors logs messages associated with the nodes to detect anomalous behavior recorded in the log messages. When anomalous behavior is detected in either the metrics and/or the log messages an alert identifying the anomalous behavior is generated. Troubleshooting guides an administrator and/or application owner to investigate the root cause of the anomalous behavior. Appropriate remedial measures may be determined based on the root cause and automatically or manually executed to correct the problem.

27 Claims, 75 Drawing Sheets

```
log.write([$Time_date] [Thread-$X/$IP/INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[$Time_date] Repair session $RS for range $range finished)
```

FIG. 17

```
[2019-03-10 23:43:36.859+0000] [Thread-1822496/127.0.0.1 INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[2015-03-10 23:43:36,716] Repair session 51312720-c77e-11e4-ad72-4769d614a3f2 for range
(-68999374777723537626, -68965472300766663429) finished]
```

FIG. 18

```
2019-12-02T10:44:24.095Z li-qe-esx5.vmware.com Rhttpproxy:
[28959B90 verbose 'Proxy Req 46691'] Connected to
localhost:8307
```

```
2019-12-02T10:44:24.094Z li-qe-esx5.vmware.com Rhttpproxy:
[FFFC2B90 verbose 'Proxy Req 46691'] new proxy client
TCP (local-127.0.0.1:80, peer=127.0.0.1:50155)
```

```
2019-12-02T10:44:24.093Z li-qe-esx5.vmware.com Rhttpproxy:
[2889B90 verbose 'Proxy Req 46685'] The client closed the
stream, not unexpectedly.
```

```
Dec  2 18:48:29 strata-vc 2019-12-02T18:48:30.273Z
[7FA39448B700 info 'commonvpxLro' opID=1947d6f9]  [VpxLRO] -
FINISH task-internal-2163522 -- -- vim.SessionManager.logout -
```

```
2019-12-02T18:48:51.396Z strata-esx1.eng.vmware.com Vpxa:
[65B5AB90 verbose 'VpxaHalCnxHostagent' opID=WFU-ed393333]
[WaitForUpdatesDone] Completed callback
```

```
2019-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Starting next WaitForUpdates() call to
hostd
```

```
2019-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed
```

```
2019-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed
```

FIG. 19

$$S = \begin{bmatrix} cov(s1, s1) & cov(s1, s2) & \cdots & cov(s1, sP) \\ cov(s2, s1) & cov(s2, s2) & \cdots & cov(s2, sP) \\ \vdots & \vdots & & \vdots \\ cov(sP, s1) & cov(sP, s2) & \cdots & cov(sP, sP) \end{bmatrix}$$

METHODS AND SYSTEMS FOR TROUBLESHOOTING APPLICATIONS USING STREAMING ANOMALY DETECTION

TECHNICAL FIELD

This disclosure is directed to automated methods and systems that troubleshoot anomalous behavior in a distributed computing system.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems, such as data centers, with hundreds of thousands components that provide enormous computational bandwidths and data-storage capacities. These large, distributed computing systems are made possible by advances in computer networking, distributed operating systems and applications, data-storage appliances, computer hardware, and software technologies.

Because modern distributed computing systems have an enormous number of computational resources and run thousands of applications, various management systems have been developed to collect performance information and aid IT administrators and application owners in detection of performance problems. For example, a typical management system collects log messages and streams of metric data. A log messages records an event that occurred in executing an operating system or application. A streams of metric data records processor usage, memory usage, disk storage, network usage or application metric such as error rates, response times, and request rates. However, with the rise in scale and complexity of distributed computing systems, such as large-scale data centers, it is becoming increasingly more challenging for typical management systems to keep up with the increasing volumes of log messages and metric data. Typical management systems use rudimentary rule and threshold-based approaches to detect problems, which are not able to provide meaningful real time insight into when a problem occurred and the source of the problems. Failure to timely respond to a performance problem can prolong interruptions in services and increase costs for data center tenants and application owners. For example, when a data center administrator or application owner is alerted to a problem by a typical management system, the administrator or owner has to sort through vast numbers of log messages and metric data to determine when the problem started and the source of the problem, which delays troubleshooting and execution of remedial measures. IT administrators and application owners seek management systems that detect and troubleshoot performance problems in real time so that IT administrators and application owners have time to assess performance problems and execute remedial measures that are targeted to correcting the problems.

SUMMARY

Computational methods and systems for detecting and troubleshooting anomalous behaving distributed applications executing in a distributed computing system are described herein. When a problem arises in executing a distributed application, the problem typically leaves a trace in the form of changes to streams of metric data and events recorded in log messages associate with the distributed application. Anomaly detection methods and systems described herein determine approximate points in time when anomalous behavior of a distributed application starts to manifest and guide administrators and application owners in troubleshooting the anomaly, thereby reducing the time and effort to determine the root cause of the anomaly. In one aspect, methods and systems discover nodes comprising the distributed application and communication connections between nodes. In one aspect, methods and systems monitor the streams of metric data and log messages associated with the nodes for indications of anomalous behavior. When anomalous behavior is detected, methods and systems generate an alert, identify the approximate point in time when the problem occurred, and provide an administrator and/or application owner access to portions of the streams of metric data and the log messages that reveal the root cause of the anomalous behavior. Appropriate remedial measures may be determined based on the root cause and automatically or manually executed to correct the problem.

DESCRIPTION OF THE DRAWINGS

FIG. 17 shows an example of a log write instruction.

FIG. 18 shows an example of a log message generated by a log write instruction.

FIG. 19 shows a small, eight-entry portion of an event log.

DETAILED DESCRIPTION

This disclosure presents computational methods and systems for detecting anomalous behavior in multiple streams of metric data of a distributed computing system. In a first subsection, computer hardware, complex computational systems, and virtualization are described. Methods and systems to troubleshoot applications executing in a distributed computing system are described below in a second subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces.

Figure 1:
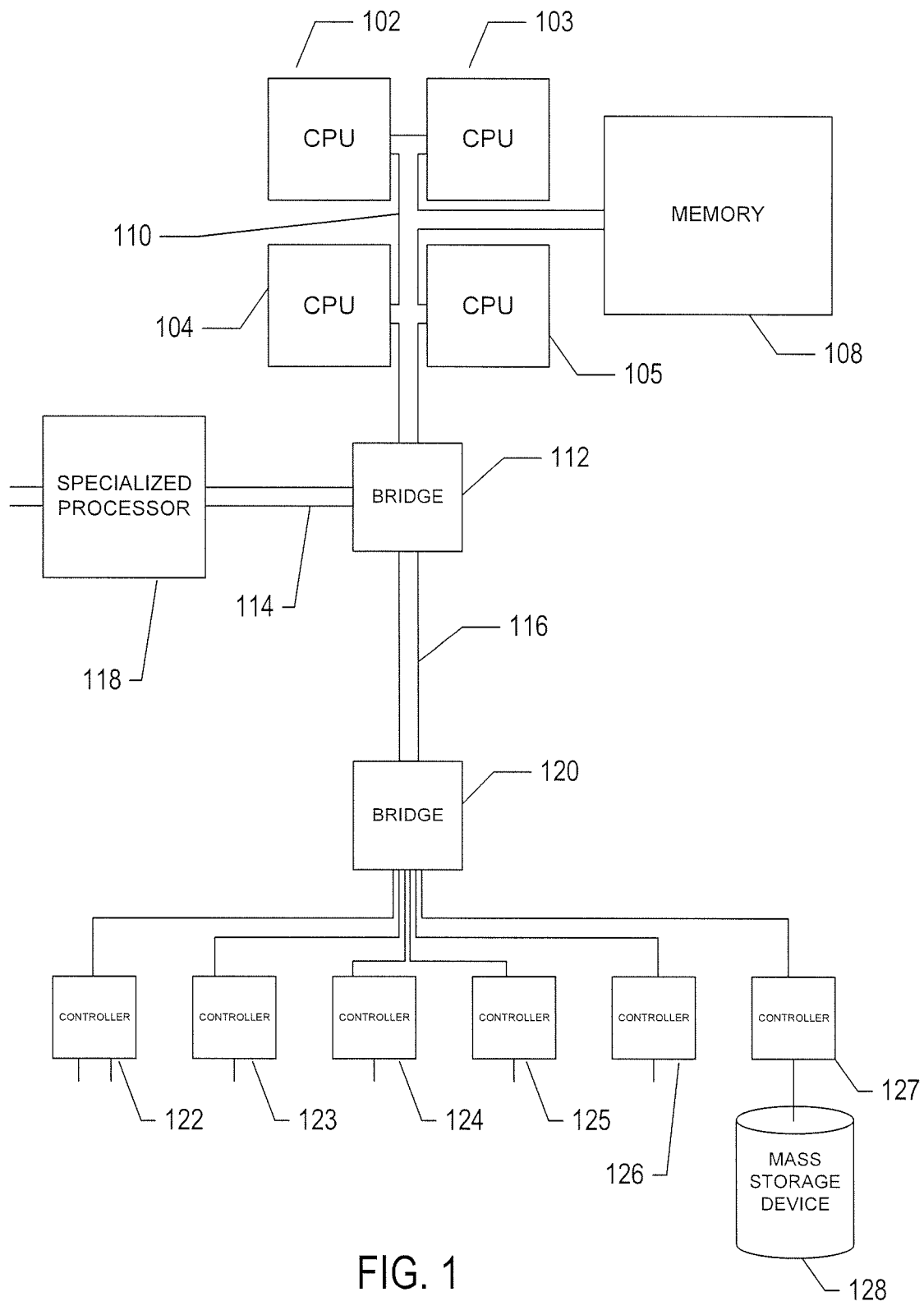
FIG. 1 shows an architectural diagram for various types of computers.

FIG. 1 shows a general architectural diagram for various types of computers. Computers that receive, process, and store log messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
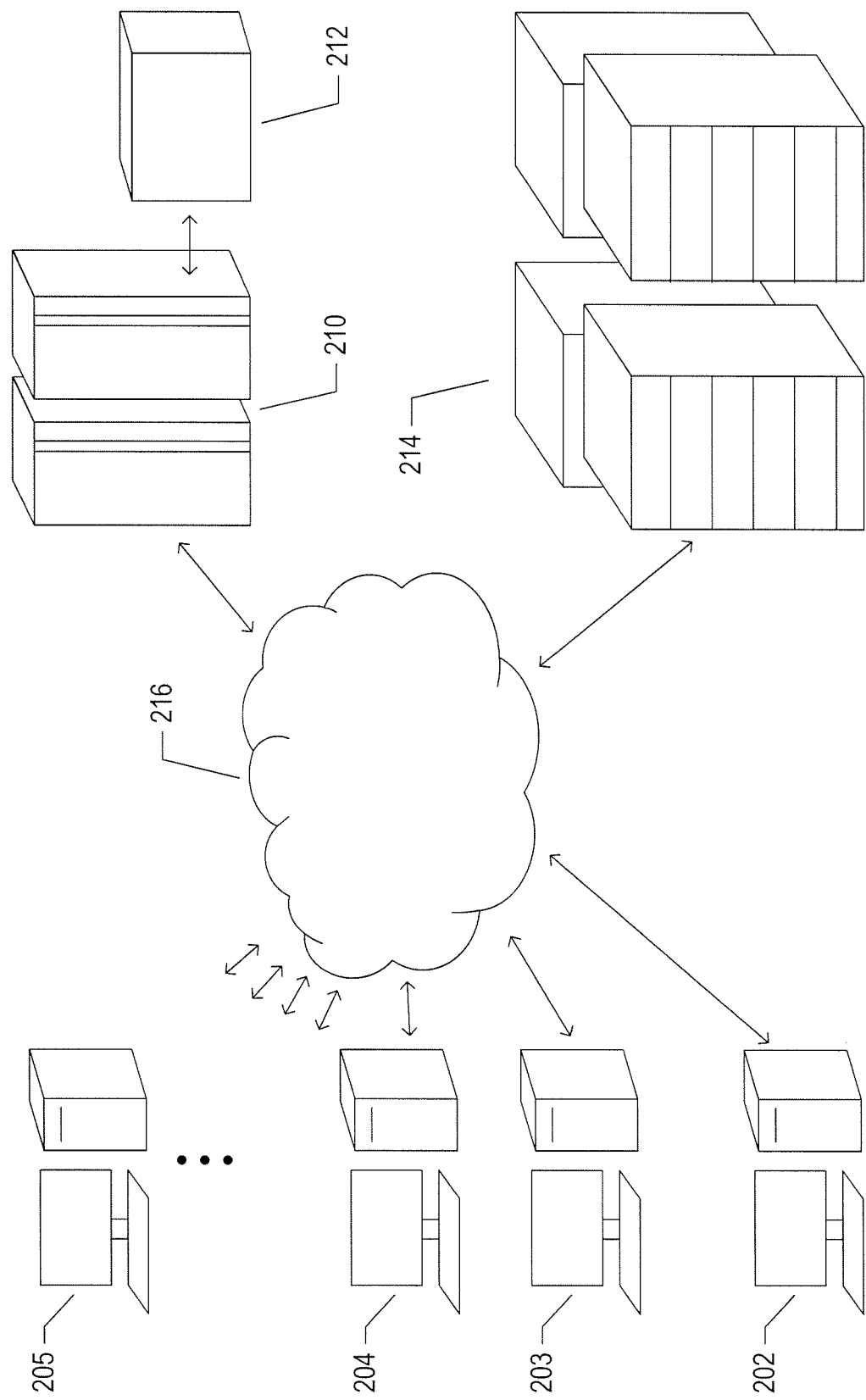
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
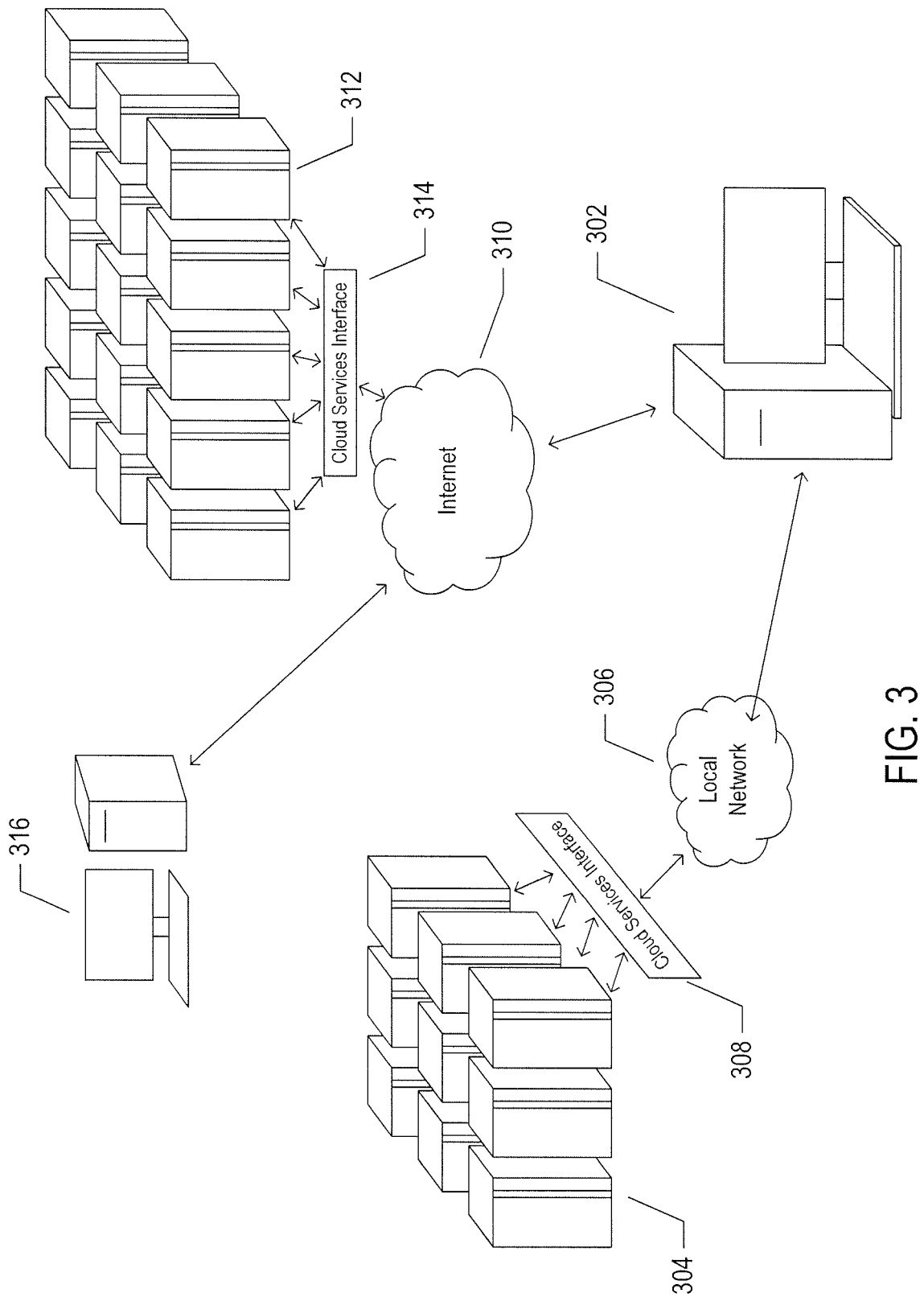
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
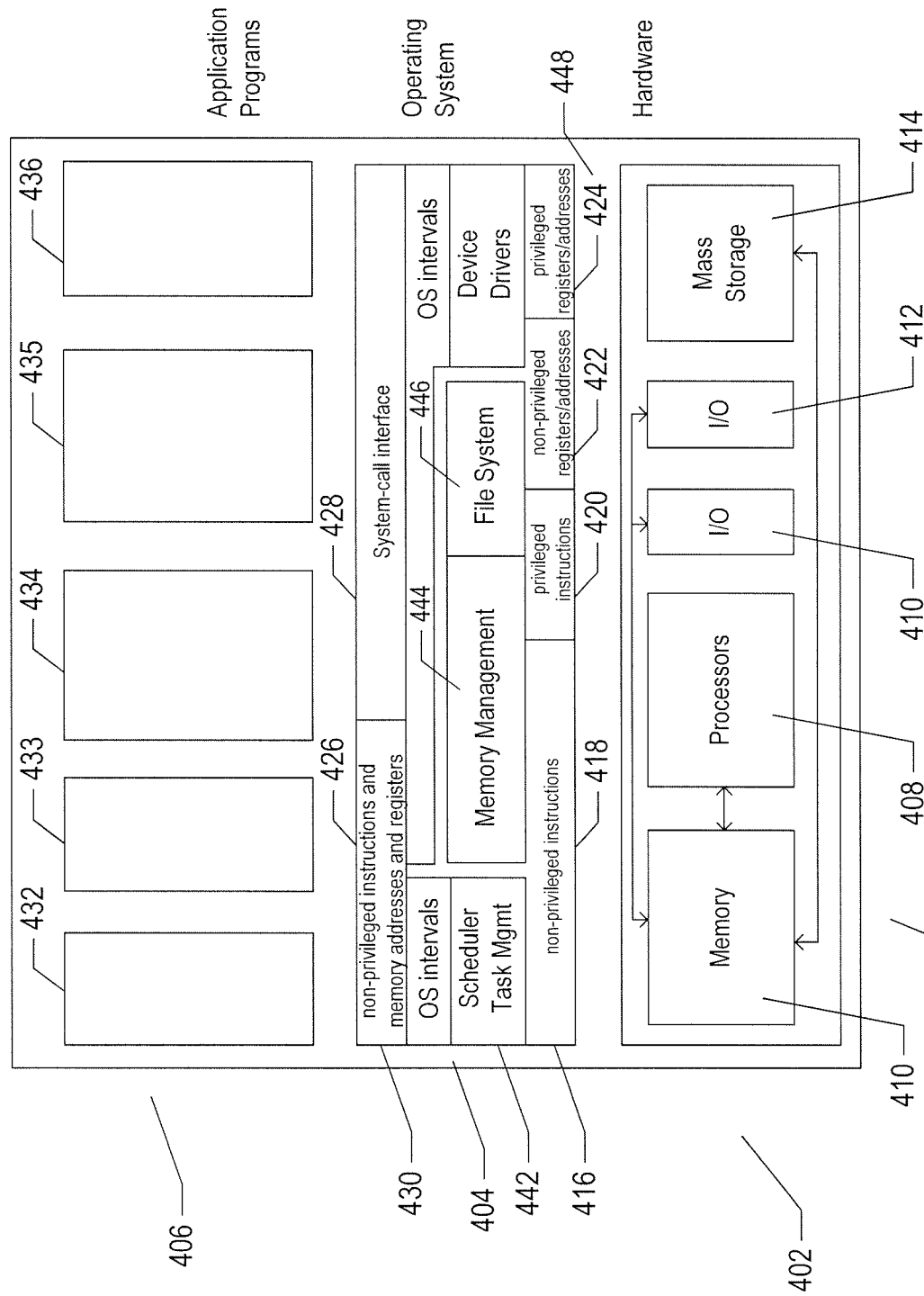
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
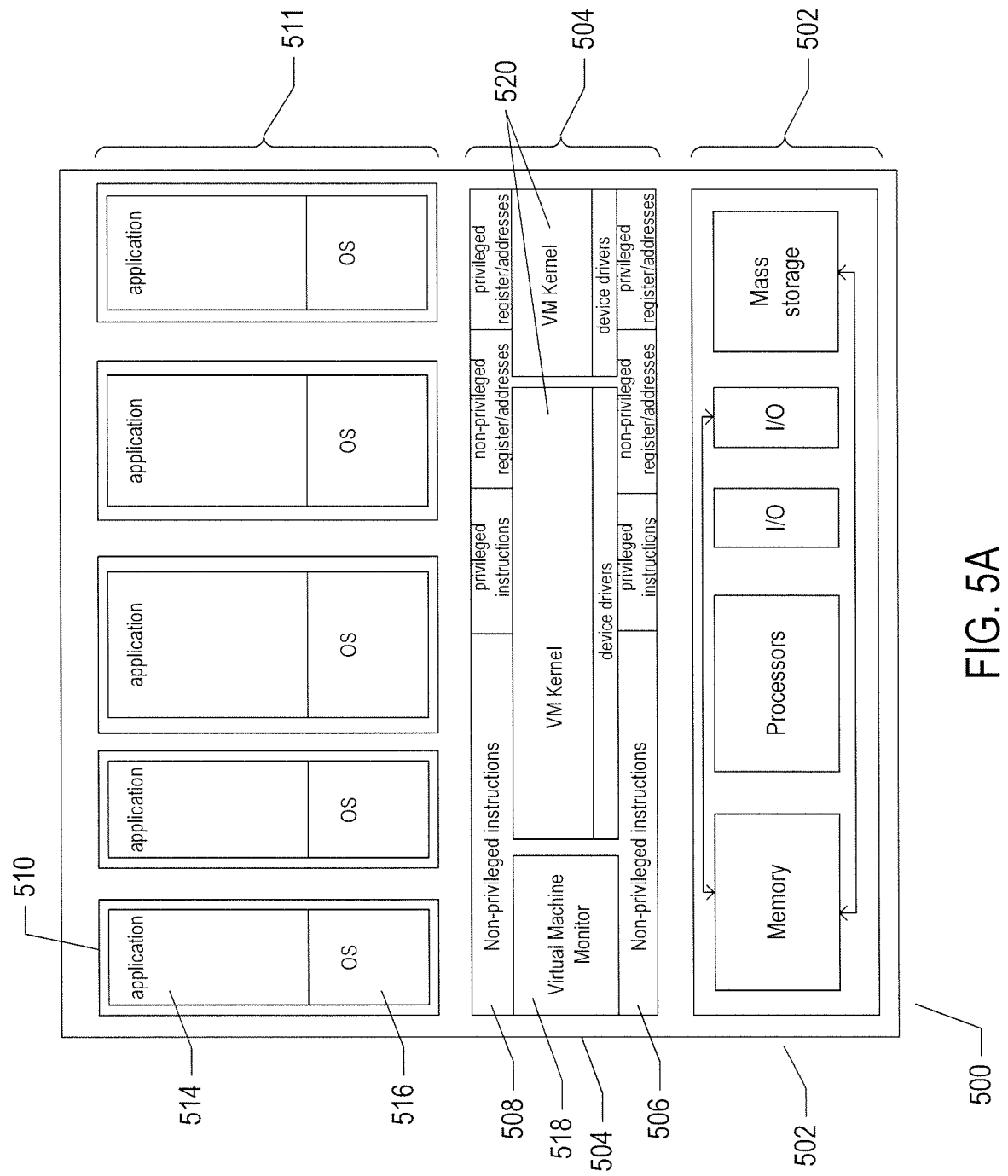
FIGS. 5A-5B show two types of virtual machine ("VM") and VM execution environments.
Figure 5B:
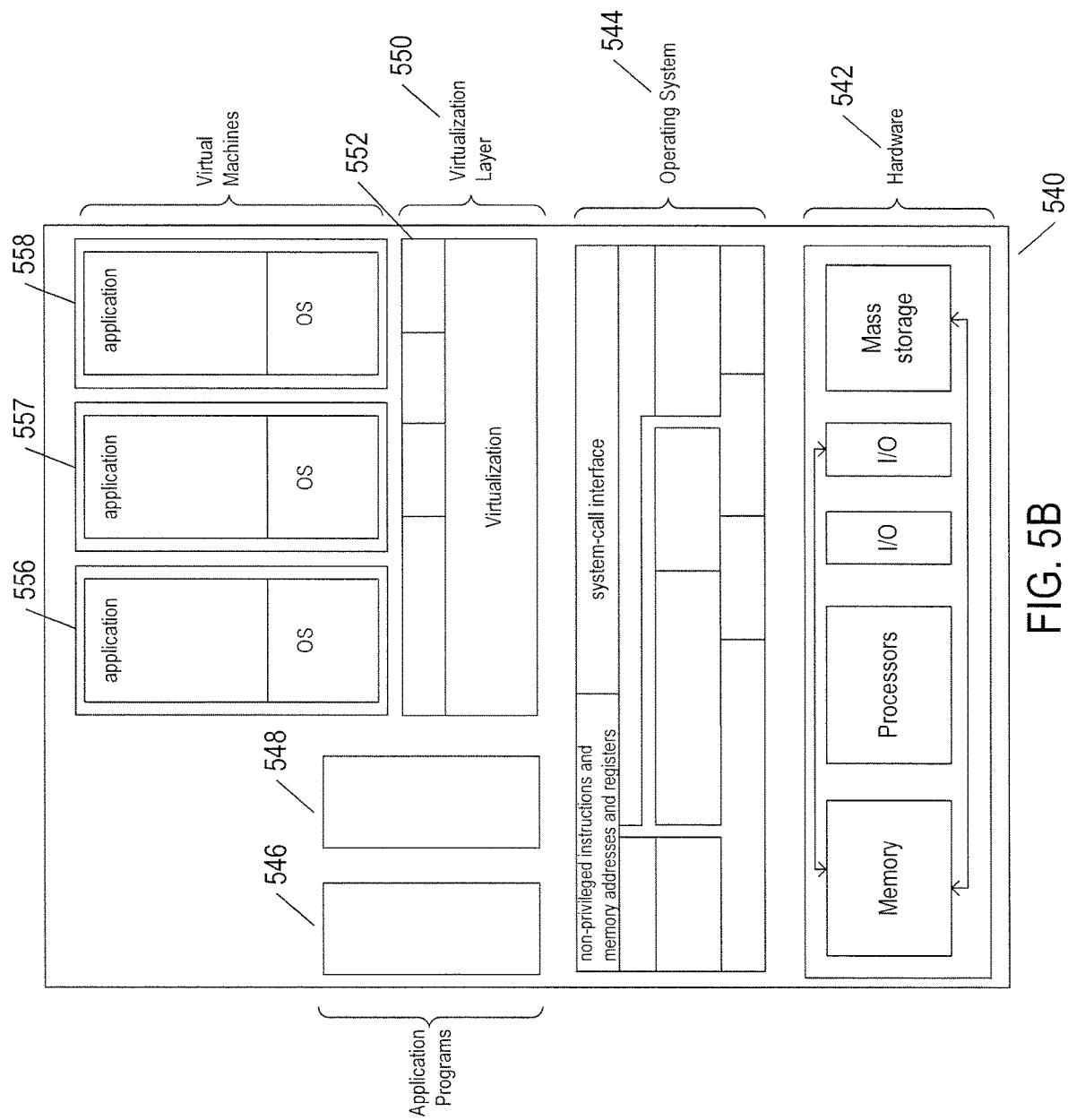

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
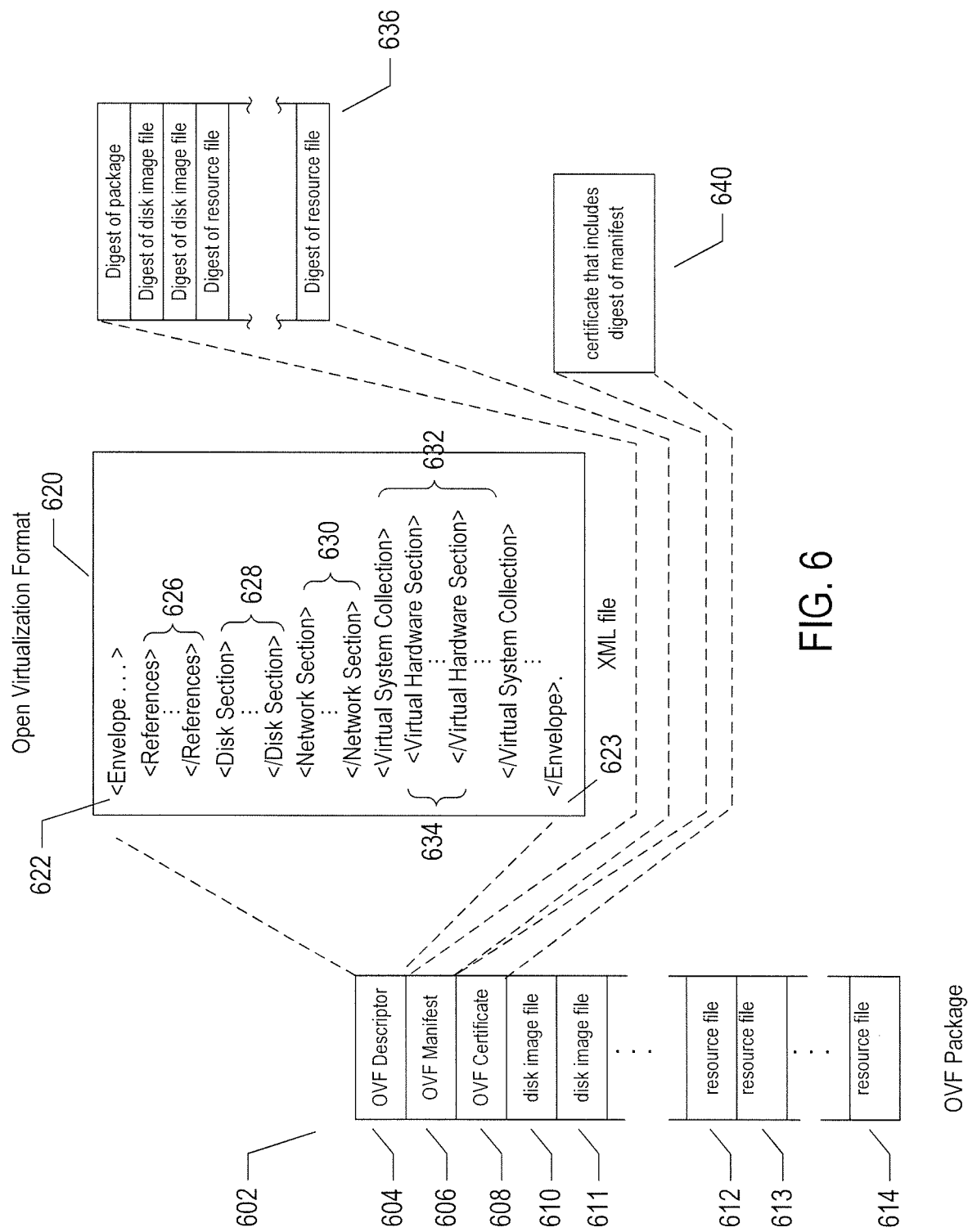
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
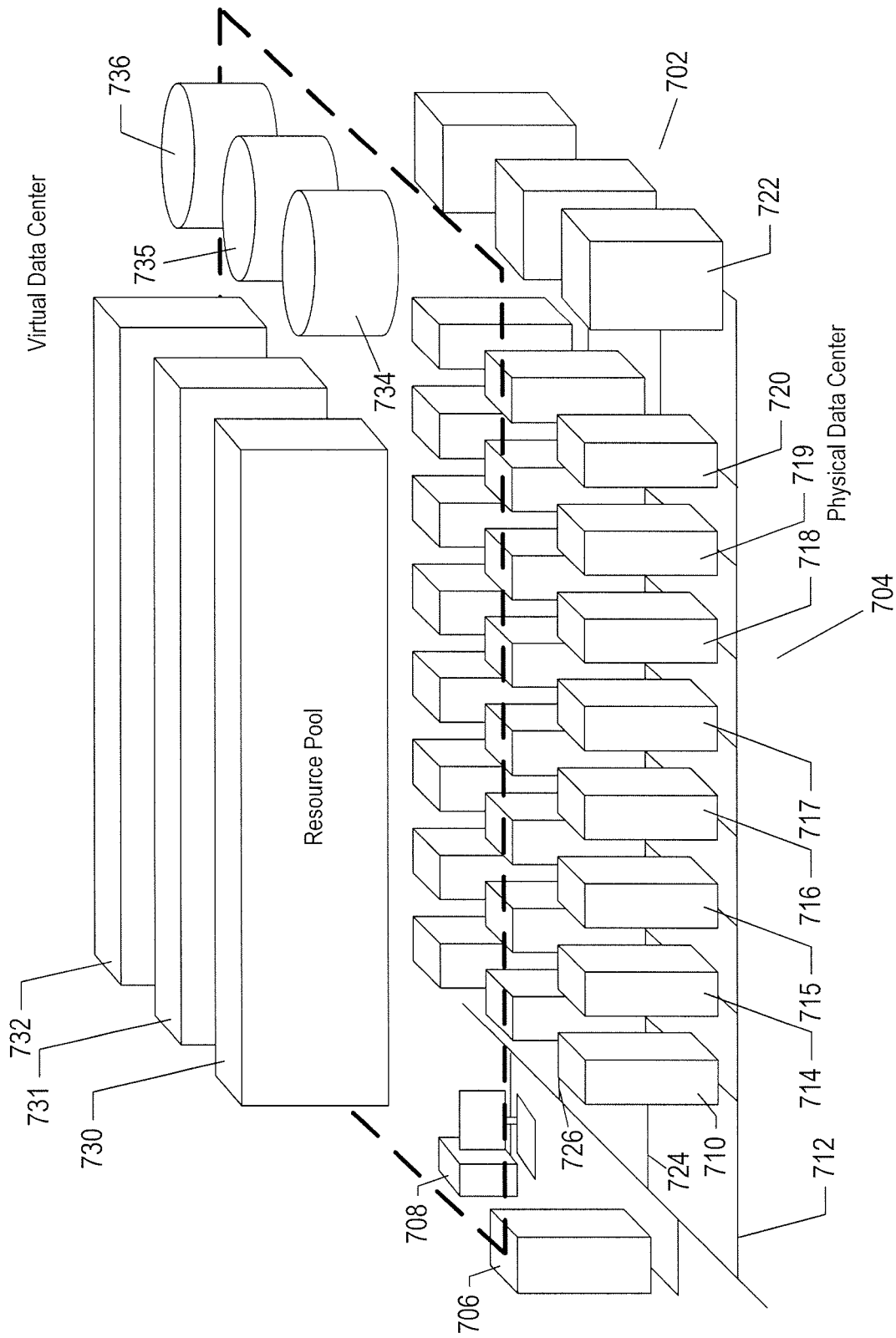
FIG. 7 shows example virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of various different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
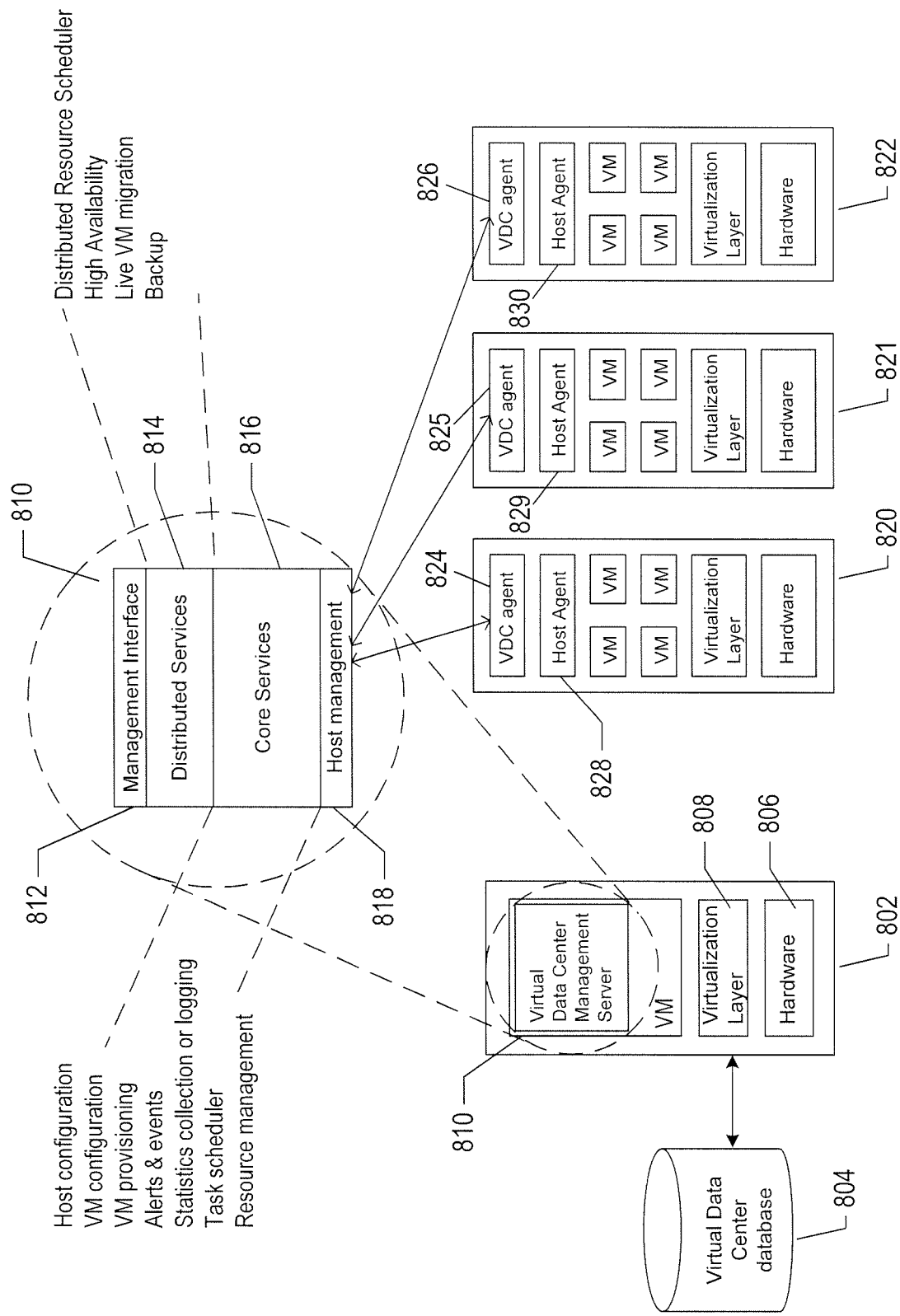
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808 and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-

822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
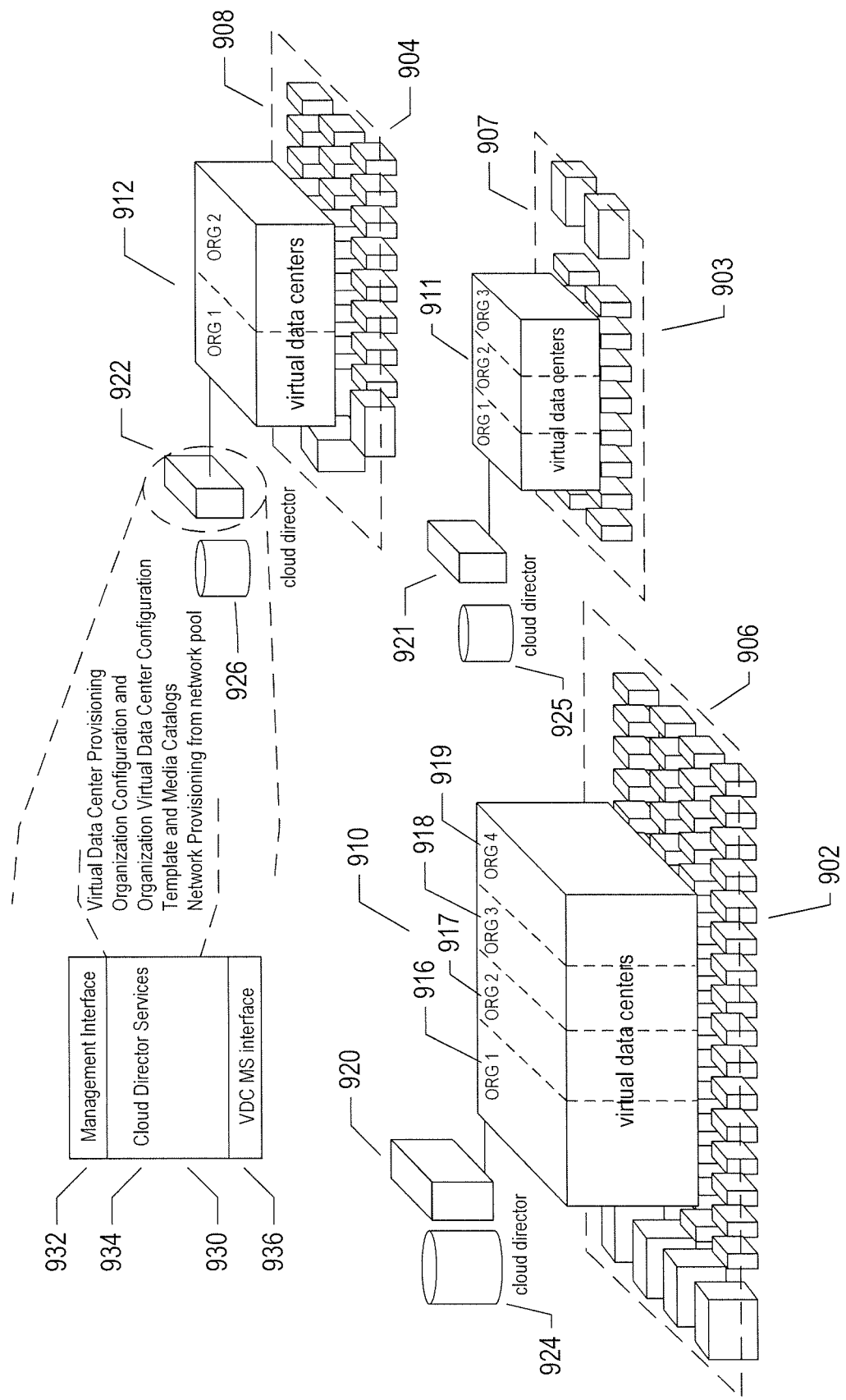
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
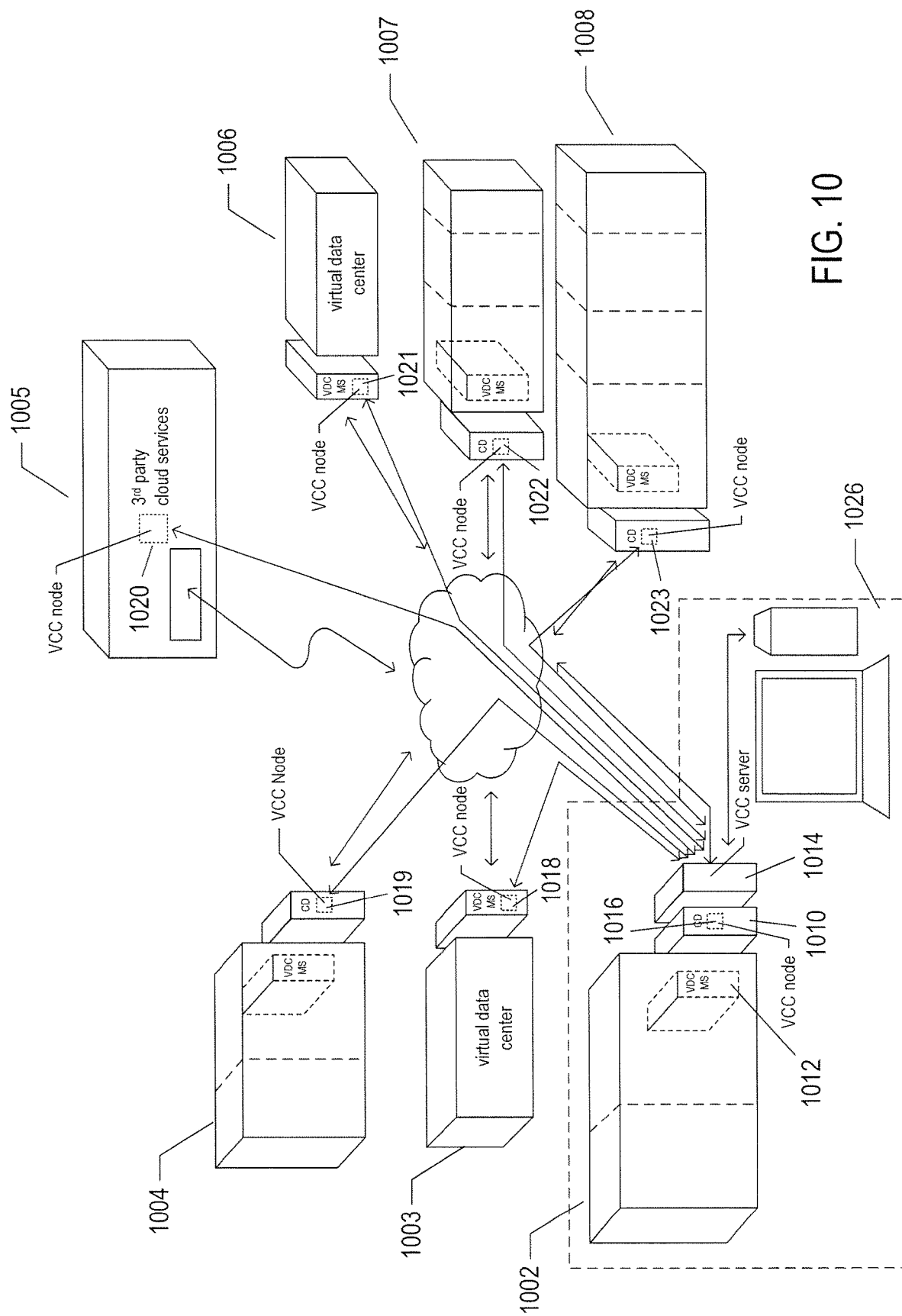
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
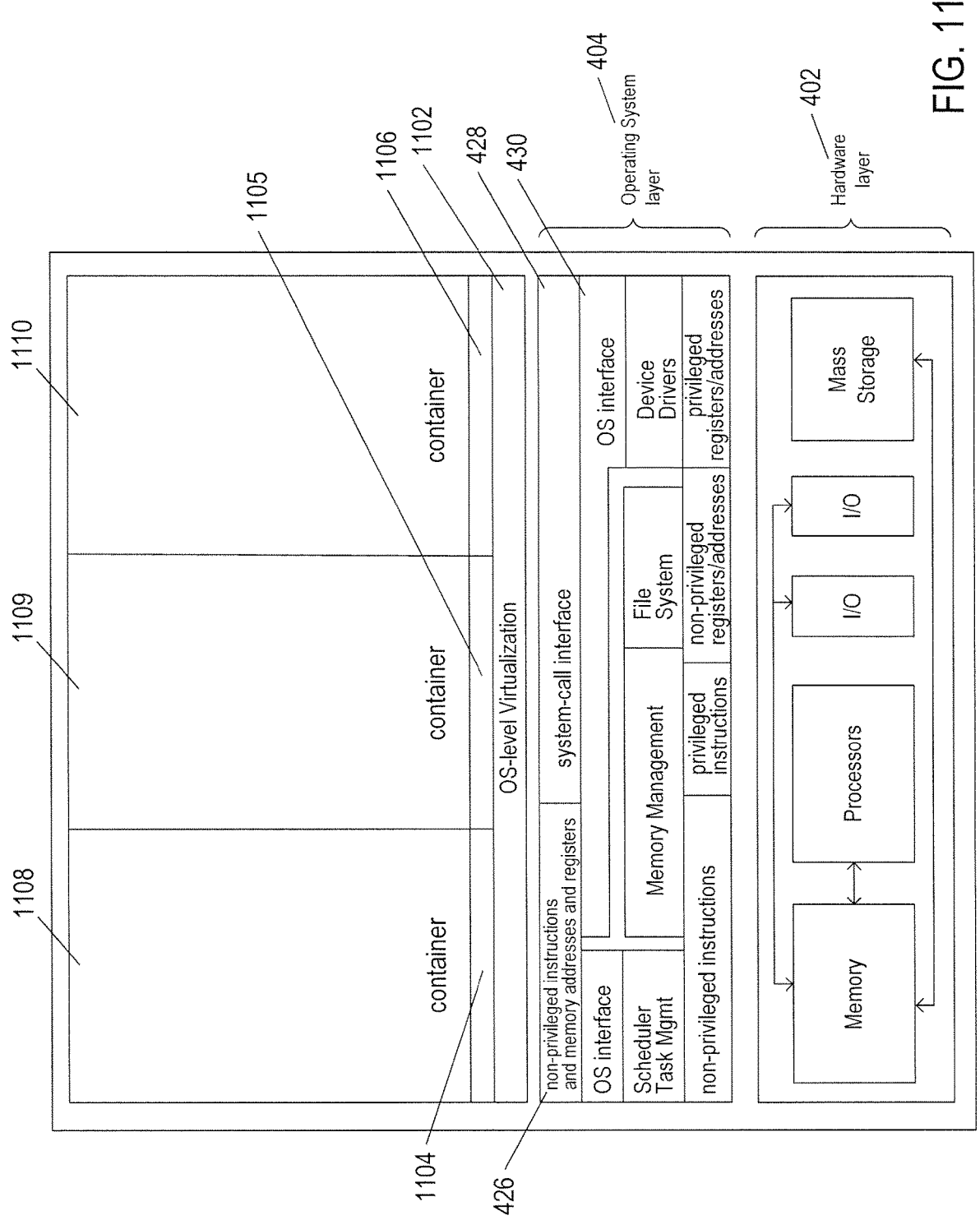
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
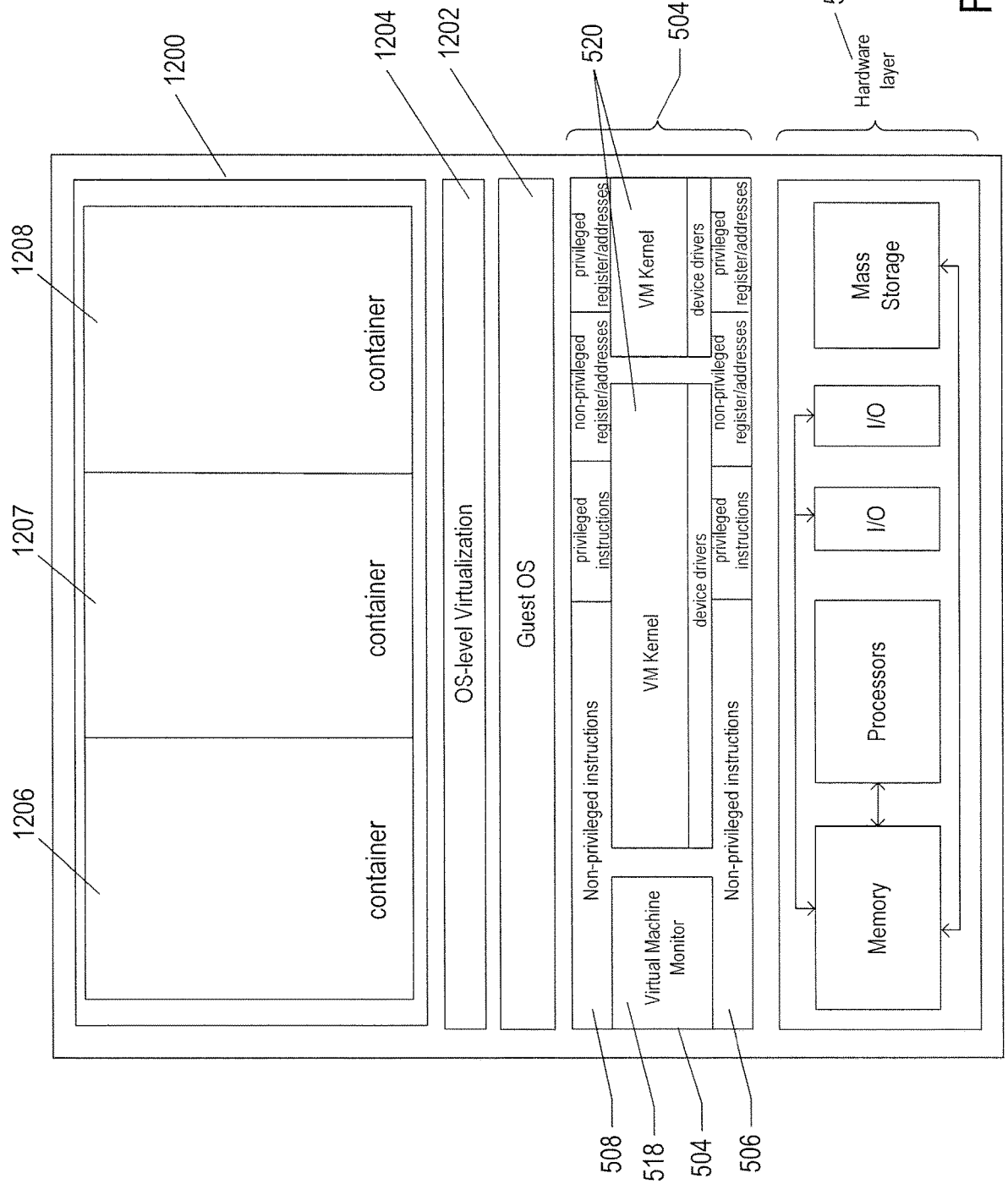
FIG. 12 shows an approach to implementing containers on a VM.

FIG. 12 shows an approach to implementing the containers on a VM. FIG. 12 shows a host computer similar to that shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Note that, although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Figure 13:
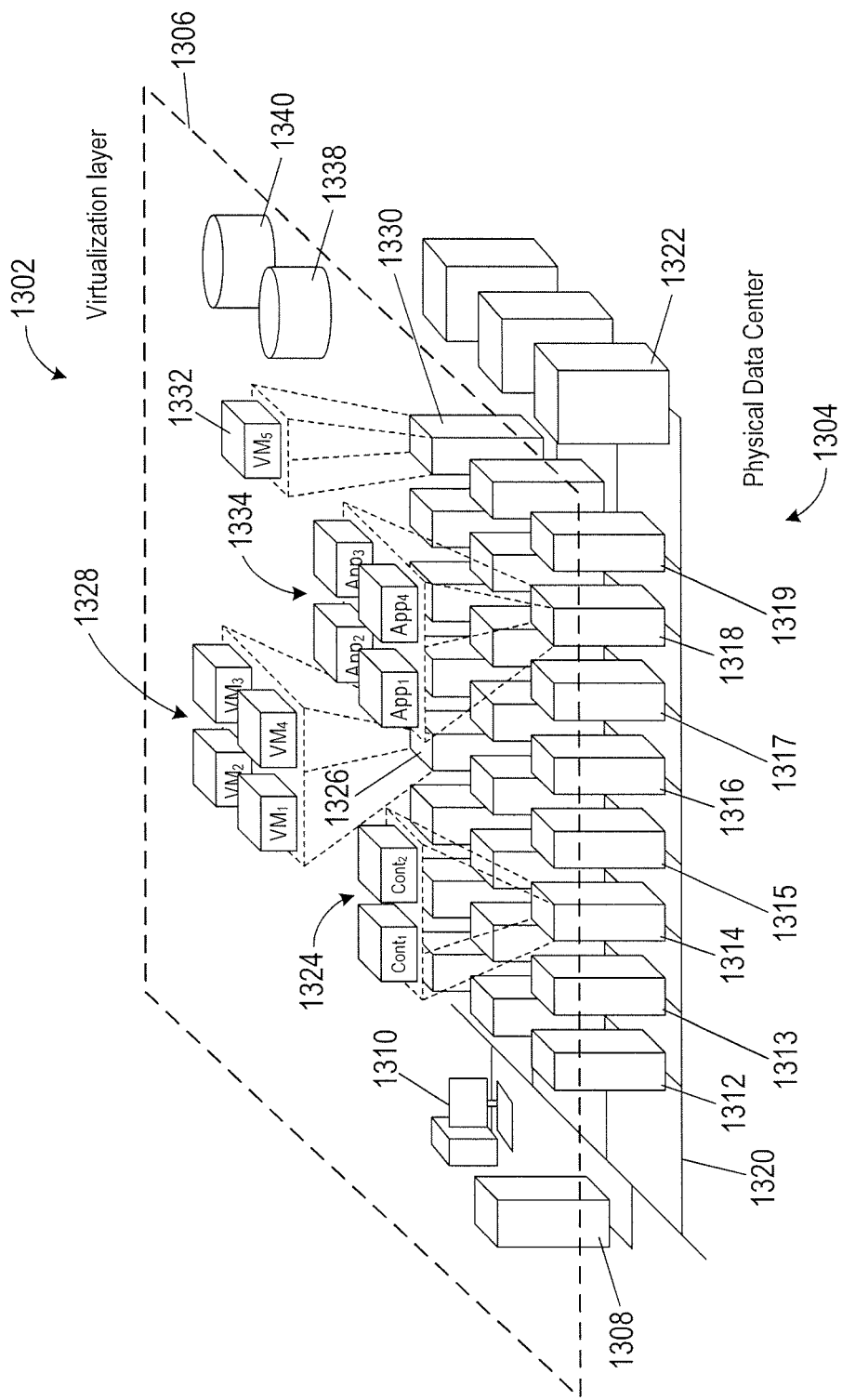
FIG. 13 shows an example of a virtualization layer located above a physical data center.

Methods and Systems to Troubleshoot Anomalous Behaving Applications in a Distributed Computing System Using Streaming Anomaly Detection FIG. 13 shows an example of a virtualization layer 1302 located above a physical data center 1304. For the sake of illustration, the virtualization layer 1302 is separated from the physical data center 1304 by a virtual-interface plane 1306. The physical data center 1304 is an example of a distributed computing system. The physical data center 1304 comprises physical objects, including a management server computer 1308, any of various computers, such as PC 1310, on which a virtual-data-center ("VDC") management interface may be displayed to system administrators and other users, server computers, such as server computers 1312-1319, data-storage devices, and network devices. The server computers may be networked together to form networks within the data center 1304. The example physical data center 1304 includes three networks that each directly interconnects a bank of eight server computers and a mass-storage array. For example, network 1320 interconnects server computers 1312-1319 and a mass-storage array 1322. Different physical data centers may include many different types of computers, networks, data-storage systems and devices connected according to many different types of connection topologies. The virtualization layer 1302 includes virtual objects, such as VMs, applications, and containers, hosted by the server computers in the physical data center 1304. The virtualization layer 1302 may also include a virtual network (not illustrated) of virtual switches, routers, load balancers, and network interface cards formed from the physical switches, routers, and network interface cards of the physical data center 1304. Certain server computers host VMs and containers as described above. For example, server computer 1314 hosts two containers 1324, server computer 1326 hosts four VMs 1328, and server computer 1330 hosts a VM 1332. Other server computers may host applications as described above with reference to FIG. 4. For example, server computer 1318 hosts four applications 1334. The virtual-interface plane 1306 abstracts the resources of the physical data center 1304 to one or more VDCs comprising the virtual objects and one or more virtual data stores, such as virtual data stores 1338 and 1340. For example, one VDC may comprise VMs 1328 and virtual data store 1338.

In the following discussion, the term "object" refers to a physical object or a virtual object which generates streams of metric data that are collected to detect abnormal (i.e., anomalous) behavior of applications running in a distributed computing system. A physical object may be a server computer, network device, a workstation, or a PC of a distributed computed system. A virtual object may be an application, a VM, a virtual network device, or a container of a distributed computing system. The term "resource" refers to a physical resource of a distributed computing system, such as, but are not limited to, a processor, a core, memory, a network connection, network interface, data-storage device, a mass-storage device, a switch, a router, and other any other component of the physical data center 1304. Resources of a server computer and clusters of server computers may form a resource pool for creating virtual resources of a virtual infrastructure used to run virtual objects. The term "resource" may also refer to a virtual resource, which may have been formed from physical resources used by a virtual object. For example, a resource may be a virtual processor formed from one or more cores of a multicore processor, virtual memory formed from a portion of physical memory, virtual storage formed from a sector or image of a hard disk drive, a virtual switch, and a virtual router.

Automated methods and systems described herein are implemented in a management system that collects and monitors multiple streams of metric data to detect anomalous behavior in applications running in a distributed computing system. The management system also collects log messages generated operating systems and the applications. When a problem is detected in the numerous streams of metric data, methods and systems generate an alert and identify log messages that may be used to determine the source the of the problem and determine appropriate remedial measures to correct the problem. Metric data and log messages collect by the management system are described next followed by a description of the management system.

Metric Data

Each stream of metric data is time series data generated by a metric source. The metric source may be an operating system of an object, a guest operating system, an object, an application, or a resource. A stream of metric data comprises a sequence of time-ordered metric values that are recorded at spaced points in time called "time stamps." A stream of metric data is also be called a sequence of metric data or simply a "metric" and is denoted by a sequence $$(x_i)_{i=1}^N (x(t_i))_{i=1}^N \quad (1)$$

where $x_i = x(t_i)$ is a metric value;

N is the number of metric values in the sequence;

$t_i$ is a time stamp indicating when the metric value was recorded in a data-storage device; and subscript i is a time stamp index i=1, ..., N.

The streams of metric data include, but are not limited to, CPU usage, amount of memory, network throughput, network traffic, and amount of storage. CPU usage is a measure of CPU time used to process instructions of an application program or operating system as a percentage of CPU capacity. High CPU usage may be an indication of unusually large demand for processing power, such as when an application program enters an infinite loop. Amount of memory is the amount of memory (e.g., GBs) a computer system or other device uses at a given time. Network throughput is the number of bits of data transmitted to and from a server computer or data-storage device and is often recorded in megabits, kilobits or simply bits per second. Network traffic at a server computer or mass-storage array is a count of the number of data packets received and sent at a given time.

Figure 14A:
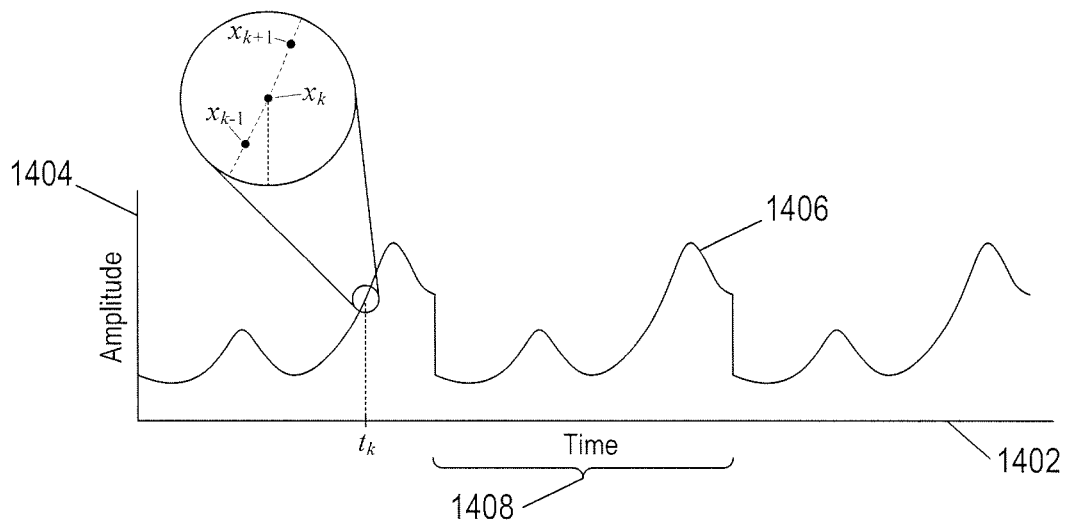
FIGS. 14A-14D show plots of four different example streams of metric data.
Figure 14B:
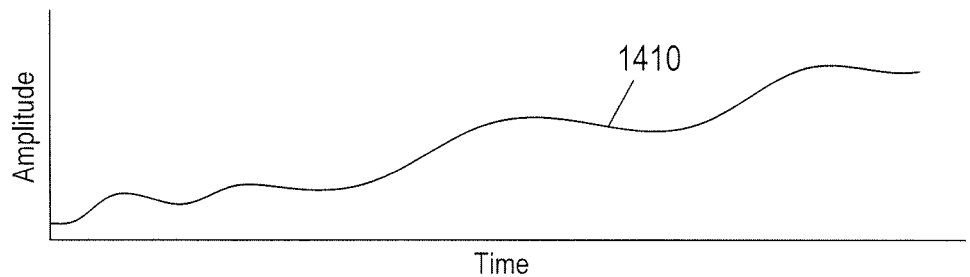
Figure 14C:
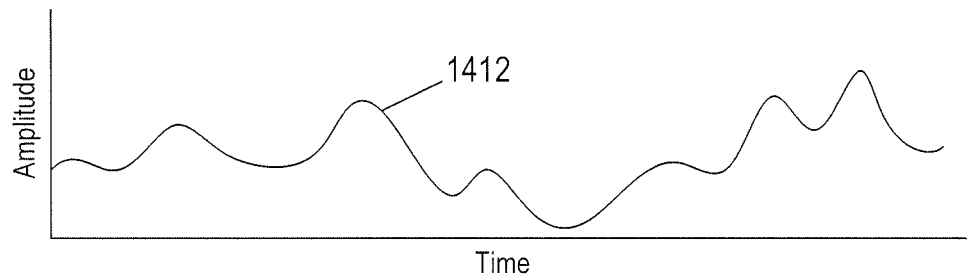
Figure 14D:
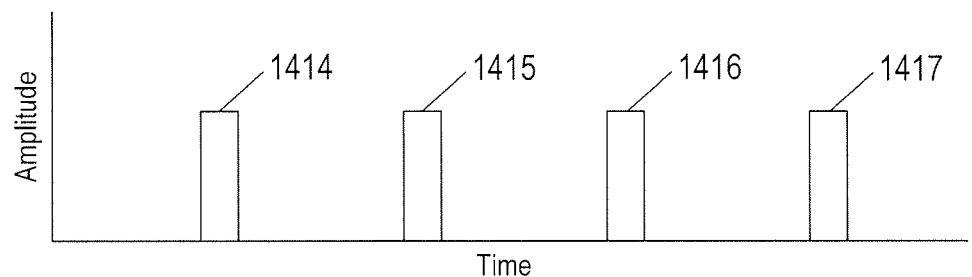

FIGS. 14A-14D show plots of four different example metrics. Horizontal axes, such as axis 1402, represents time. Vertical axes, such as vertical axis 1404, represents a range of metric data amplitudes. In FIGS. 14A-14C, curves represent four examples of different patterns of metric data streams. For example, in FIG. 14A, curve 1406 represents a periodic stream of metric data in which the pattern of metric data in time interval 1408 is repeated. In FIG. 14B, curve 1410 represents a trendy stream of metric data in which the amplitude of the metric data generally increases with increasing time. In FIG. 14C, curve 1412 represents a non-trendy, non-periodic stream of metric data. In FIG. 14D, rectangles 1414-1417 represent pulse waves of a pulsed stream of metric data generated by a resource that is utilized periodically and only for the duration of each pulse. The example streams of time series metric data shown in FIGS. 14A-14D represent usage of different resources. For example, the metric data in FIG. 14A may represent CPU usage of a core in a multicore processor of a server computer over time. The metric data in FIG. 14B may represent the amount of virtual memory a VM uses over time. The metric data in FIG. 14C may represent network throughput for a cluster of server computers.

In FIGS. 14A-14D, the streams of metric data are represented by continuous curves. In practice, a stream of metric data comprises a sequence of discrete metric values (see e.g., Equation (1)) in which each numerical value is recorded in a data-storage device with a time stamp. FIG. 14A includes a magnified view 1418 of three consecutive metric values represented by points 1420-1422. Points represent amplitudes of metric values at corresponding time stamps. For example, the points 1420-1422 represent consecutive metric values (i.e., amplitudes) $x_{k-1}$, $x_k$, and $x_{k+1}$ recorded in a data-storage device at corresponding time stamps $t_{k-1}$, $t_k$, and $t_{k+1}$, where subscript k is an integer time index of the k-th metric value in the stream of metric data.

Log Messages

Figure 15:
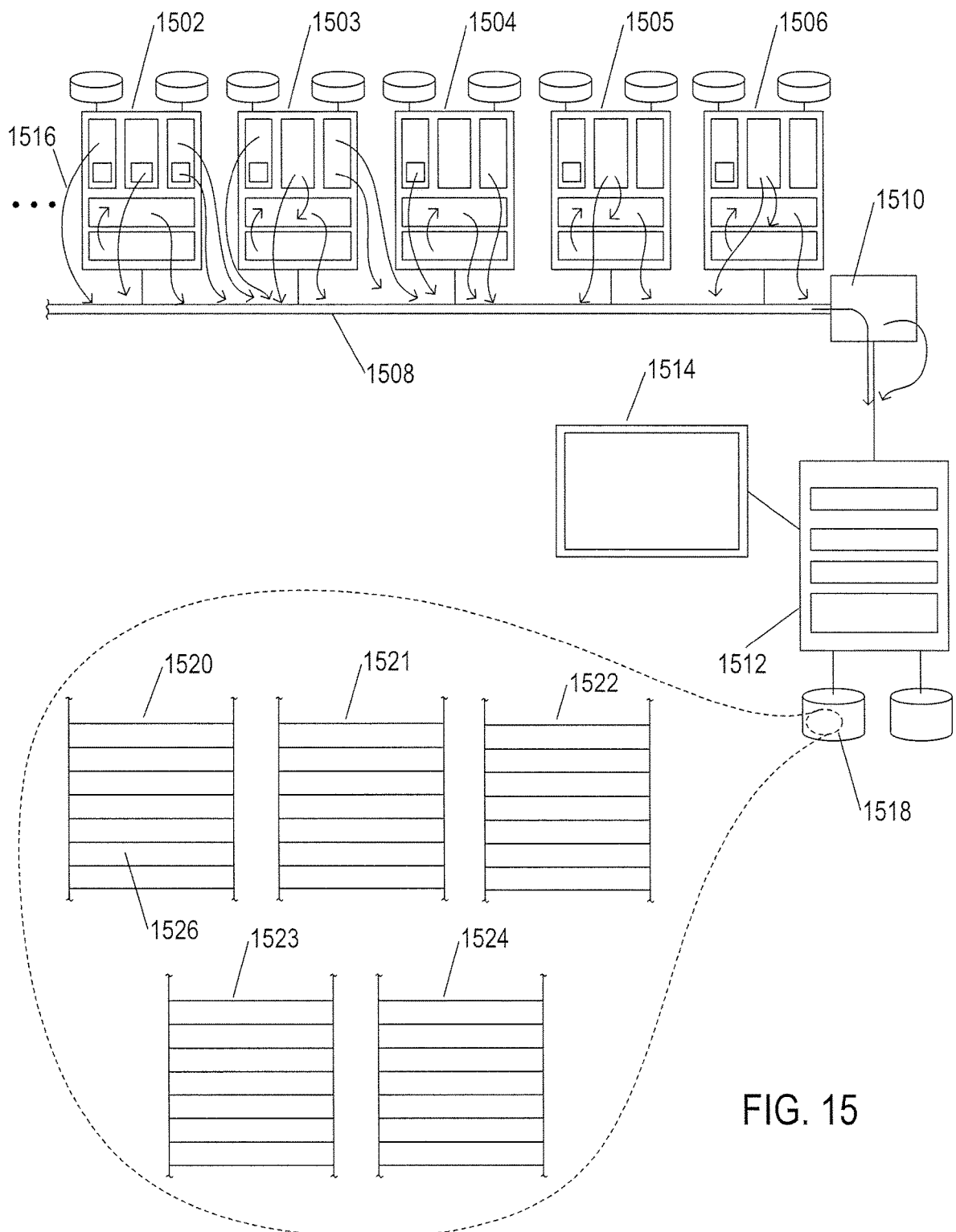
FIG. 15 shows an example of logging log messages in event logs.

FIG. 15 shows an example of logging log messages in event logs. In FIG. 15, computer systems 1502-1506 within a distributed computing system are linked together by an electronic communications medium 1508 and additionally linked through a communications bridge/router 1510 to an administration computer system 1512 that includes an administrative console 1514. One or more of the computer systems 1502-1506 may run a log monitoring agent that collects and forwards log messages to a log management server that runs on the administration console 1514. As indicated by curved arrows, such as curved arrow 1516, multiple components within each of the discrete computer systems 1502-1506 as well as the communications bridge/router 1510 generate log messages that are forwarded to the log management server. Log messages may be generated by any event source. Event sources may be, but are not limited to, application programs, operating systems, VMs, guest operating systems, containers, network devices, machine codes, event channels, and other computer programs or processes running on the computer systems 1502-1506, the bridge/router 1510 and any other components of the distributed computing system. Log messages may be collected at various hierarchical levels within a discrete computer system and then forwarded to the log management server in the administration computer 1512. For example, a log monitoring agent may collect and forward the log messages at various hierarchical levels. The log management server in the administration computer 1512 collects and stores the received log messages in a data-storage device or appliance 1518 as event logs 1520-1524. Rectangles, such as rectangle 1526, represent individual log messages. For example, event log 1520 may comprise a list of log messages generated within the computer system 1502. Each log monitoring agent has an agent monitoring configuration that includes a log path and a log parser. The log path specifies a unique file system path in terms of a directory tree hierarchy that identifies the storage location of an event log associated with the event source on the administrative console 1514 or the data-storage device or appliance 1518. The log monitoring agent receives specific file and event channel log paths to monitor event logs and the log parser includes log parsing rules to extract and format lines of log message into log message fields. The log monitoring agent then sends the constructed structured log messages to the log management server. The administrative console 1514 and computer systems 1502-1506 can function without log monitoring agents and a log management server, but with less precision and certainty.

Figure 16:
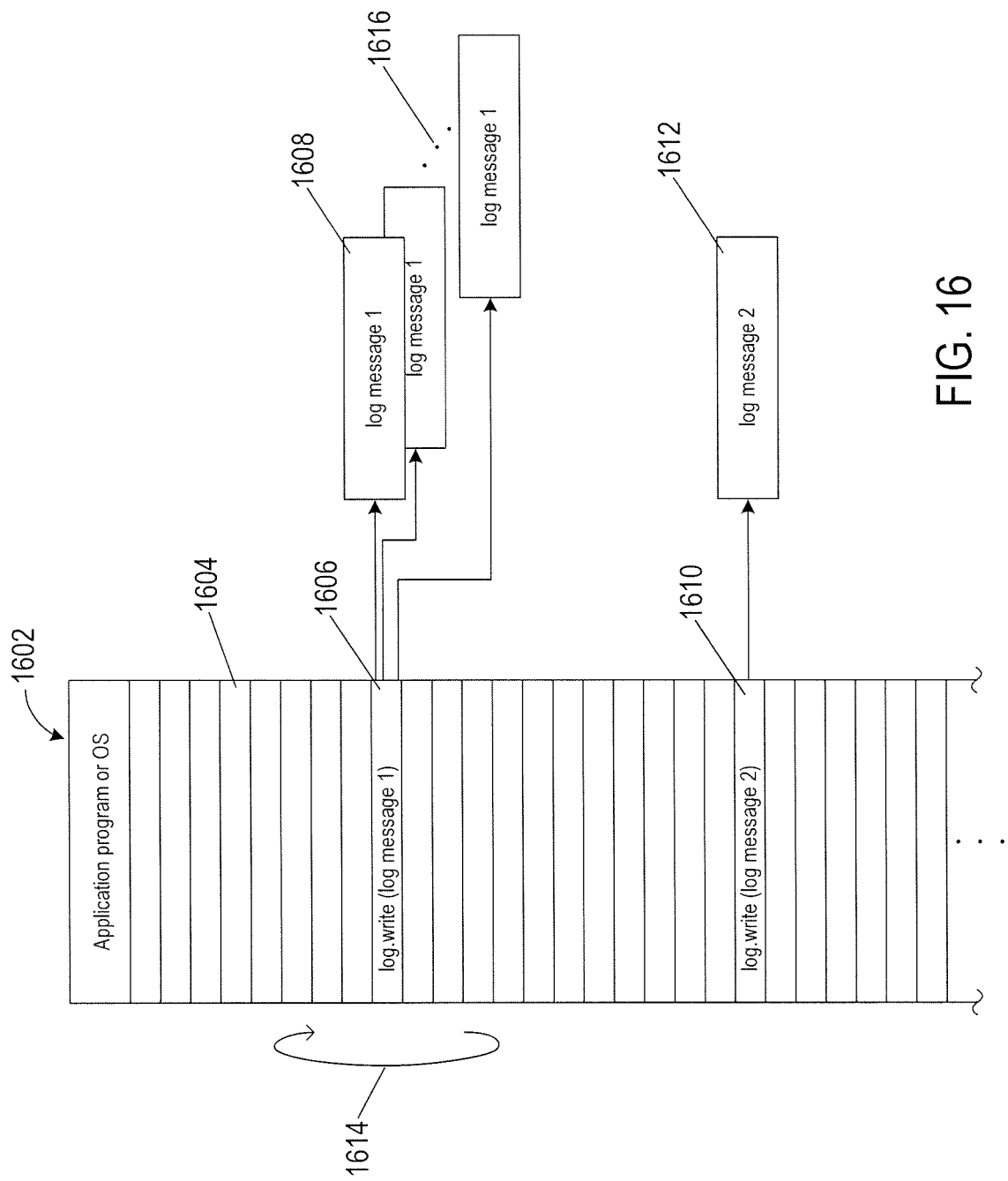
FIG. 16 shows an example of a source code with log write instructions.

FIG. 16 shows an example of a source code 1602 of an application program, an operating system, a VM, a guest operating system, or any other computer program or machine code. The source code 1602 is just one example of an event source that generates log messages. Rectangles, such as rectangle 1604, represent a definition, a comment, a statement, or a computer instruction that expresses some action to be executed by a computer. The source code 1602 includes log write instructions that generate log messages when certain events predetermined by the developer occur during execution of the source code 1602. For example, source code 1602 includes an example log write instruction 1606 that when executed generates an "log message 1" represented by rectangle 1608, and a second example log write instruction 1610 that when executed generates "log message 2" represented by rectangle 1612. In the example of FIG. 16, the log write instruction 1608 is embedded within a set of computer instructions that are repeatedly executed in a loop 1614. As shown in FIG. 16, the same log message 1 is repeatedly generated 1616. The same type of log write instructions may also be in different places throughout the source code, which in turns creates repeats of essentially the same type of log message in the event log.

In FIG. 16, the notation "log.write( )" is a general representation of a log write instruction. In practice, the form of the log write instruction varies for different programming languages. In general, log messages are relatively cryptic, including generally only one or two natural-language words and/or phrases as well as various types of text strings that represent file names, path names, and, perhaps various alphanumeric parameters. In practice, a log write instruction may also include the name of the source of the log message (e.g., name of the application program or operating system and version) and the name of the event log to which the log message is written. Log write instructions may be written in a source code by the developer of an application program or operating system in order to record events that occur while an operating system or application program is running. For example, a developer may include log write instructions that are executed when certain events occur, such as failures, logins, warnings, or errors.

FIG. 17 shows an example of a log write instruction 1702. In the example of FIG. 17, the log write instruction 1702 includes arguments identified with "$." For example, the log write instruction 1702 includes a time-stamp argument 1704, a thread number argument 1705, and an internet protocol ("IP") address argument 1706. The example log write instruction 1702 also includes text strings and natural-language words and phrases that identify the type of event that triggered the log write instruction, such as "Repair session" 1708. The text strings between brackets "[ ]" represent file-system paths, such as path 1710. When the log write instruction 1702 is executed, parameters are assigned to the arguments and the text strings and natural-language words and phrases are stored as a log message in an event log.

FIG. 18 shows an example of a log message 1802 generated by the log write instruction 1702. The arguments of the log write instruction 1702 may be assigned numerical parameters that are recorded in the log message 1802 at the time the log message is written to the event log. For example, the time stamp 1704, thread 1705, and IP address 1706 of the log write instruction 1702 are assigned corresponding numerical parameters 1804-1806 in the log message 1802. The time stamp 1804 represents the date and time the log message is generated. The text strings and natural-language words and phrases of the log write instruction 1702 also appear unchanged in the log message 1802 and may be used to identify the type of event that occurred during execution of the application program or operating system.

As log messages are received from various event sources, the log messages are stored in the order in which the log messages are received. FIG. 19 shows a small, eight-entry portion of an event log 1902. In FIG. 19, each rectangular cell, such as rectangular cell 1904, of the portion of the event log 1902 represents a single stored log message. For example, log message 1902 includes a short natural-language phrase 1906, date 1908 and time 1910 numerical parameters, as well as, an alphanumeric parameter 1912 that appears to identify a particular host computer.

Management System

Figure 20A:
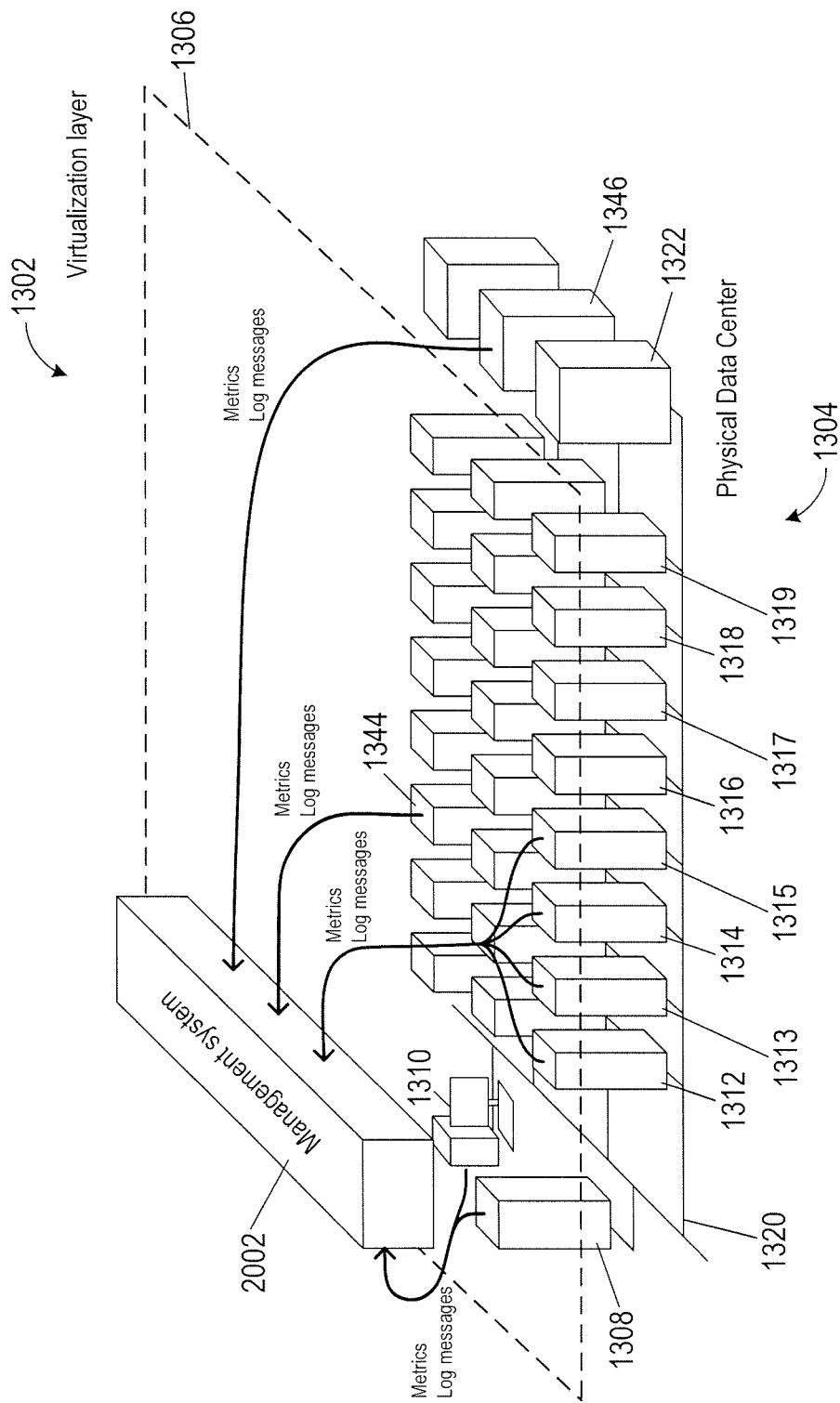
FIGS. 20A-20B show an example of a management system receives log messages and numerous metrics.
Figure 20B:
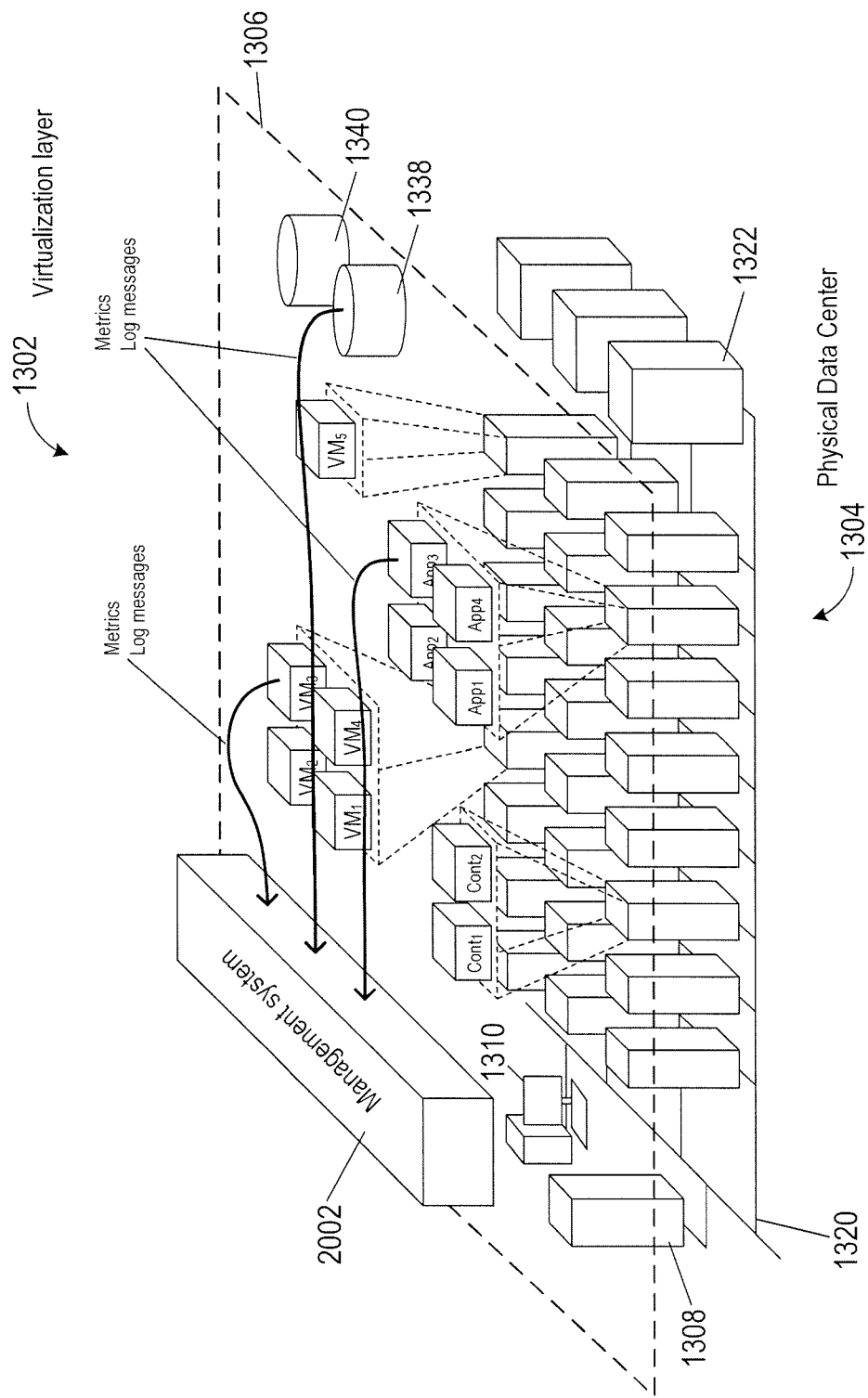

FIGS. 20A-20B show an example of a management system 2002 that receives log messages from operating systems, applications, and virtual objects and receives numerous streams of metrics metric from metric sources. The management system 2002 is located in the virtualization layer 1302 and may be implemented in one or more VMs to receive and process the metrics as described below. As shown in FIGS. 20A-20B, directional arrows represent log messages and streams of metric data sent to the management system 2002. In FIG. 20A, operating systems and applications running on PC 1310, server computers 1308 and 1344, and mass-storage array 1346 send log messages and metrics to the management system 2002. Operating systems and applications running on clusters of server computers may also send metrics to the management system 2002. For example, a cluster of server computers 1312-1315 sends log messages and metrics to the management system 2002. In FIG. 20B, the operating systems, VMs, containers, applications, and virtual storage may independently send log messages and streams of metric data to the management system 2002. Certain metric sources may send metric values as the metric values are generated while other metric sources may only send metric values at certain times or in response to a request from the management system 2002.

Figure 21:
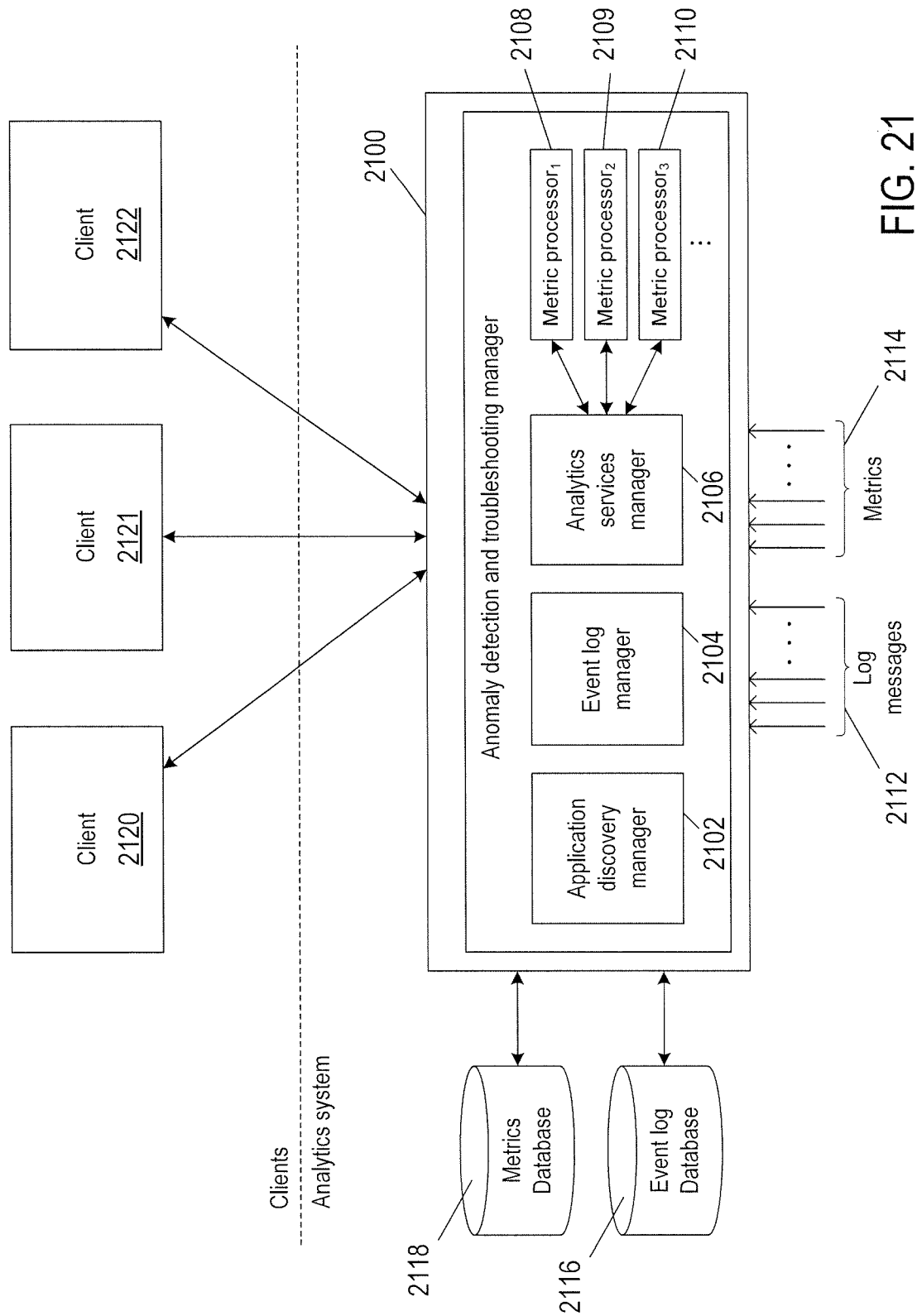
FIG. 21 shows an architecture of an example management system.

FIG. 21 shows an architecture of an example management system 2100. The management system 2100 comprises an application discovery manager 2102, an event log manager 2104, and an analytics services manager 2106 that is in communication with multiple metric processors 2108-2110. The management system 2100 receives log messages represented by directional arrows 2112 and streams of metric data represented by directional arrows 2114. The management system 2100 enables a user, such an administrator or an application owner, to create one or more metric processors from configurable performance models described below and assigns to each metric processor one or more streams of metric data. The management system 2100 copies log messages to an event log database 2116 and copies each stream of metric data to a metrics database 2118 to create a history log messages and metrics. Each metric processor generates forecast metric data and detects anomalous behavior at resources. Clients 2120-2122 send request to the management server 2100 to monitor the performance of applications receive notification of anomalous behavior. The application discovery manager 2102, event log manager 2104, analytics services manager 2106, metric processors are described in separate sections below.

Application Discovery Manager

The application discovery manager 2102 performs a machine learning approach to discovering applications running a distribute computing system. An application comprises a set of nodes, such as VMs and containers, that are logically related to one another by collectively providing some form of coherent functionality. Nodes are the deployed VMs or containers inside of which application software runs. A tier is a collection of one or more nodes. In modern cloud-native applications, tiers are often called microservices. An application comprises one or more tiers. The term application covers a broad spectrum of applications ranging from legacy monolithic VMs, to traditional three-tier applications, and moreover to modern cloud-native applications implemented as a collection of microservices. The application discovery manager 2102 follows two assumptions: 1) Tiers are homogeneous. Nodes of a tier run approximately the same software, which can be observed from the command lines of processes running on the various nodes. 2) Network traffic delineates application boundaries.

Figure 22A:
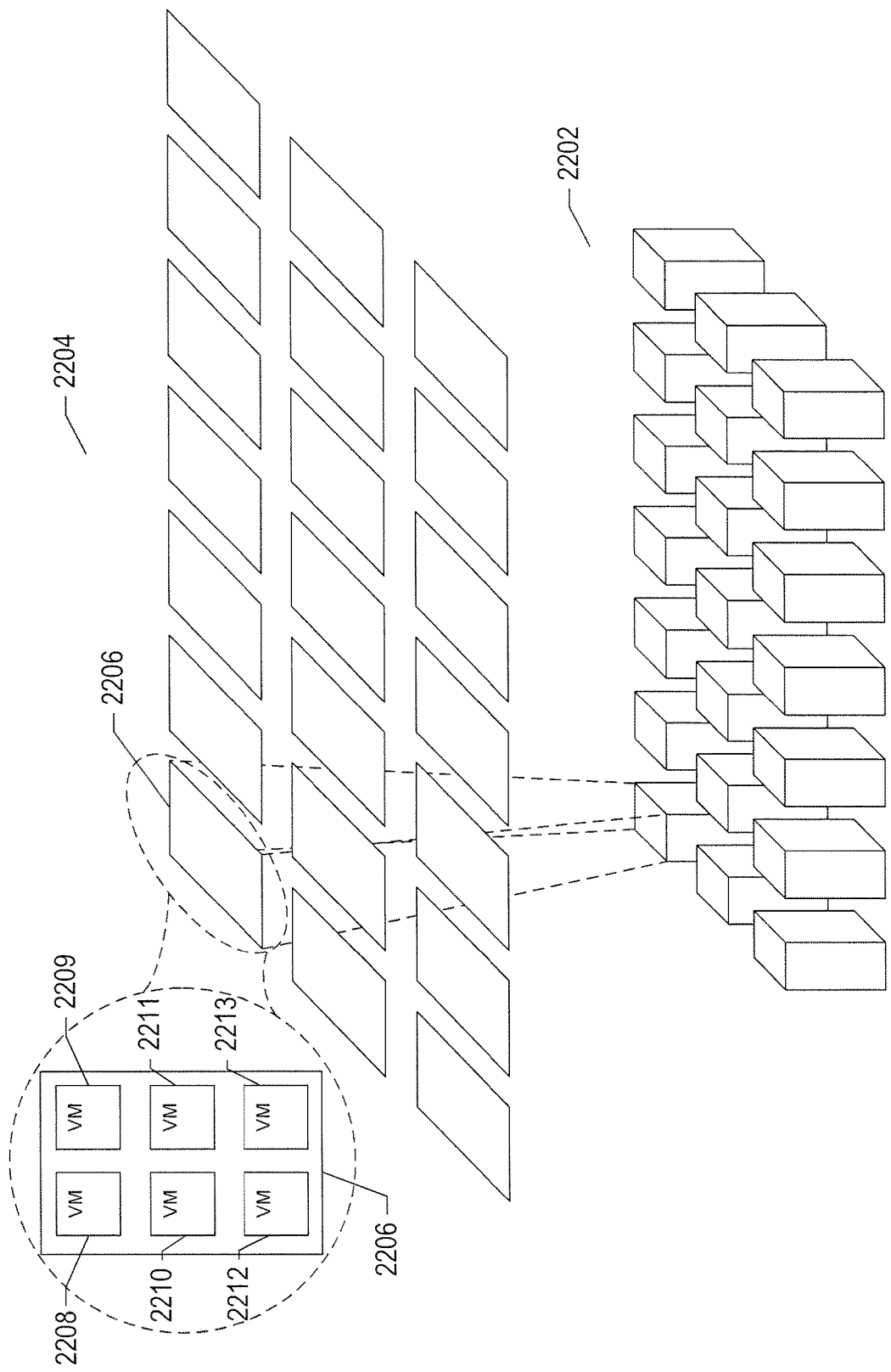
FIGS. 22A-22C show a distributed-computing environment in which an application discovery manager discovers currently executing distributed applications.
Figure 22B:
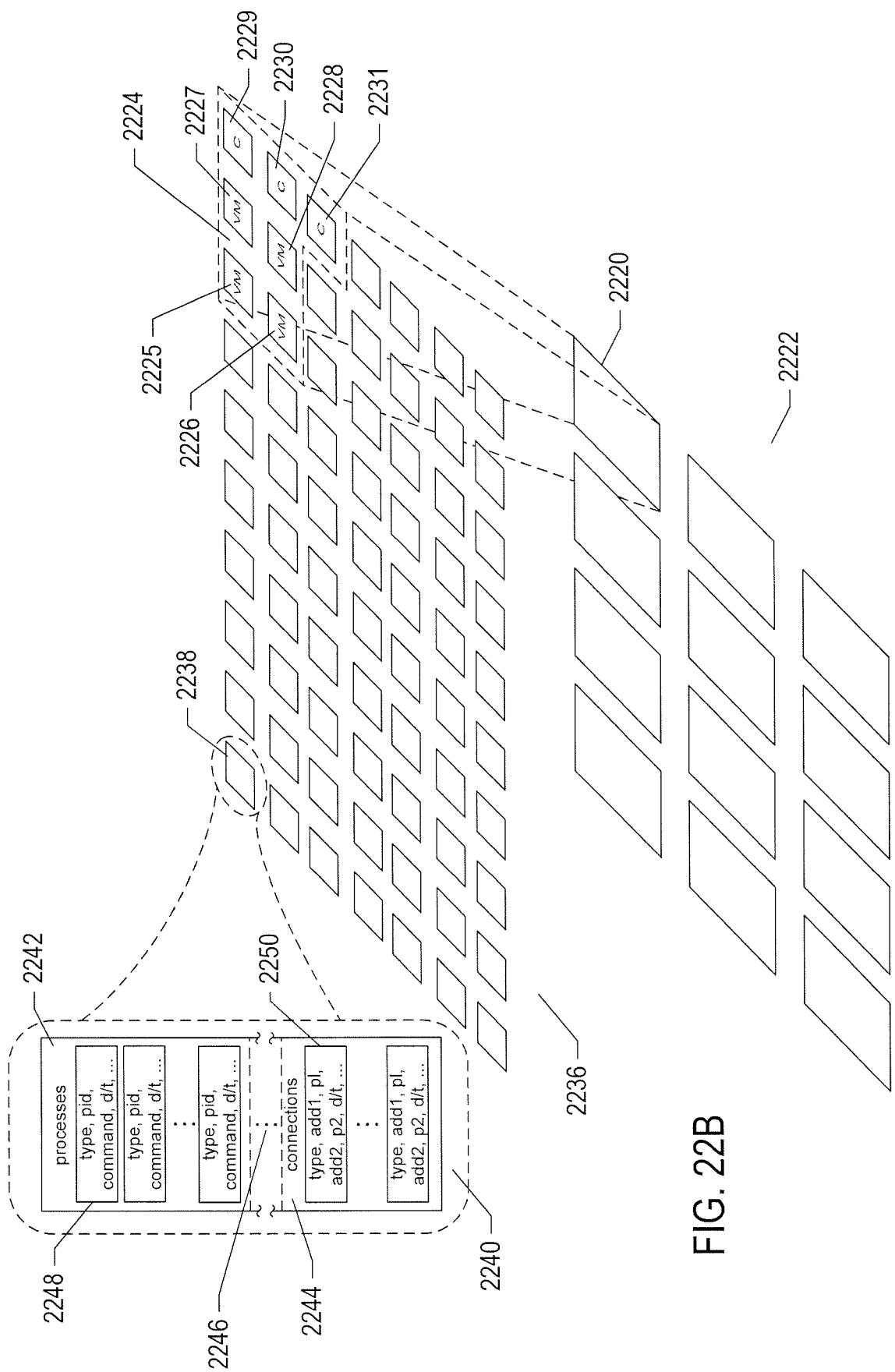
Figure 22C:
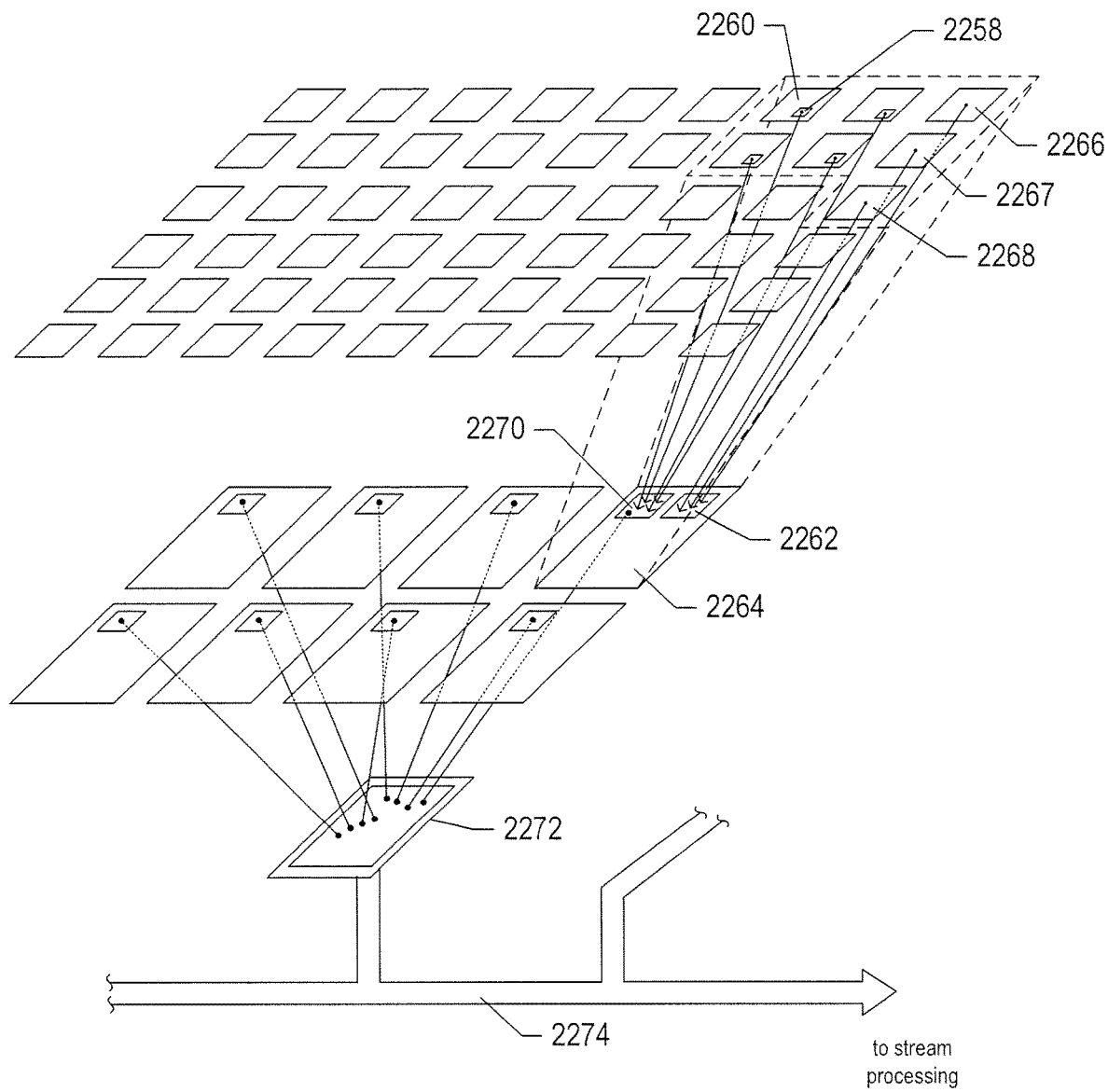

FIGS. 22A-22C provide a high-level view of a distributed-computing environment in which the application discovery manager 2102 discovers currently executing distributed applications. As shown in FIG. 22A, a cloud-computing facility, or other distributed application-execution environment, is represented as a set of server computers 2202. The server computers may be physical server computers or virtual server computers provided by a VDC, as described above. The server computers may be located within a single physical computing facility or may be distributed across multiple physical computing facilities. Each server computer can be represented as a set of VMs that execute within a virtual-machine-execution environment provided by a virtualization layer within the server computer. In FIG. 22A, the server computers 2202 are thus represented by sets of virtual machines 2204. Each set of virtual machines, such as virtual-machine set 2206, includes one or more virtual machines 2208-2213. As shown in FIG. 22B, each server, such as server 2220, in the set of servers 2222 that represent a cloud-computing facility or other distributed-application-execution environment can be thought of as comprising a number of application-execution environments 2224 including virtual machines 2225-2228 and/or containers 2229-2231. For simplicity, virtual machines and containers, as well as other types of application-execution environments, are referred to as "nodes." Thus, the distributed-computing facility, abstracted as a set of servers 2222, as discussed above with reference to FIG. 22A, can be further abstracted as a set of application-execution-environment nodes 2236, the application-execution-environment nodes referred to simply as "nodes" in the discussion below. Each node, such as node 2238, can be represented by a data set, or data representation, 2240. The data representation of a node includes representations of the various processes currently running on the node 2242, a representation of the communications connections from the node to other nodes and to remote computational entities 2244, and additional information represented by ellipses 2246. Each process, such as process 2248, may be represented by a process identifier, the command line used to launch the process, and various descriptive types of data, including a process type, the time at which the process was launched, indications of the resources consumed by the process, and other types of information. Similarly, each connection, such as connection 2250, can be represented by source and destination network addresses and port numbers, a timestamp representing when the connection was established, an indication of the type of connection and protocol stack associated with the connection, and other such information. The additional information represented by ellipses 2246 may include a list of the current communications addresses associated with the node.

FIG. 22C provides an overview of the architecture of the implementation of the application discovery manager 2102. An agent, such as agent 2258, is included in each virtual-machine node, such as virtual-machine node 2260, and a different type of agent 2262 is included in each server, such as server 2264, for collecting information about container nodes 2266-2268 executing within the server. These agents continuously or intermittently collect information about the nodes in which they are included or with which they communicate, and transmit or stream the collected information to a collector 2270 within each server that, in turn, streams the collected information to a streaming collector or application 2272 which streams the collected information to a pipeline of stream processors. The stream channel 2274 shown in FIG. 22C represents the fact that the agent-collected information may be streamed to the stream-processor pipeline from multiple discrete distributed-computing facilities or data centers. There are a variety of different types of commercially available information-collection, information-streaming, and information-processing systems that may be used for data collection, transmission of collected data to various information processors, and for information processing, including Kafka streams and the Kafka Ktable abstraction. In the following discussion, the information collected by the agents is represented as being sent in a stream of messages, although, depending on the type of streaming system used, different types of language are used to describe the process of collecting and streaming information to stream processors. For example, when using Kafka, it is common to describe the agents as publishing information to topics. There are, of course, many ways to collect, transmit, and process information streams.

Figure 23A:
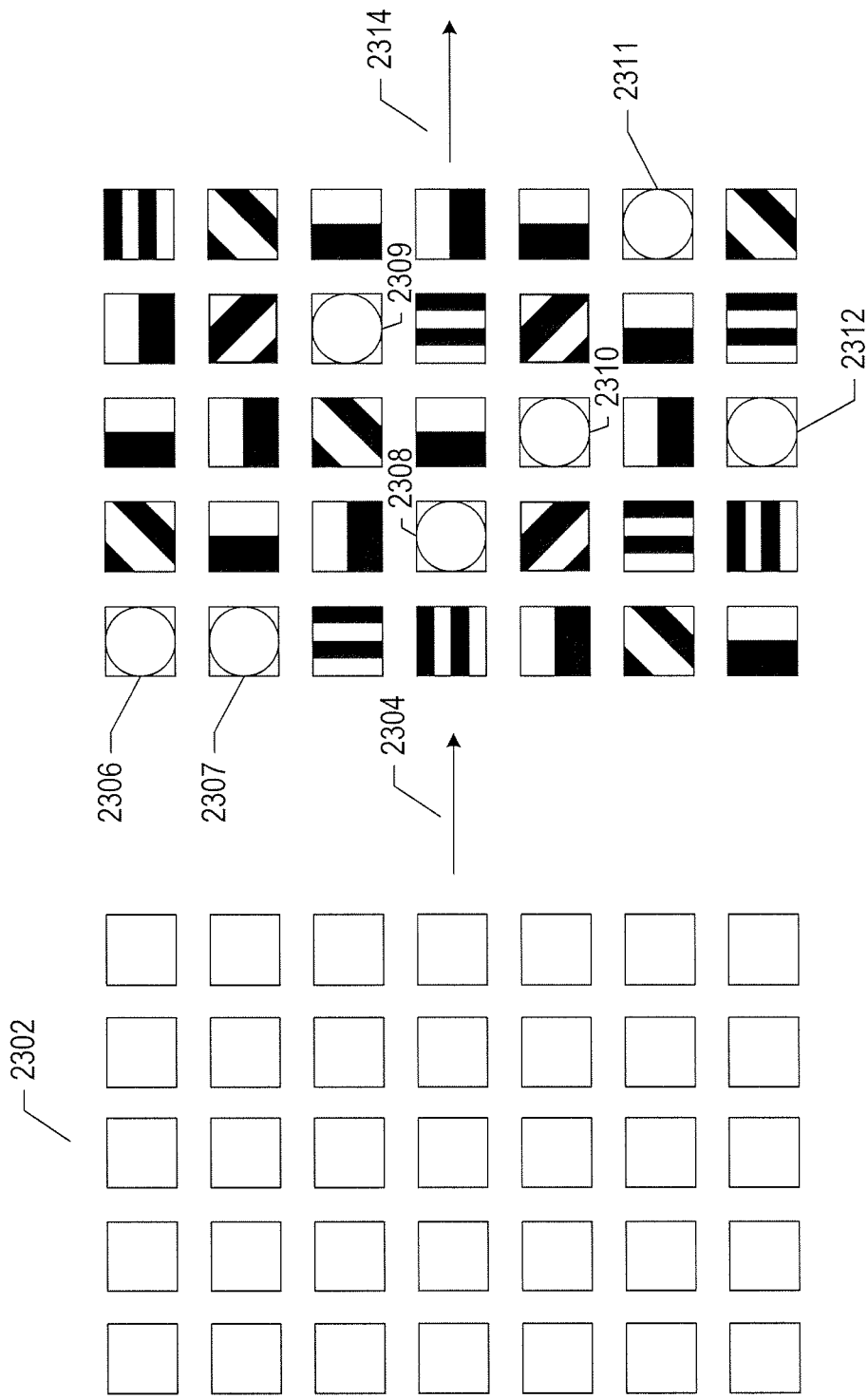
FIGS. 23A-23B show an overview of an application-discovery method.
Figure 23B:
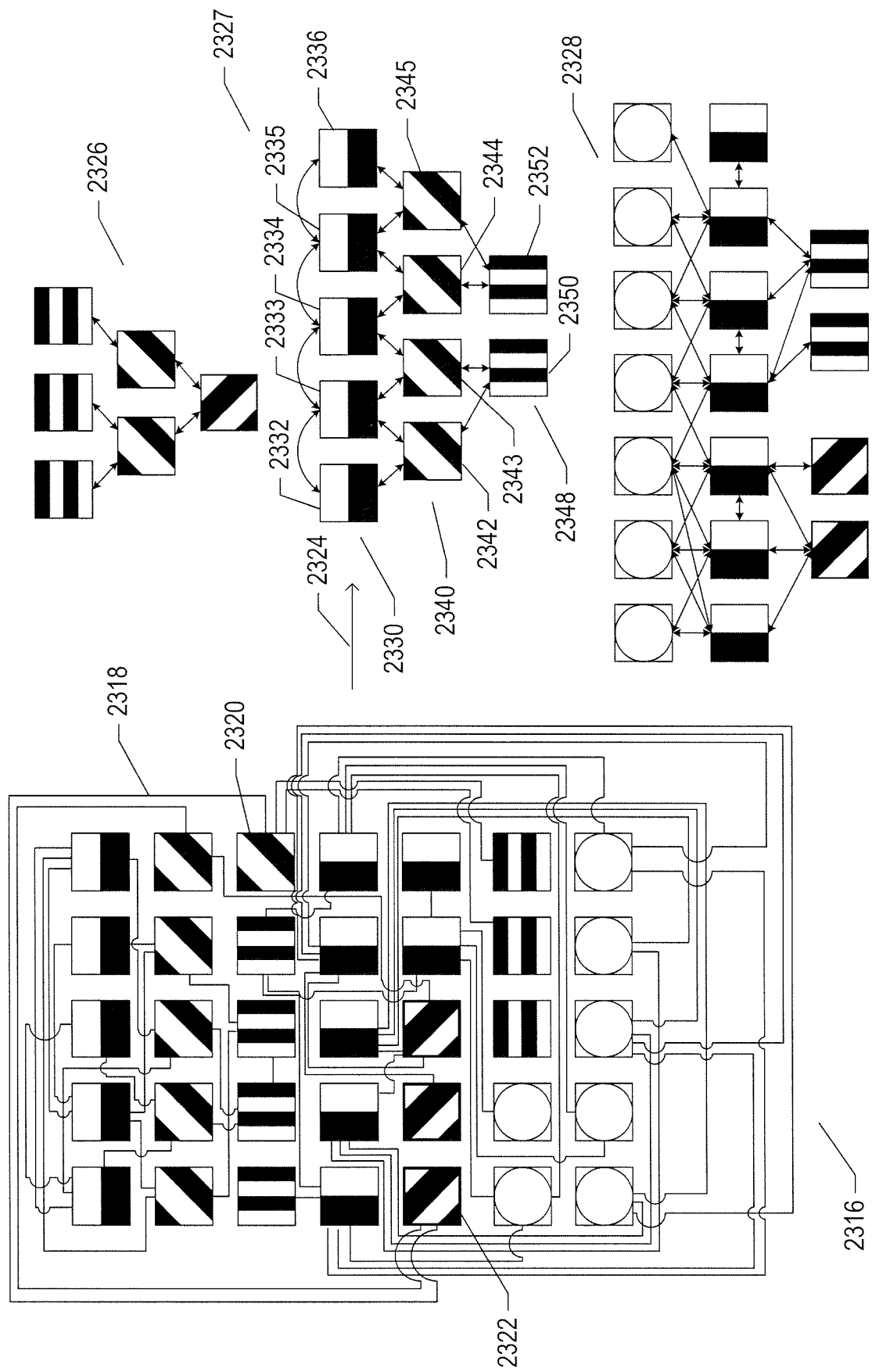

FIGS. 23A-23B provide an overview of the currently disclosed application-discovery method. In FIG. 23A, the rectangular set of nodes 2302 on the right-hand side of the figure represent the nodes comprising a distributed-computing facility. In a first step, represented by arrow 2304, the information streamed from agents within the nodes is used to classify the types of the nodes or, in other words, to partition the nodes into node groups, each of which represents a different node type. In FIG. 23A, different graphical patterns are used to indicate different types of nodes. For example, one type of node is represented by a circle inscribed within the node, so that nodes 2306-2312 together constitute a group of nodes 2302 corresponding to a particular node type. In a next step, represented by arrow 2314 and the connected-node diagram 2316 in FIG. 23B, additional information streamed from agents within the nodes is used to determine communications connections between the nodes. Each connection is represented by a path, such as the path 2318 that connects nodes 2320 and 2322. In the connected-node diagram 2316, the nodes have been rearranged so that the nodes of each type are co-located. In a third step, represented by arrow 2324, the node-type assignments and the node-to-node connections are used to organize the nodes into discrete applications 2326-2328. Each application comprises groups of the one or more nodes, referred to as "tiers," with each tier including nodes of a common type. For example, in application 2327, the highest-level tier 2330 consists of the five nodes 2332-2336, all with a node type represented by a pattern of two differently shaded horizontal subsections. In application 2327, a second-highest-level tier 2340 includes the 4 nodes 2342-2345, and a lowest-level tier 2348 includes the two nodes 2350 and 2352. The partitioning of the nodes into applications is carried out using connection information. One underlying premise of the currently disclosed implementation is that the nodes comprising an application are directly or indirectly interconnected with one another through communications paths or connections, while the nodes of two different applications are not connected by communications paths. A second underlying premise of the currently disclosed implementation is that all the nodes in each application tier have a common node type. The type of a node is determined from the command lines used to launch the processes executing within the node. A third underlying premise of the currently disclosed implementation is that nodes can be partitioned into groups of nodes with a common node type by grouping together those nodes that execute a common or similar set of processes. As is further discussed below, there are a variety of different computational methods that can be used for carrying out each of the four steps discussed above with reference to FIGS. 23A-23B.

Figure 24:
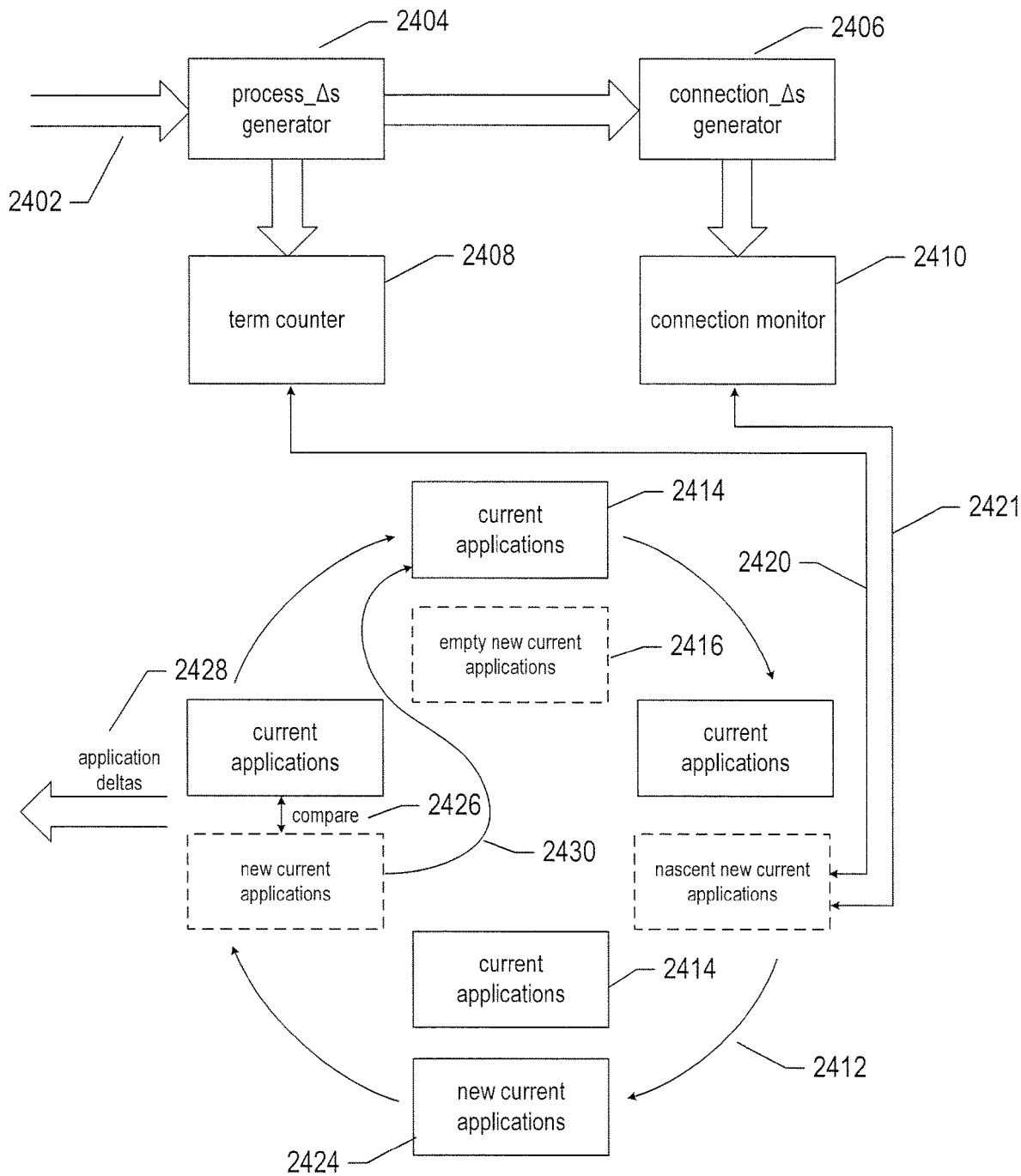
FIG. 24 shows an example of stream-processing components of an application discovery manager.

FIG. 24 illustrates the stream-processing components of the application discovery manager 2102. It should be noted that each of the stream-processing components may be distributed among multiple processes executing on one or more physical computer systems. The raw data collected by agents within nodes is streamed, as represented by arrow 2402, to a process-Δs generator 2404. Because the agents continuously collect node-describing information from the nodes in which they execute, much of the collected information is redundant, since the agent-collection-and-reporting cycle is generally much shorter that the cycle of change for most types of node-related information. It is a primary task of the process-Δs generator 2404 and the connection-Δs generator 2406, discussed below, to remove much of the redundant information and emit only messages or information describing changes, or Δs, in the data representations of the nodes. The process-Δs generator 2404 extracts process information from the raw data and generates Δs that represent the changes in the set of processes executing within nodes. The process-Δs generator 2404 additionally extracts communications-address information from the raw data and updates stored information representing the communications addresses associated with each node. The process Δs are streamed to a term counter 2408, discussed below. The connection-Δs generator 2406 extracts communications-connection information from the raw data and emits connection Δs that represent changes in the communications connections between nodes to the connection monitor 2410, discussed below. For purposes of discussion, it is assumed that the process-Δs generator emits one or more process-Δs messages in response to receiving a message from a node-embedded agent only when the set of processes executing within the node has changed during the most recent agent-collection-in-reporting cycle. Similarly, it is assumed that the connection-Δs generator emits one or more connection-Δs messages in response to receiving a message from a node-embedded agent only when the set of communications connections associated with the node has changed during the most recent agent-collection-in-reporting cycle.

In order to generate process Δs and connection Δs, the process-Δs generator 2404 and the connection-Δs generator 2406 maintain persistent information that represents the sets of processes and the sets of communications connections associated with each node. In one implementation, the process-Δs generator 2404, connection-Δs generator 2406, term counter 2408, and connection monitor 2410 are Kafka stream processors and maintain the persistent information in Kafka Ktables.

The term counter 2408 maintains a count of the relevant terms included in the command lines used to launch the processes currently executing in each node. These counts are used as the basis for partitioning nodes into groups of nodes with common types. The connection monitor maintains a set of node-to-node communications connections which represent the communications links or paths between nodes. This information is used by an application monitor 2412, represented by the cycle of steps in the lower portion of FIG. 24. Each execution of the cycle by the application monitor generates a set of application Δs that represents changes in the discovered set of applications within the distributed-computing facility. These application Δs are persistently stored by the currently disclosed system and may also be streamed or transmitted to application-Δs sinks, such as distributed-application administration-and-management tools, which separately maintain data representations of all the applications currently executing within a cloud-computing facility or other application-execution environment.

The application monitor maintains a data representation of the currently executing applications 2414 and, during each cycle, generates a new data representation of the currently executing applications 2416. Initially, the new data representation 2416 is empty, as indicated by the current-applications/new-current-applications pair 2414 and 2416 at the top of the cycle. In a first step, the process and connection information maintained by the term counter and connection monitor is used to generate a new data representation of the applications executing within the distributed-computing facility, with access to the information represented by double-headed arrows 2420 and 2421. The new data representation is then stored so that the application monitor has a current-applications data representation 2414 and a new-current-applications data representation 2424, as shown at the bottom of the cycle in FIG. 24. The current-applications data representation represents the currently executing applications in the distributed-computing facility as determined during the previous application-monitor cycle and the new-current-applications data representation 2424 represents a currently executing applications in the distributed-computing facility as determined during the current application-monitor cycle. In general, these two data representations should be quite similar, since the application-monitor cycle is far shorter than most application-related data-change cycles. By comparing 2426 the current-applications data representation to the new-current-applications data representation, in a third step of the cycle, the application monitor is able to emit a set of application Δs 2428 that allows application-Δs sinks to maintain data representations of the currently executing applications within the distributed-computing facility. In a final step of the application-monitoring cycle, the current-applications data representation is replaced by the new-current-applications data representation, as represented by curved arrow 2430, and the new-current-applications data representation is reinitialized or cleared.

Figure 25A:
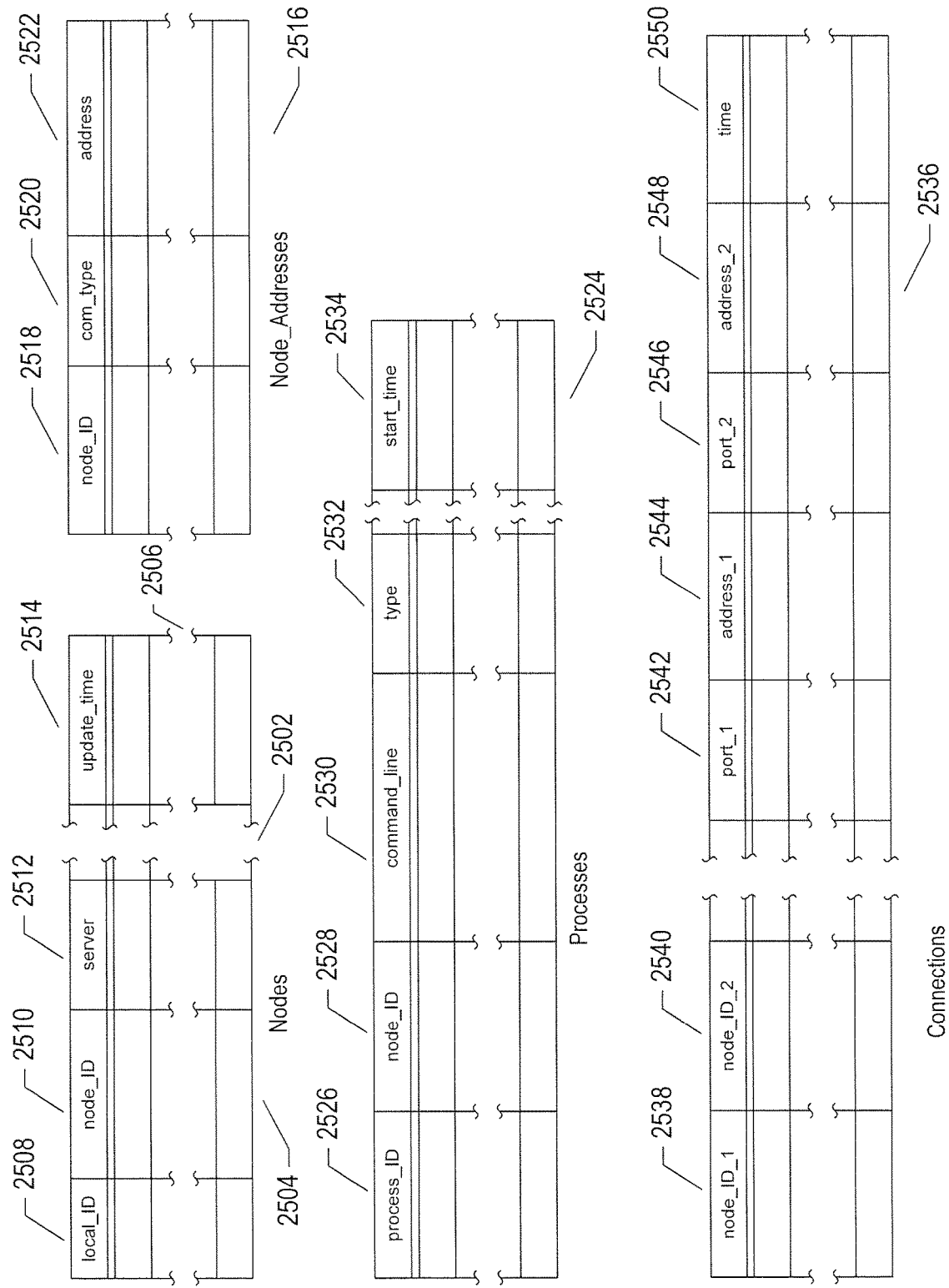
FIGS. 25A-25B show various tables used by components of the application discovery manager.
Figure 25B:
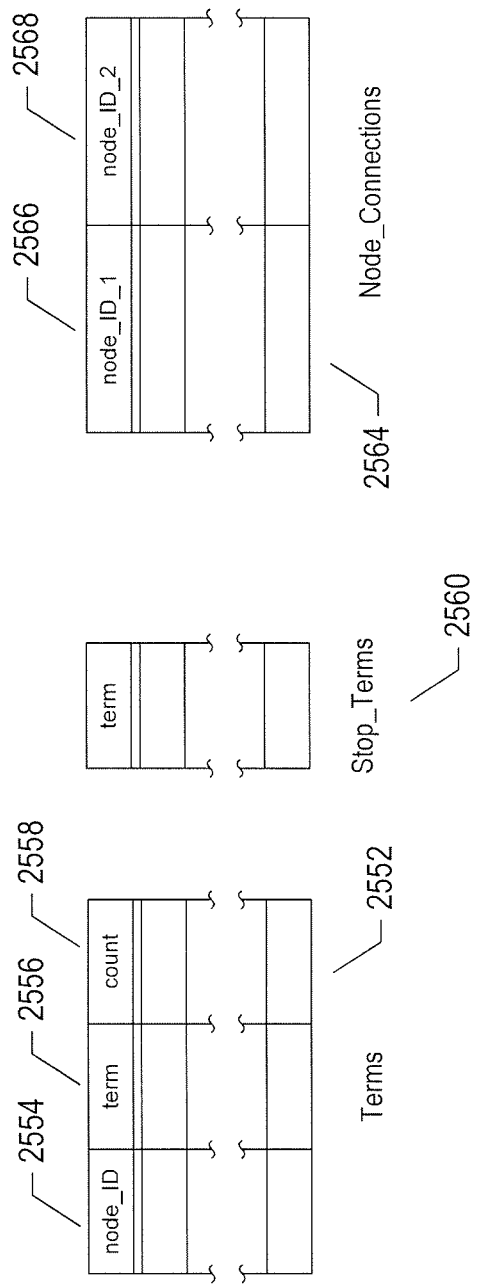

FIGS. 25A-25B show various tables used by the components of the application discovery manager 2102. FIG. 25A shows the tables used by the process-Δs generator 2404 and the connection-Δs generator. In most cases, a vertical broken-line column, such as vertical broken-line column 2502 in the table Nodes 2504, represents the fact that additional columns may be included in various different implementations. Similarly, a horizontal broken-line column, such as horizontal broken-line column 2506 in the table Nodes 2504, represents the fact that additional rows may be included in the table. Each row in the table Nodes 2504 represents a node in the distributed-computing facility. The columns of the table Nodes 2504, which correspond to fields within the records represented by rows, include: (1) local_ID 2508, a local identifier for the node; (2) node_ID 2510, a global identifier for the node is assigned to the node by the currently disclosed system; (3) server 2512, an identifier or description of the server in which the node executes; and (4) update_time 2514, the last point in time that an information message from the agent embedded in the node was received by the currently disclosed system. Each row in the table Node_Addresses 2516 represents a communications address within a node in the distributed-computing facility. The columns of the table Node_Addresses 2516 include: (1) node_ID 2518, the global identifier for the node; (2) com_type 2520, an indication of the type of communications address; and (3) address 2522, a numeric or alphanumeric representation of the communications address. Each row in the table Processes 2524 represents a process executing within a node in the distributed-computing facility. The columns of the table Processes 2524 include: (1) process_ID 2526, an identifier for the process; (2) node_ID 2528, the global identifier for the node; (3) command line 2530, the command line used to launch the process; (4) type 2532, an indication of the type of process; and (5) start_time 2534, the time when the process was launched. Each row in the table Connections 2536 represents a node-to-node communications connection. The columns of the table Connections 2536 include: (1) node_ID_1_2538, a global identifier for a first node; (2) node_ID_2 2540, the global identifier for a second node; (3) port_1 2542, the communications port on the first node; (4) address_1 2544, the communications address on the first node; (5) port_2 2546, the communications port on the second node; (6) address_2 2548, the communications address on the second node; and (7) time 2550, the time when the communications connection is established.

FIG. 25B shows the tables used by the term counter 2408 and the connection monitor 2410. Each row in the table Terms 2552 represents the count of the occurrences of a particular term in the command lines for the processes currently executing on the node. The columns of the table Terms 2552 include: (1) node_ID 2554, a global identifier for the node; (2) term 2556, a term used in the command line used to launch 1 of the processes currently executing on the node; and (3) count 2558, the number of occurrences of the term in the command lines used to launch the processes currently executing on the node. Each row in the table Stop_Terms 2560 represents a term that is to be ignored when it occurs in a command line used to launch a process. Each row in the table Node_Connections 2564 represents a node-to-node connection. The columns of the table Node_Connections 2564 include: (1) node_ID_1 2566, a global identifier for the first node of the connection; and (2) node_ID_2 2568, the global identifier for the second node of the connection.

Analytics Services Manager

Figure 26:
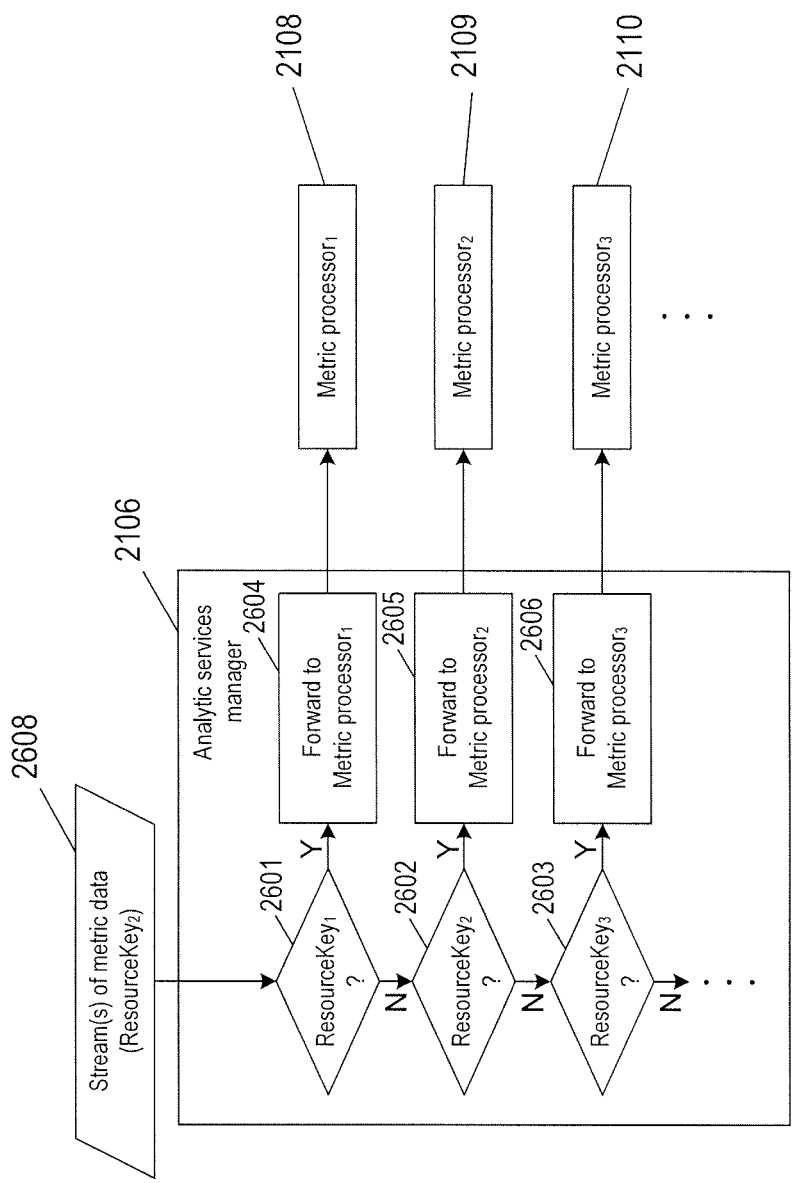
FIG. 26 shows an example implementation of an analytics services manager.

FIG. 26 shows an example implementation of the analytics services manager 2106 of the management system 2100 described above. Each metric processor is registered with a registration key that the analytics services manager 2106 uses to route one or more streams of metric data to a corresponding metric processor. In the example of FIG. 26, a series of decision blocks 2601-2603 represent operations in which the resource key of each metric received by the analytics services manager 2106 is checked against the resource keys of registered metric processors. Blocks 2604-2606 represent forwarding operations that correspond to the decision blocks 2601-2603 in which one or more metrics with a resource key that matches one of the registration keys is forwarded to one of the corresponding metric processors 2108-2110. For example, FIG. 26 shows an example of one or more streams of metric data 2608 with a resource key denoted by "ResourceKey$_2$" input to the analytics services manager 2106. The resource key is checked against the registered resource keys maintained by the analytics services manager 2106. Because the resource key "ResourceKey$_2$" matches the registered resource key represented by decision block 2602, control flows to block 2605 in which the one or more streams of metric data are forwarded to metric processor 2109. The metrics may also be copied to the metrics database 2118 in FIG. 21.

The analytics services manager 2106 manages the life cycle of each metric processor. The analytics service manager 2106 may, for example, tear down a metric processor when requested by a user and may reconstruct a metric processor when instructed by a user by resetting and replaying historical metrics stored in the metrics database 2118. Each metric processor may update and construct models of metric data that are used to forecast metric data when a request for a forecast is requested by a user. Each metric processor also constructs performance models that are used to detect anomalies in one or more streams of metric data sent to the management system 2100.

An anomaly is a pattern of behavior that does not conform to or deviates from a defined notion of normal behavior. There are three typical types of anomalies that are typically exhibited in one or more streams of metric data and are detected by metric processors described herein:

1. Point anomalies: A metric value is anomalous with respect to the rest of the metric values in a stream of metric data (e.g. occurs when a VM exhibits a spike in CPU usage);

2. Contextual anomalies: Metric values are anomalous in a specific context, but not in other contexts (e.g. a VM exhibits a spike in CPU usage when the VM should be idle, such as in the middle of night); and 3. Collective anomalies: A collection of metric values of related streams of metric data exhibit anomalous behavior with respect to the streams of metric data, but the metric values considered independently do not exhibit anomalous behavior.

The performance models are constructed with the assumption that normal metric values occur with a high probability and anomalous metric values occur with a low probability. The performance models can be used to detect anomalous metric values belonging to the low probability occurrences. The performance models may be run efficiently together, are predicated on different assumptions about the metrics, and are complementary with respect to detecting anomalous patterns in the streams of metric data and different types of anomalies. Processes and system use the following three types of performance models:

Parametric performance models. Parametric performance models are predicated on the assumption that normal metric values fit a predictable probability density function. To determine whether a new metric value is anomalous, a parametric performance model may be calculated based on the probability density function of the associated stream of metric data and compared to a threshold to detect anomalous behavior. For example, metric values of normally behaving related streams of metric data are distributed according to a normal distribution. The parametric performance model is computed for each new metric value of the related streams of metric data. Each parametric performance model value indicates how far the metric value is from the mean of the other metric values of the related streams of metric data. A parametric performance model value that exceeds a threshold is an indication of an anomalous behavior.

Regression-based performance models. With regression-based techniques, forecast models are fit to observed metric data. The forecast models are generated for stochastic data, pulse data, and seasonal data. A residual error is maintained between the observed data and a forecast value produced by the forecast model. Confidence intervals are determined for the forecast metric data. The confidence intervals are used as thresholds for detecting anomalous behavior. New metric values located within the confidence intervals are normal, while new metric values that are located outside the confidence intervals are an indication of anomalous behavior.

Signal processing-based performance models. Signal processing-based techniques transform each stream of metric data from the space-time domain to that space-frequency domain. A change in the oscillating frequency (i.e., period) of the metric values are an indication of anomalous behavior.

The performance models described below provide the following advantages: 1) The metric processor updates parameters of the performance models as new metric values arrive. As a result, the performance models are up to date at any point in time. 2) The performance models receive streaming updates and do not have to be recomputed from historical metric data. As a result, each metric processor maintains an efficient bounded memory footprint with anomaly detection and forecast operations at low computational cost. 3) The performance models provide explainable anomalies to users, enabling users to avoid getting bogged down with more information than is necessary to understand the anomalous behavior.

The management system 2100 maintains a general-purpose, high-performance library of the performance models. Each performance model provides reliable real-time anomaly detection. The library of performance models is available for multiple products that have need for anomaly detection. The metric processors support forecasting and anomaly detection on multivariate streams of metric data.

Figure 27A:
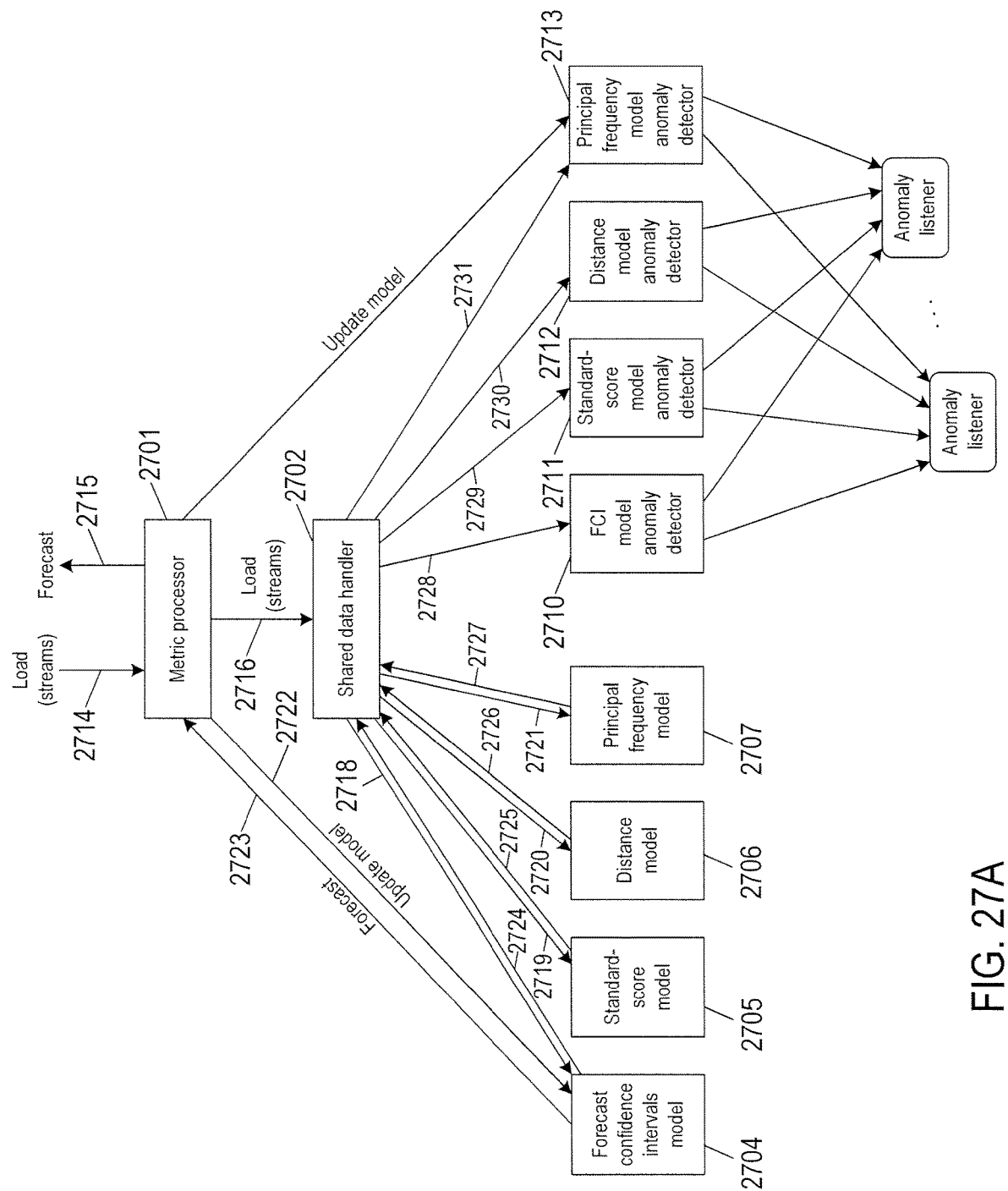
FIG. 27A shows a diagram of example classes and function calls performed by a metric processor.
Figure 27B:
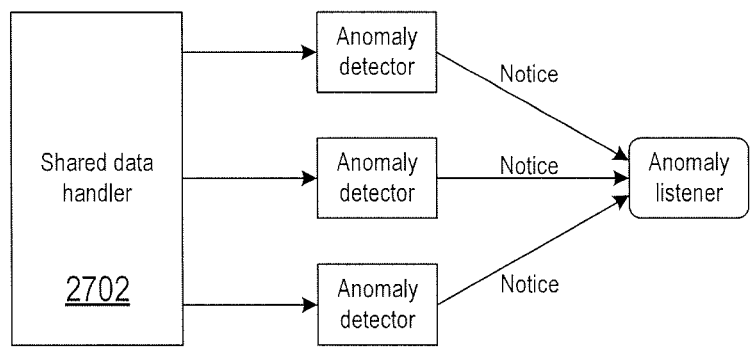
FIG. 27B shows an example of anomaly detectors that notify a single anomaly lister of anomalous behavior.
Figure 27C:
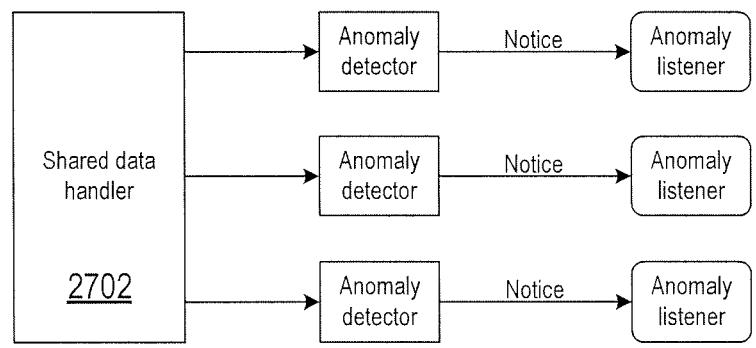
FIG. 27C shows an example of anomaly detectors that notify corresponding anomaly detectors of anomalous behavior.

FIG. 27A shows a diagram of example classes and function calls performed by a metric processor. Blocks 2701, 2702, 2704-2707, and 2710-2713 represent logical classes, such as Java classes, and directional arrows represent function calls performed by the classes. Directional arrow 2714 represents a function call that loads multiple streams of metric data to a metric processor 2701. Directional arrow 2715 represents a function call that outputs a forecast from the metric processor 2701 as described below with reference to FIGS. 28 and 29. The function calls that load the streams of metric data and output the forecast may be performed by the analytics services manager 2602. Directional arrow 2716 represents a function call that loads the streams of metric data to a shared data handler 2702. Directional arrows 2718-2721 represent function calls that load the streams of metric data to a forecast confidence intervals model 2704, a standard-score model 2705, a distance model 2706, and a principal-frequency model 2707. The forecast confidence intervals, standard-score, distance, and principal-frequency models 2704-2707 are examples of performance models that enable identification of different types of anomalies in the loaded streams of metric data. Each of the performance models 2704-2707 is describe below. Directional arrow 2722 represents a function call that updates the performance models based on the most recently received metric values of the streams of metric data. Directional arrow 2715 represents a function call that returns a requested forecast from the forecast confidence intervals model 2704. Directional arrows 2724-2727 represent function calls that return one or more of the performance models to the shared data handler 2702. As shown in FIG. 27A, the metric processor supports anomaly detectors 2710-2713 that correspond to the performance models 2704-2707. Directional arrow 2728 represents a function call that sends the forecast confidence intervals model obtained in block 2704 to a forecast confidence intervals model anomaly detector 2710 that performs forecast confidence intervals model anomaly detection described below. Directional arrow 2729 represents a function call that sends the standard-score model obtained in block 2705 to a standard-score model anomaly detector 2711 that performs standard-score model anomaly detection described below. Directional arrow 2730 represents a function call that sends the distance model obtained in block 2706 to a distance model anomaly detector 2712 that performs distance model anomaly detection described below. Directional arrow 2731 represents a function call that sends the principal-frequency model obtained in block 2707 to a principal-frequency model anomaly detector 2713 that performs principal-frequency model anomaly detection described below. Each anomaly detector comprises machine-readable instructions executed on one or more processors of a computer system that evaluates the corresponding performance model to detect anomalous behavior in real time. When an anomaly is detected by an anomaly detector, the anomaly detectors report the anomaly to an anomaly listener. The anomaly listener may a user console that enables a user, whose virtual objects running in the distributed computing system are adversely affected by the anomalous behavior, to be aware of the anomalous behavior. The anomaly listener may be an IT administrator console that enables an administrator of the distributed computing system to be made aware of the anomaly. The anomaly detectors may notify a single anomaly lister of anomalous behavior detected by two or more anomaly detectors as shown in FIG. 27B. Alternatively, each anomaly detector sends a notice to of anomalous behavior a corresponding anomaly detector as shown in FIG. 27C.

Forecasting Metric Data

A metric processor maintains a limited history of each stream of metric data in order to forecast metric data. The duration of a sequence of metric values comprising a limited history for a metric may vary, depending on the resource. For example, when the resource is a CPU of a server computer, the limited history may be comprised of a sequence of CPU usage collected over an hour, day, or a week. On the other hand, when the resource is CPU usage for a cluster of server computers that run a data center tenant's applications, the limited history of metric may comprise sequences of metric data collected over days, weeks, or months. Because each metric processor updates the performance models when new metric values received and maintains a limited history of each metric for forecasting, each metric processor uses a bounded memory footprint, uses a relatively small computational load, and computes a forecast and detects anomalous behavior at a low computational cost.

Figure 28:
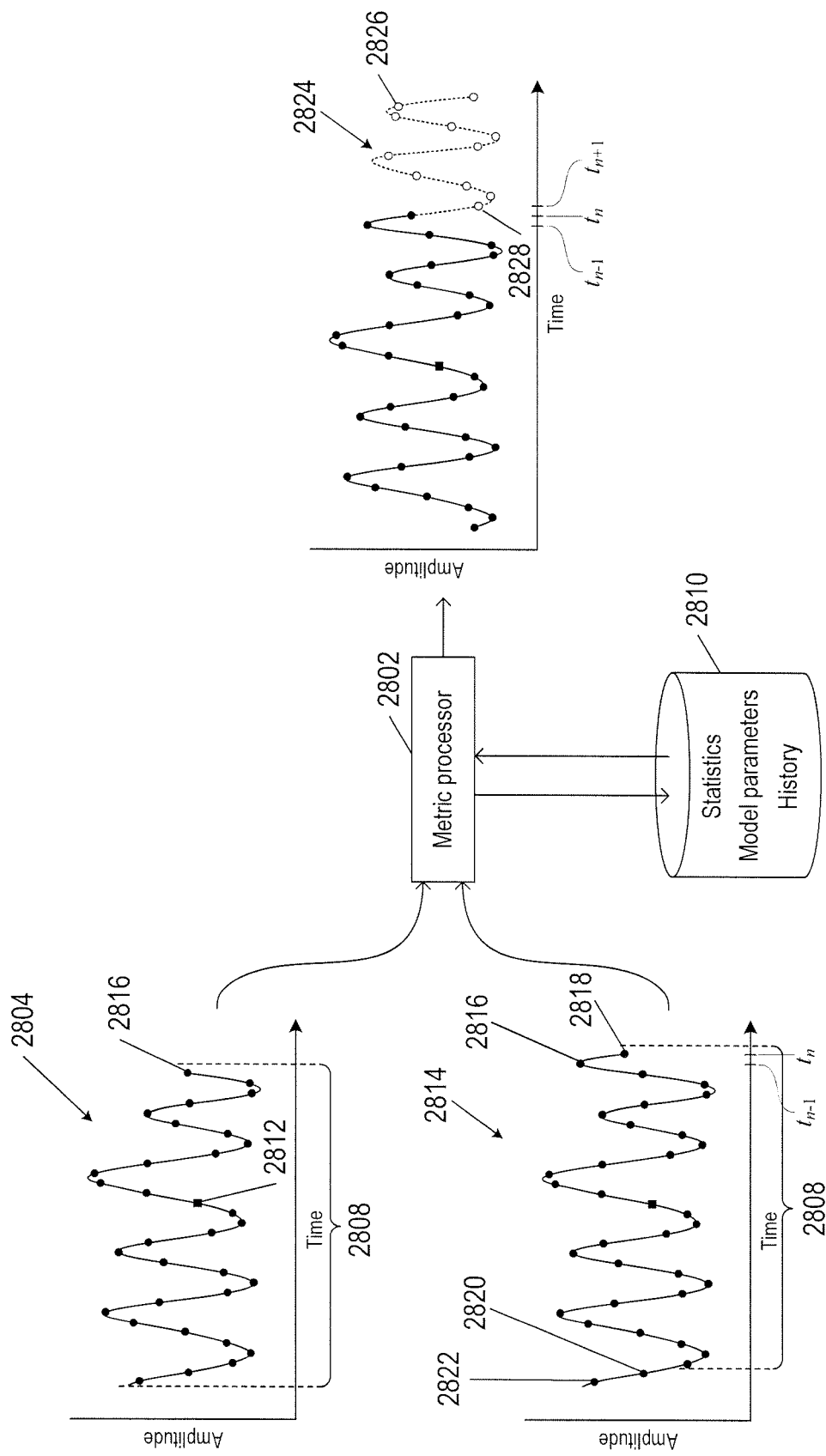
FIG. 28 shows an example of a forecast produced by a metric processor.

When metric values of multiple streams of metric data arrive at the analytics services manager 2602, each metric processor may be queried to generate a real time metric data forecast for each stream of metric data sent to the metric processor as follows. FIG. 28 shows an example of a limited history of metric data maintained by a metric processor 2802. Plot 2804 displays data points of a limited history of metric data maintained by the metric processor 2802. For example, point 2806 represents a recently forwarded metric value of the limited history of metric data recorded in a data-storage device 2810. The limited history of metric data is contained in a historical window 2808 of duration D. The historical window 2808 contains a sequence of metric data with time stamps in a time interval $[t_n-D, t_n]$, where subscript n is a positive integer time index, and $t_n$ is the time stamp of the most recently received metric value $x_n$ added to the limited history and in the historical window. Ideally, consecutive metric values forwarded to the metric processor 2802 have regularly spaced time stamps with no gaps. Interpolation is used to fill in any gaps or missing metric data in the limited history of metric data. For example, square-shaped metric value 2812 represents an interpolated metric value in the limited history of metric data. Interpolation techniques that may be used to fill in missing metric values include linear interpolation, polynomial interpolation, and spline interpolation. The metric processor 2802 computes statistical information and forecast model parameters based on the limited history of metric data 2804 and records the statistical information and forecast model parameters in the data-storage device 2810. The historical window 2808 advances in time to include the most recently received metric values and discard a corresponding number of the oldest metric values from the limited history of metric data. Plot 2814 displays data points of an updated limited history of metric data. Points 2816 and 2818 represents two recently received metric values added to the limited history of metric data. Points 2820 and 2822 represent older metric values outside the historical window 2808 and are discarded from data storage. The metric data in the historical window 2808 are called "lags" and a time stamp of a lag is called "lag time." For example, metric data 2816 and 2818 are called lags and the corresponding time stamps values $t_{n-1}$ and $t_n$ and called lag times. The metric processor 2802 computes statistical information and updates model parameters stored in the data-storage device 2810 based on the latest limited history of metric data 2814.

When a forecast request is received by the metric processor 2802, the metric processor 2802 computes a metric data forecast. The metric processor 2802 computes forecast metric values in a forecast interval at regularly spaced lead time stamps represented by open points. FIG. 28 shows a plot of forecast metric data 2824 represented by open points, such as open point 2826, appended to the latest limited history of metric data. For example, a first forecast metric value 2828 occurs at lead time stamp $t_{n+1}$.

Each metric value in a stream of metric data may be decomposed as follows:

$$x_i = T_i + A_i + S_i \qquad (2)$$

where i=1, ..., n;

n is the number of metric values in the historical window;

$T_i$ is the trend component;

$A_i$ is the stochastic component; and $S_i$ is the seasonal or periodic component.

Note that certain streams of metric data may have only one component (e.g., $A_i \neq 0$ and $T_i = S_i = 0$, for all i). Other streams may have two components (e.g., $A_i \neq 0$, $S_i \neq 0$, and $T_i = 0$, for all i). And still other streams may have all three components.

Figure 29:
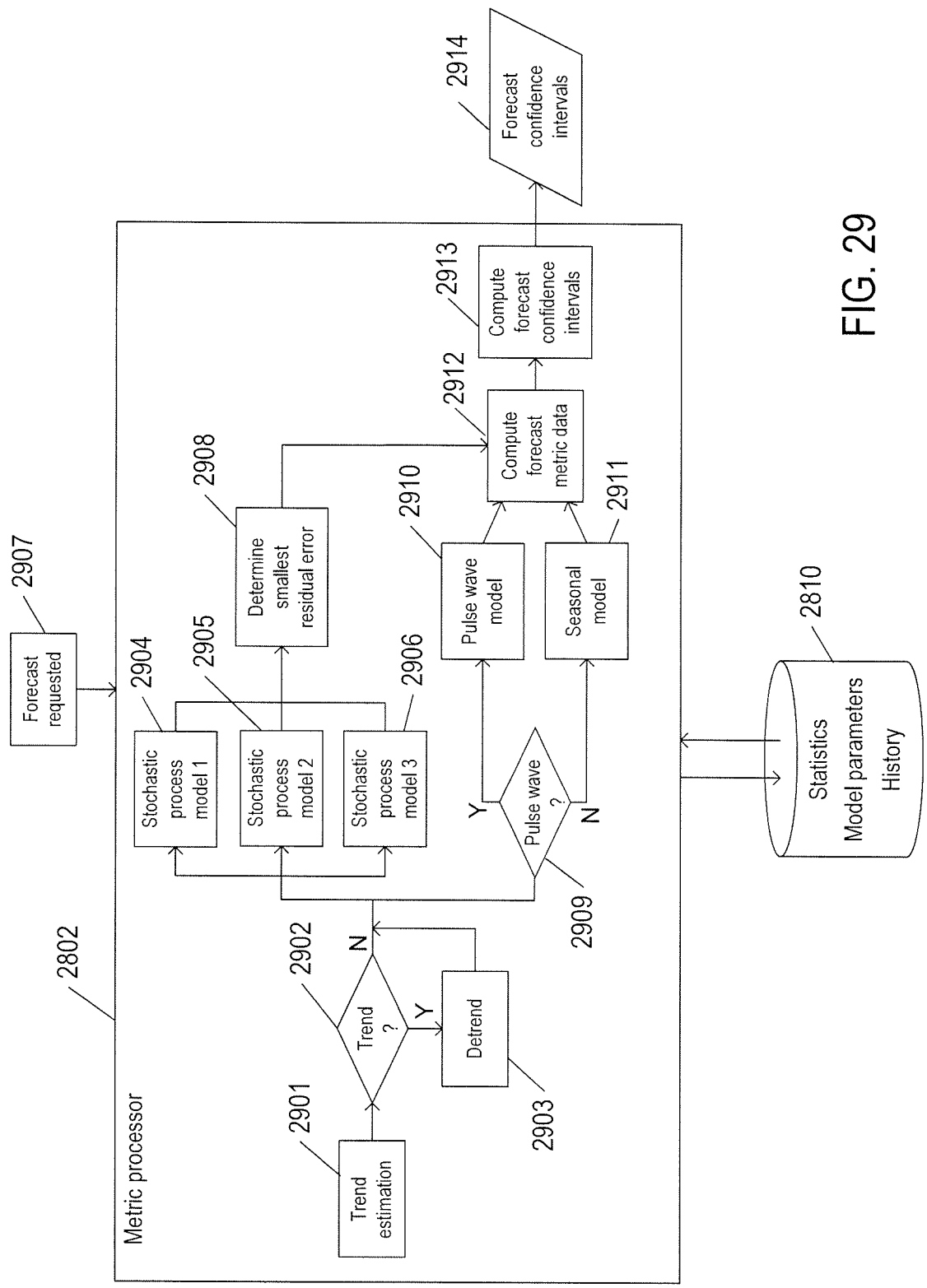
FIG. 29 shows an overview of example processing operations carried out by a metric processor to generate forecast confidence intervals for forecast data.
Figure 30A:
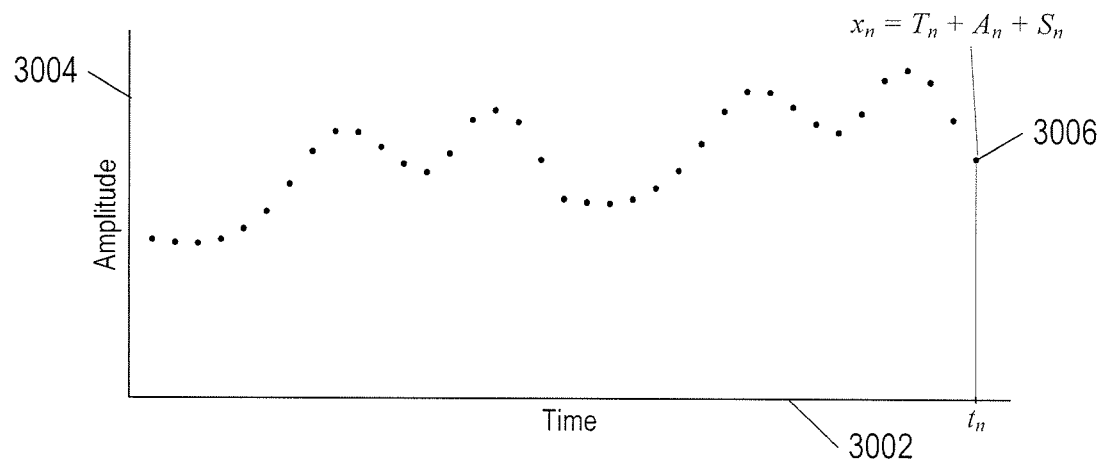
FIGS. 30A-30C show an example of computing a trend estimate and detrending metric data within a historical window.
Figure 30B:
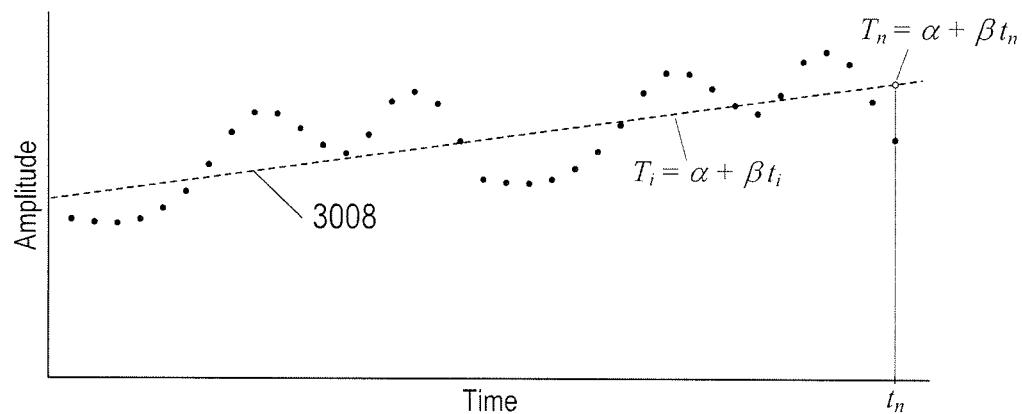
Figure 30C:
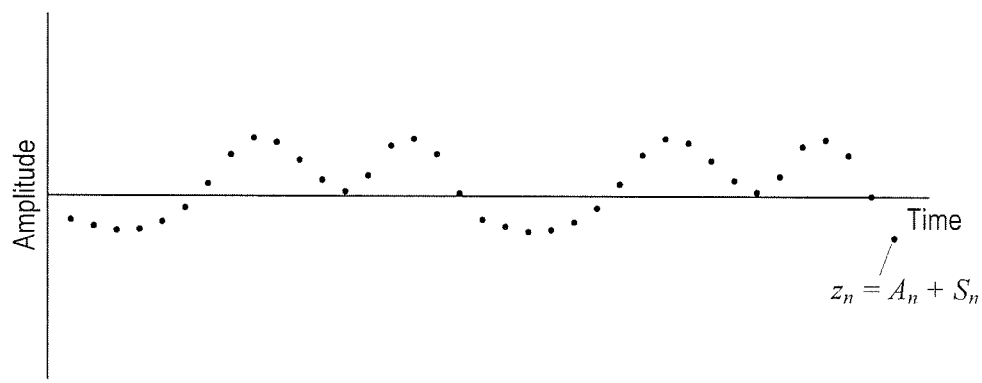

FIG. 29 shows an overview of example processing operations carried out by the metric processor 2802 to generate forecast confidence intervals for the forecast data. FIGS. 30A-30C show an example of computing a trend estimate and detrending metric data within a historical window. The latest metric data 2814 within the historical window 2808 is input to the metric processor 2802. The historical window contains the latest sequence of metric data in the limited history. In block 2901, a trend estimate of the metric data in the historical window is computed. In decision block 2902, if the trend estimate fails to adequately fit the metric data in the historical window, the metric data is non-trendy. On the other hand, if the trend estimate adequately fits the sequence of metric data, the sequence of metric data in the historical window is trendy and control flows to block 2903 where the trend estimate is subtracted from the metric data to obtain a detrended sequence of metric data over the historical window.

FIGS. 30A-30C show an example of computing a trend estimate and detrending metric data within a historical window. In FIGS. 30A-30C, horizontal axes, such as horizontal axis 3002, represent time. Vertical axes, such as vertical axis 3004, represent the amplitude range of the metric data in the historical window. In FIG. 30A, the values of the metric data represented by points, such as point 3006, vary over time, but a trend is recognizable by an overall increase in metric values with increasing time. A linear trend may be estimated over the historical window by a linear equation given by:

$$T_i = \alpha + \beta t_i \qquad (3a)$$

where $\alpha$ is vertical axis intercept of the estimated trend;

$\beta$ is the slope of the estimated trend;

i=1, ..., n; and n is the time index of the most recently added metric value to sequence of metric data with a time stamp in the historical window.

The index i is the time index for time stamps in the historical window. The slope $\alpha$ and vertical axis intercept $\beta$ of Equation (3a) may be determined by minimizing a weighted least squares equation given by:

$$L = \sum_{i=1}^{n} w_i (x_i - \alpha - \beta t_i)^2 \qquad (3b)$$

where $w_i$ is a normalized weight function.

Normalized weight functions $w_i$ weight recent metric values higher than older metric values within the historical window. Examples of normalized weight functions that give more weight to more recently received metric values within the historical window include $w_i = e^{(i-n)}$ and $w_i = i/n$, for $i=1, \ldots, n$. The slope parameter of Equation (3a) is computed as follows:

$$\beta = \frac{\sum_{i=1}^{n} w_i (t_i - t_w)(x_i - x_w)}{\sum_{i=1}^{n} w_i (t_i - t_w)^2} \qquad (3c)$$

$$t_w = \frac{\sum_{i=1}^{n} w_i t_i}{\sum_{i=1}^{n} w_i}$$

$$x_w = \frac{\sum_{i=1}^{n} w_i x_i}{\sum_{i=1}^{n} w_i}$$

The vertical axis intercept parameter of Equation (3a) is computed as follows:

$$\alpha = x_w - \beta t_w \qquad (3d)$$

In other implementations, the weight function may be defined as $w_i \equiv 1$.

A goodness-of-fit parameter is computed as a measure of how well the trend estimate given by Equation (3a) fits the metric values in the historical window:

$$R^2 = \frac{\sum_{i=1}^{n} (T_i - x_w)^2}{\sum_{i=1}^{n} (x_i - x_w)^2} \qquad (4)$$

The goodness-of-fit $R^2$ ranges between 0 and 1. The closer $R^2$ is to 1, the closer linear Equation (3a) is to an accurate estimate of a linear trend in the metric data of the historical window. In decision block 2802 of FIG. 28, when $R^2 \leq Th_{trend}$, where $Th_{trend}$ is a user defined trend threshold less than 1, the estimated trend of Equation (3a) is not a good fit to the sequence of metric values and the sequence of metric data in the historical window is regarded as non-trendy metric data. On the other hand, when $R^2 > Th_{trend}$, the estimated trend of Equation (3a) is recognized as a good fit to the sequence of metric data in the historical window and the trend estimate is subtracted from the metric values. In other words, when $R^2 > Th_{trend}$, for $i=1, \ldots, n$, the trend estimate of Equation (3a) is subtracted from the sequence of metric data in the historical window to obtain detrended metric values:

$$z_i = x_i - T_i \qquad (5)$$

where "z" denotes non-trendy or detrended metric values.

In FIG. 30B, dashed line 3008 represents an estimated trend of the sequence of metric data. The estimated trend is subtracted from the metric values according to Equation (5) to obtain a detrended sequence of metric data shown in FIG. 30C. Although metric values may vary stochastically within the historical window, with the trend removed as shown in FIG. 30C, the metric data is neither generally increasing nor decreasing for the duration of the historical window.

Returning to FIG. 29, as recently forwarded metric values are input to the metric processor 1802 and a corresponding number of oldest metric values are discarded from the historical window, as described above with reference to FIG. 28, the metric processor 2802 updates the slope and vertical axis intercepts according to Equations (3b) and (3c), computes a goodness-of-fit parameter according to Equation (4), and, if a trend is present, subtracts the trend estimate according to Equation (5) to obtain a detrended sequence of metric data in the historical window. If no trend is present in the metric data of the historical window as determined by the goodness-of-fit in Equation (4), the sequence of metric data in the historical window is non-trendy. In either case, the sequence of metric data output from the computational operations represented by blocks 2901-2903 is called a sequence of non-trendy metric data and each non-trendy metric value is represented by $$z_i = A_i + S_i \qquad (6)$$

where $i = 1, \ldots, n$.

The mean of the non-trendy metric data in the historical window is given by:

$$\mu_z = \frac{1}{n} \sum_{i=1}^{n} z_i$$

When the metric data in the historical window has been detrended according to Equation (5) and $R^2 > Th_{trend}$, the mean $\mu_z = 0$. On the other hand, when the metric data in the historical satisfies the condition $R^2 \leq Th_{trend}$, then it may be the case that the mean $\mu_z \neq 0$.

In alternative implementations, computation of the goodness-of-fit $R^2$ is omitted and the trend is computed according to Equations (3a)-(3d) followed by subtraction of the trend from metric data in the historical window according to Equation (5). In this case, the mean of the metric data $\mu_z$ equals zero in the discussion below.

The sequence of detrended or non-trendy metric data may be either stationary or non-stationary metric data. Stationary non-trendy metric data varies over time in a stable manner about a fixed mean. Non-stationary non-trendy metric data, on the other hand, the mean is not fixed and varies over time. For a stationary sequence of non-trendy metric data, the stochastic process models 2904-2906 in FIG. 29 may be autoregressive moving-average ("ARMA") models 2906-2908 computed separately for the stationary sequence of metric data in the historical window. An ARMA model is represented, in general, by $$\phi(B) z_n = \theta(B) a_n \qquad (7a)$$

where
B is a backward shift operator;

$$\phi(B) = 1 - \sum_{i=1}^{p} \phi_i B^i$$

$$\theta(B) = 1 - \sum_{i=1}^{q} \phi_i B^i$$

$a_n$ is white noise;
$\phi_i$ is an i-th autoregressive weight parameter;
$\theta_i$ is an i-th moving-average weight parameter;
p is the number of autoregressive terms called the "autoregressive order;" and
q is the number of moving-average terms called the "moving-average order;"
The backward shift operator is defined as $Bz_n = z_{n-1}$ and $B^i z_n = z_{n-i}$. In expanded notation, the ARMA model is represented by $$z_n = \sum_{i=1}^{p} \phi_i z_{n-i} + a_n + \mu_z \Phi + \sum_{i=1}^{q} \theta_i a_{n-i} \quad (7b)$$

where $\Phi = 1 - \phi_1 - \cdots - \phi_p$.

The white noise parameters $a_n$ may be determined at each time stamp by randomly selecting a value from a fixed normal distribution with mean zero and non-zero variance. The autoregressive weight parameters are computed from the matrix equation:

$$\vec{\phi} = P^{-1} \vec{\rho} \quad (8)$$

where $$\vec{\phi} = \begin{bmatrix} \phi_1 \\ \vdots \\ \phi_p \end{bmatrix};$$

$$\vec{\rho} = \begin{bmatrix} \rho_1 \\ \vdots \\ \rho_p \end{bmatrix}; \text{ and}$$

$$P^{-1} = \begin{bmatrix} 1 & \rho_1 & \cdots & \rho_{p-1} \\ \rho_1 & 1 & \cdots & \rho_{p-1} \\ \vdots & \vdots & \ddots & \vdots \\ \rho_{p-1} & \rho_{p-1} & \cdots & 1 \end{bmatrix}^{-1}$$

The matrix elements are computed from the autocorrelation function given by:

$$\rho_k = \frac{\gamma_k}{\gamma_0} \quad (9)$$

where $$\gamma_k = \frac{1}{n} \sum_{i=1}^{n-k} (z_i - \mu_z)(z_{i+k} - \mu_z)$$

$$\gamma_0 = \frac{1}{n} \sum_{i=1}^{n} (z_i - \mu_z)^2$$

The moving-average weight parameters may be computed using gradient descent. In the Example of FIG. 29, the metric processor 1802 computes three separate stochastic process models 2904-2906 for stationary sequence of non-trendy metric data in the latest historical window. For example, when the historical window of the sequence of non-trendy metric data is updated with recently received non-trendy metric values, three sets of autoregressive and moving average weight parameters are computed for each the three ARMA models denoted by $ARMA(p_1, q_1)$, $ARMA(p_2, q_2)$, and $ARMA(p_3, q_3)$.

Figure 31:
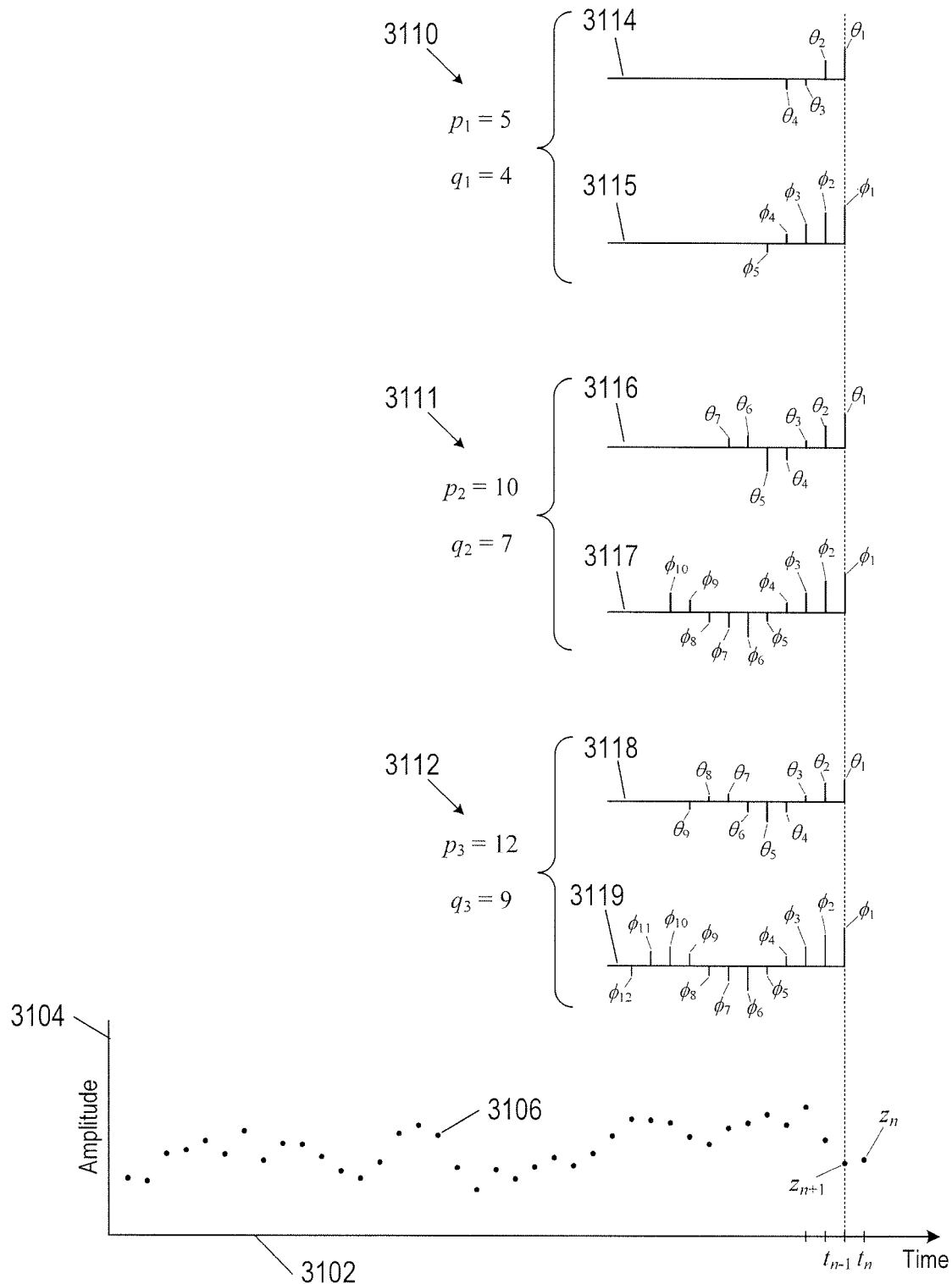
FIG. 31 shows example weight parameters for three autoregressive models.

FIG. 31 shows example weight parameters for three ARMA models $ARMA(p_1, q_1)$, $ARMA(p_2, q_2)$, and $ARMA(p_3, q_3)$. Horizontal axis 3102 represents time. Vertical axis 3104 represents a range of amplitudes of a stationary sequence of non-trendy metric data. Points, such as point 3106, represent metric values in a historical window. FIG. 31 includes plots of three example sets of autoregressive and moving average weight parameters 3110-3112 for three different autoregressive and moving-average models. For example, ARMA model $ARMA(p_3, q_3)$ 3112 comprises twelve autoregressive weight parameters and nine moving-average weight parameters. The values of the autoregressive weight parameters and moving-average weight parameters are computed for the stationary sequence of non-trendy metric data in the historical window. Positive and negative values of the autoregressive weight parameters and moving-average weight parameters are represented by line segments that extend above and below corresponding time axes 3114-3119 and are aligned in time with time stamps of the non-trendy metric data.

Prior to updating the stochastic process models, when a new metric value $x_{n+1}$ is received by the metric processor 2802, the new metric value is detrended according to Equation (5) to obtained detrended metric value $z_{n+1}$ and a corresponding estimated non-trendy metric value $z_{n+1}^{(m)}$ is computed using each of the stochastic process models 2904-2906, where superscript (m) denotes a forecast metric value for the m-th stochastic process. For example, the estimated non-trendy metric value $z_{n+1}^{(m)}$ may be computed using each of the ARMA models $ARMA(p_m, q_m)$ as follows:

$$z_{n+1}^{(m)} \sum_{i=1}^{p_m} \phi_i z_n + a_{n+1} + \mu_z \Phi + \sum_{i=1}^{q_m} \theta_i a_n \quad (10)$$

where m equals 1, 2, and 3.

Separate accumulated residual errors are computed for each stochastic model as new metric values are received by the metric processor 1702 as follows:

$$\text{Error}(p_m, q_m) = \sum_{i=1}^{n} \left(z_{n+1}^{(m)} - z_{n+1}\right)^2 \quad (11)$$

where
$z_{n+1}$ is a latest non-trendy metric value received by the metric processor 2902 at time stamp $t_{n+1}$;
$z_{n+1}^{(m)}$ is an estimated non-trendy metric value computed using the ARMA model $ARMA(p_m, q_m)$ at the time stamp $t_{n+1}$; and
$(z_{n+1}^{(m)} - z_{n+1})^2$ is a residual error at the time stamp $t_{n+1}$.
After the accumulated residual error is computed, the limited history of metric data is updated as described above with reference to FIG. 18 and the parameters of the stochastic process models 2904-2906 are updated.

Figure 32:
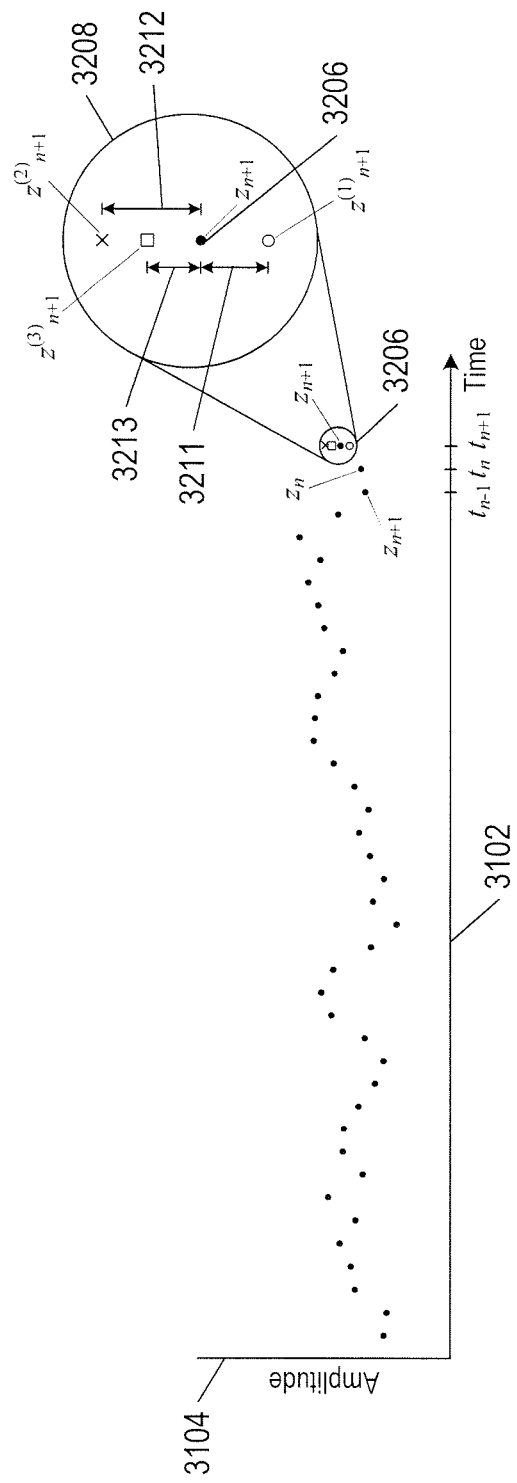
FIG. 32 shows an example of a computing three forecast metric values for the same time stamp for three autoregressive models.

FIG. 32 shows an example of a latest non-trendy metric value $z_{n+1}$ received by the metric processor 2802 as represented by point 3206. Three candidate metric values are separately computed using the three ARMA models ARMA ($p_1$, $q_1$), ARMA($p_2$, $q_2$), and ARMA($p_3$, $q_3$) as follows:

$$z_{n+1}^{(1)} \sum_{i=1}^{p_1} \phi_i z_n + a_{n+1} + \mu_z \Phi + \sum_{i=1}^{q_1} \theta_i a_n$$

$$z_{n+1}^{(2)} \sum_{i=1}^{p_2} \phi_i z_n + a_{n+1} + \mu_z \Phi + \sum_{i=1}^{q_2} \theta_i a_n$$

$$z_{n+1}^{(3)} \sum_{i=1}^{p_3} \phi_i z_n + a_{n+1} + \mu_z \Phi + \sum_{i=1}^{q_3} \theta_i a_n$$

where the white noise $a_{n+1}$ is randomly selecting from the fixed normal distribution. FIG. 32 includes a magnified view 3208 of the latest non-trendy metric value $z_{n+1}$ 3206 received by the metric processor 2802 and three estimated non-trendy metric values $z_{n+1}^{(1)}$, $z_{n+1}^{(2)}$ and $z_{n+1}^{(3)}$ computed separately from the three ARMA models at the time stamp $t_{n+1}$. Directional arrows 3211-3213 represent differences in amplitudes between the latest non-trendy metric value $z_{n+1}$ 3206 and the three estimated non-trendy metric values $z_{n+1}^{(1)}$, $z_{n+1}^{(2)}$ and $z_{n+1}^{(3)}$. Accumulated residual errors are maintained for each of the ARMA models as follows:

$$\text{Error}(p_1, q_1) = \sum_{i=1}^{n} \left(z_{n+1}^{(1)} - z_{n+1}\right)^2$$

$$\text{Error}(p_2, q_2) = \sum_{i=1}^{n} \left(z_{n+1}^{(2)} - z_{n+1}\right)^2$$

$$\text{Error}(p_3, q_3) = \sum_{i=1}^{n} \left(z_{n+1}^{(3)} - z_{n+1}\right)^2$$

Returning to FIG. 29, when a forecast is requested 2907 in block 2908, the accumulated residual errors of the stochastic models are compared and the stochastic process model with the smallest accumulated residual error is selected for forecasting. For example, the ARMA model ARMA($p_m$, $q_m$) may be used to compute forecast metric values as follows:

$$z_{n+1}^{(m)} \sum_{i=1}^{l-1} \phi_i z_{n+l-i}^{(m)} + \sum_{i=l}^{p_m} \phi_i z_{n+l-i} + a_{n+l} + \mu_z \Phi + \sum_{i=1}^{q_m} \theta_i a_{n+l-i} \quad (12)$$

where l=1, . . . , L is a lead time index with L the number of lead time stamps in the forecast interval;

$z_n^{(m)}$ is zero; and $a_{n+l}$ is the white noise for the lead time stamp $t_{n+l}$.

Figure 33:
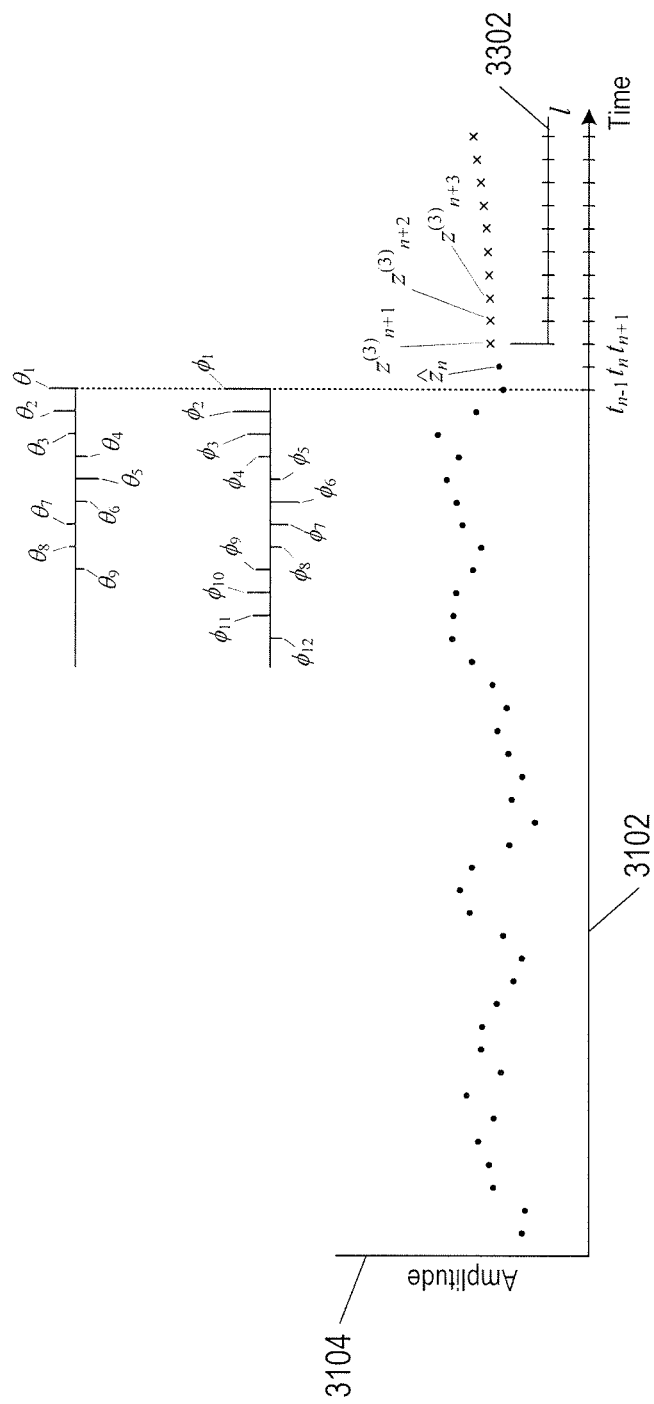
FIG. 33 shows forecast metric values.

FIG. 33 shows forecast metric values computed using weight parameters of the ARMA model 3012 ARMA($p_3$, $q_3$) in FIG. 32. In the example of FIG. 32, horizontal axis 3302 is a time axis for positive integer lead time indices denoted by l in Equation (12). The first three forecast metric values, denoted by "x's" in FIG. 33, are computed using ARMA($p_3$, $q_3$) as follows:

$$z_{n+1}^{(3)} = \sum_{i=1}^{p_3} \phi_i z_{n+1-i} + a_{n+1} + \mu_z \Phi + \sum_{i=1}^{q_3} \theta_i a_{n+a-l-i}$$

$$z_{n+2}^{(3)} = \phi_1 z_{n+1}^{(3)} + \sum_{i=1}^{p_3} \phi_i z_{n+2-i} + a_{n+2} + \mu_z \Phi + \sum_{i=1}^{q_3} \theta_i a_{n+l-i}$$

and $$z_{n+3}^{(3)} = \phi_1 z_{n+2}^{(3)} + \phi_2 z_{n+1}^{(3)} + \sum_{i=3}^{p_3} \phi_i z_{n+3-i} + a_{n+3} + \mu_z \Phi + \sum_{i=1}^{q_3} \theta_i a_{n+l-i}$$

In still other implementations, the stochastic process models 2904-2906 in FIG. 29 may be implemented as autoregressive ("AR") models given by:

$$z_n = \sum_{i=1}^{p} \phi_i z_{n-i} + a_n + \mu_z \Phi \quad (13)$$

The AR model is obtained by omitting the moving-average weight parameters form the ARMA model. By omitting the moving-average model, computation of the autoregressive weight parameters of the AR model is less computationally expensive than computing the autoregressive and moving-average weight parameters of the ARMA models. When the historical window of the sequence of non-trendy metric data is updated with recently received non-trendy metric values, three sets of autoregressive weight parameters are computed for each the three AR models denoted by AR($p_1$), AR($p_2$), and AR($p_3$). Accumulated residual errors are maintained for each of the AR models. Forecast metric values $z_{n+l}^{(m)}$ are computed for lead times using Equation (13) with the moving-average weight parameters equal to zero and the AR model with the smallest accumulated residual error at the time of the forecast request.

Unlike a stationary sequence of non-trendy metric data, a non-stationary sequence of non-trendy metric data does not vary over time in a stable manner about a fixed mean. In other words, a non-stationary sequence of non-trendy metric data behaves as the though the metric values of the sequence have no fixed mean. In these situations, one or more of the stochastic process models 2904-2906 in FIG. 29 may be implemented using an autoregressive integrated moving-average ("ARIMA") model given by:

$$\phi(B)\nabla^d z_n = \theta(B) a_n \quad (14)$$

where $\nabla^d = (1-B)^d$.

The ARIMA autoregressive weight parameters and move-average weight parameters are computed in the same manner as the parameters of the ARMA models described above. The ARIMA model, denoted by ARIMA($p_1$, $q_1$), ARIMA ($p_2$,$q_2$), and ARIMA($p_3$,$q_3$), with the smallest accumulated residual error at the time of the forecast request is used to compute forecast metric values $z_{n+l}^{(m)}$ for lead times in the forecast interval.

Returning to FIG. 29, certain streams of metric data may have pulse wave patterns. Other streams of metric data may have a single time varying periodic pattern or a combination of period patterns, such as hourly, daily, weekly or monthly periodic patterns, and are called "seasonal." Other streams of metric data may not be periodic. Because pulse wave metric data is a special type of periodic data, in decision block 2909, edge detection is used to determine if the sequence of non-trendy metric data in the historical window is pulse wave metric data. If edge detection reveals that the metric data is pulse wave metric data, control flows to determining, the pulse wave model 2910. Otherwise, control flows to block 2911 to determine if the metric data contains a seasonal pattern. Seasonality in a sequence of non-trendy metric data is a regular periodic pattern of amplitude changes that repeats in time periods. A seasonal period is determined in a seasonal model in block 2911.

Figure 34:
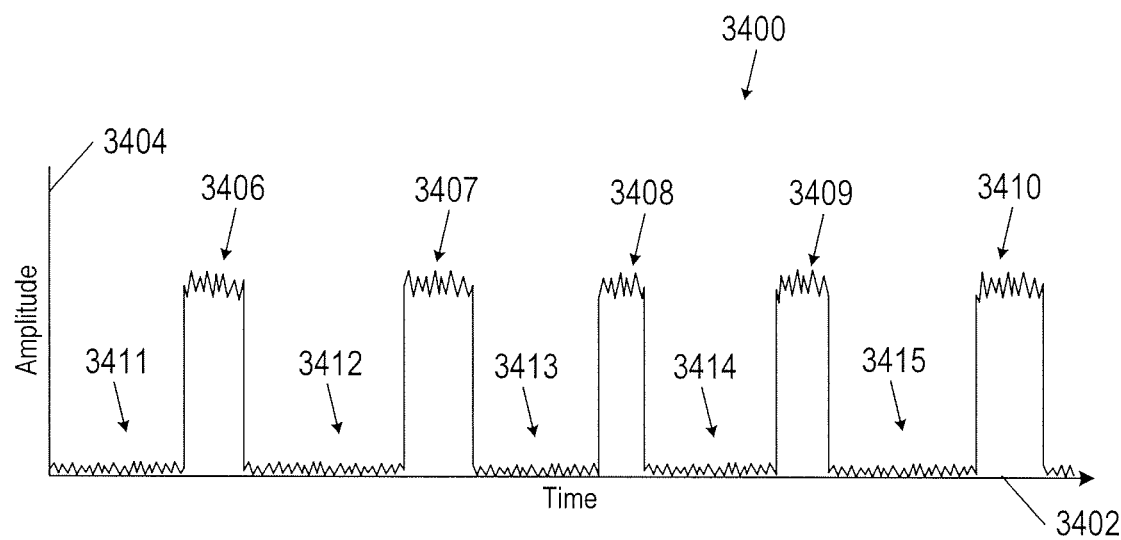
FIG. 34 shows a plot of an example stream of pulse wave metric data.

FIG. 34 shows a plot of an example stream of metric data 3400. Horizontal axis 3402 represents time. Vertical axis 3404 represents a range of amplitudes for metric values. The stream of metric data comprises pulses 3406-3410 separated by low amplitude time intervals 3411-3414. The stream of metric data may represent network traffic, memory usage, or CPU usage for a server computer that runs a periodically executed VM. The low amplitude time intervals 3411-3414 represent time intervals in which the VM is idle. Pulses 3406-3410 represent time intervals when the VM is running. This stream of metric data is an example of metric data modeled using a pulse wave model 2910.

Figure 35:
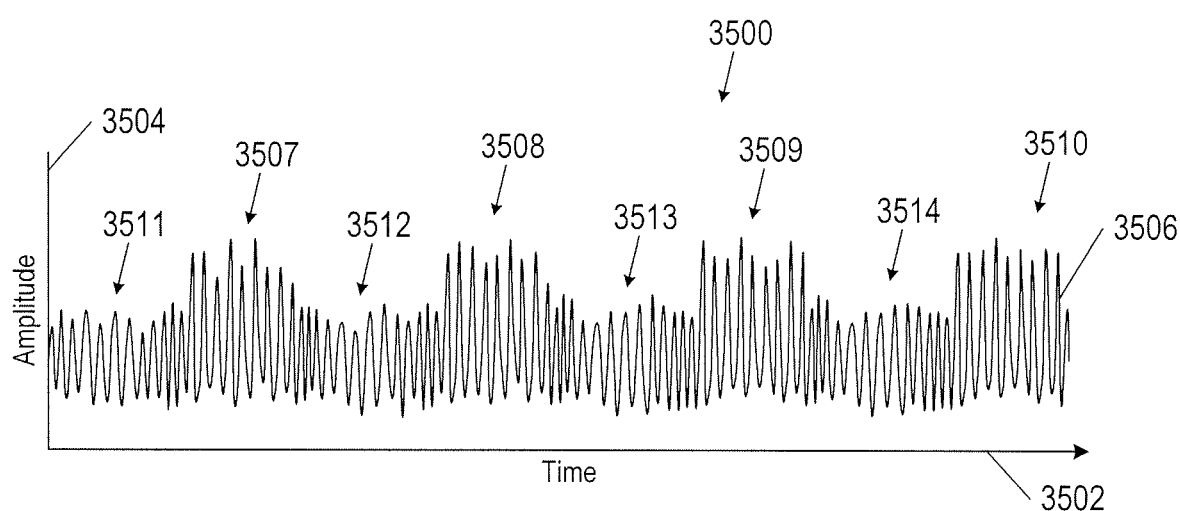
FIG. 35 shows a plot of an example stream of seasonal metric data that exhibits two seasonal periods.

FIG. 35 shows a plot of an example stream of metric data 3500 that exhibits two seasonal periods. Horizontal axis 3502 represents time. Vertical axis 3504 represents a range of amplitudes for metric values. Oscillating curve 3506 represents a stream of metric data with two seasonal periods. A first longer seasonal period appears with regularly spaced larger amplitude oscillations 3506-3509 separated by regularly spaced smaller amplitude oscillations 3510-3513. A second shorter seasonal period exhibits oscillations over much shorter time intervals. This stream of metric data is an example of seasonal metric data modeled using the seasonal model 2911.

In block 2909 of FIG. 29, edge detection is applied to the metric data in the historical window. An exponentially weighted moving average ("EWMA") of absolute differences between two consecutive non-trendy metric values denoted by $\Delta_i = |z_i - z_{i-1}|$ is maintained for $i=1, \ldots, n$ metric values in the historical window. The EWMA for the latest time stamp $t_n$ in the historical window is computed recursively by:

$$MA_n = \alpha \Delta_n + (1-\alpha) MA_{n-1} \tag{15a}$$

where
$MA_0 = 0$; and $0 < \alpha < 1$.

For example, the parameter $\alpha$ may be set 0.1, 0.2, or 0.3. For each new non-trendy metric value $z_{n+1}$, the absolute difference $\Delta_{n+1} = |z_{n+1} - z_n|$ is computed. The new non-trendy metric value $z_{n+1}$ is a spike in the magnitude of the stream of metric data, when the absolute difference satisfies the following spike threshold condition:

$$\Delta_{n+1} > Th_{spike} \tag{15b}$$

where $Th_{spike} = C \times MA_n$.

The parameter C is a numerical constant (e.g., C=4.0, 4.5, or 5.0). When the absolute difference $\Delta_{n+1}$ is less than the spike threshold, control flows to seasonal model in block 2911 of FIG. 29. When the new non-trendy metric value $z_{n+1}$ satisfies the condition given by Equation (15b), edge detection is applied to determine if sequence of non-trendy metric data comprises pulse wave edges in a backward time window $[z_{n-x}, z_n]$ and a forward time window $[z_n, z_{n+x}]$, where X is a fixed number of metric values.

Figure 36A:
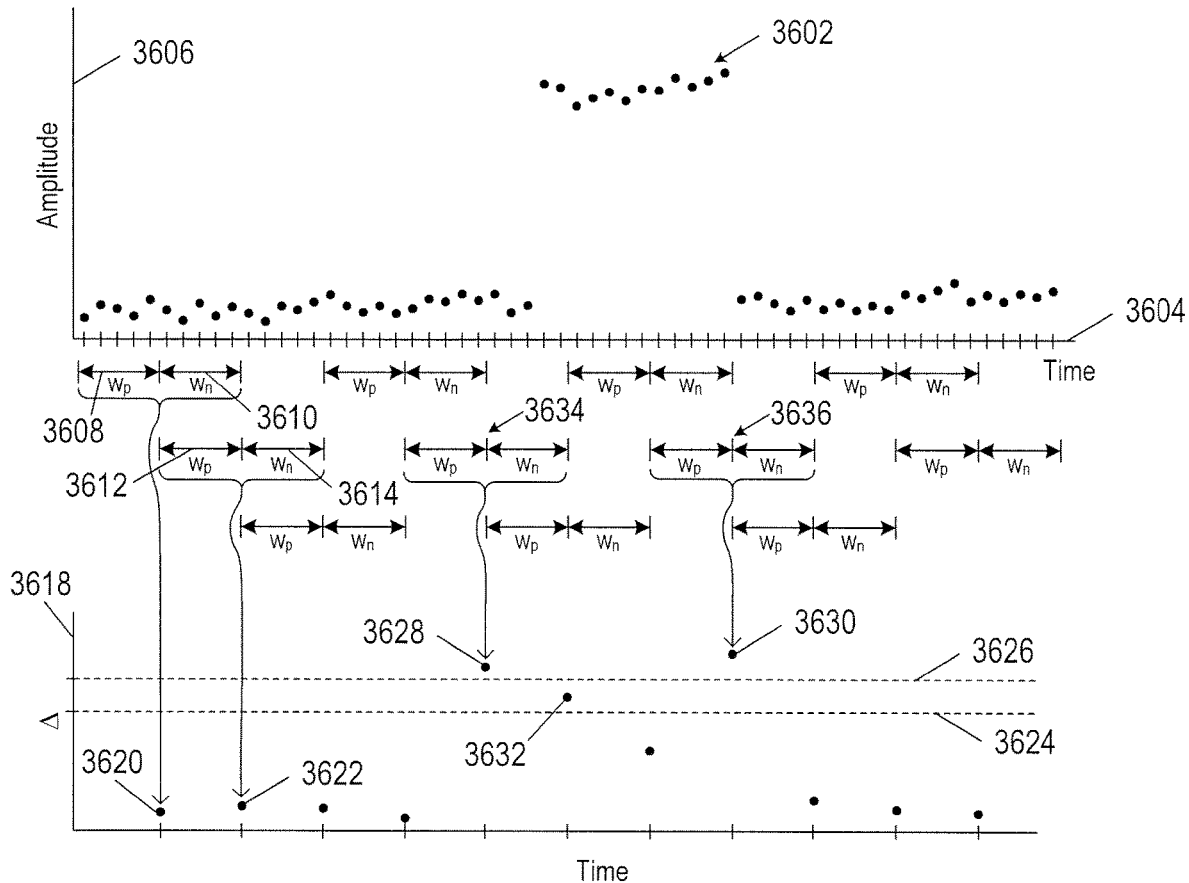
FIGS. 36A-36B show an example of edge detection applied to a sequence of pulse wave metric data.
Figure 36B:
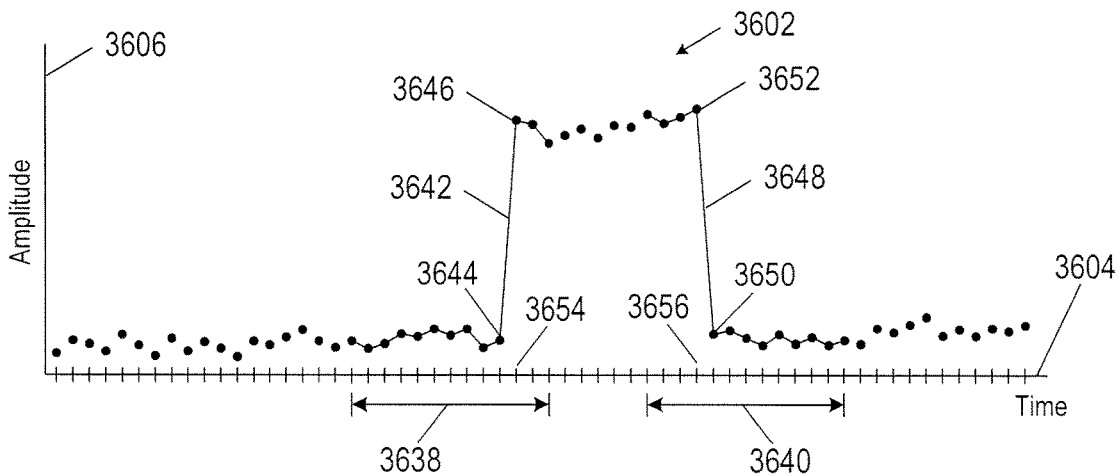

FIGS. 36A-36B show edge detection applied to a sequence of metric data. FIG. 36A shows a plot of a square pulse 3602 in metric data. The metric data may have been smoothed to suppress the noise using a smoothing filter applied to the metric data in the historical window. The smoothing filter may be a moving median filter, a moving average filter, or a Gaussian filter. Horizontal axis 3604 represents a time window of the historical window. For example, the time window may be 20 minutes. 30 minutes, or 40 minutes or a longer time window of the historical window. Vertical axis 3606 represents a range of metric data amplitudes. Metric data are averaged in two adjacent sliding time windows within the larger time window 3604. The two adjacent time windows are referred to as a previous time window, denoted by $w_p$, and a next time window, denoted by $w_n$. FIG. 36A shows examples of adjacent sliding previous and next time windows. For example, directional arrows 3608 and 3610 represent adjacent previous and next time windows, respectively. In the example of FIG. 36A, the previous and next time windows each contain five metric values. In other implementations, the previous and next time windows may contain any number of metric values. FIG. 36A shows the locations of previous and next time windows as the windows move within the larger time window 3604 represented by horizontal time axis 3604. Each next time window becomes a previous time window. For example, next time window 3610 becomes previous time window 3612. For each location of the previous time window, an average of the metric values in the previous time window is computed as follows:

$$\Sigma S(w_p) = \frac{1}{|S(w_p)|} \sum_{z_i \in S(w_p)} z_i \tag{16a}$$

where $S(w_p)$ is the set of metric data with time stamps in the previous time window $w_p$, and $|S(w_p)|$ is the number of metric values with time stamps in the previous time window $w_p$.

An average of the metric values in the next time window is computed as follows:

$$\Sigma S(w_n) = \frac{1}{|S(w_p)|} \sum_{z_i \in S(w_n)} z_i \tag{16b}$$

where $S(w_n)$ is the set of metric data with time stamps in the next time window $w_n$; and $|S(w_n)|$ is the number of metric values with time stamps in the next time window $w_n$.

The average metric data $\Sigma S(w_p)$ in the previous time window and the average metric data $\Sigma S(w_n)$ in the next time window are moving averages as the previous and next time windows are moved within the larger time window 3604. A change parameter is computed for each location of the previous and next time windows in the larger time window 3604 as follows:

$$\Delta = |\Sigma S(w_p) - \Sigma S(w_n)| \tag{17}$$

FIG. 36A shows a plot of change parameters for each location of the previous and next time windows. Horizontal axis 3616 represents time. Vertical axis 3618 represents a range of change parameter values. For example, solid point 3620 represents the value of a change parameter for the metric values in previous and next time windows 3608 and 3610. Solid point 3622 represents the value of a change parameter for the metric values in previous and next time windows 3612 and 3614.

When the following two conditions are satisfied for a change parameter, the corresponding previous and next time windows are a time interval, denoted by $w_p \cup w_n$, that contains an edge of a square pulse of metric data. The first condition is given by $$\Delta > Th_1 \times (\max\{z_i\} - \min\{z_i\}) \qquad (18a)$$

where $0 < Th_1 < 1$ (e.g., $Th_1 = 0.05$);

$\max\{z_i\}$ is the maximum metric value in set of metric values in the historical window;

$\min\{z_i\}$ is the minimum metric value in the set of metric values in the historical window; and $\max\{z_i\} - \min\{z_i\}$ is the maximum amplitude range of metric values in the historical window.

The quantity $Th_1 \times (\max\{z_i\} - \min\{z_i\})$ is the maximum amplitude range of metric values threshold. The second condition is given by $$\Delta > Th_2 \times MA(\Delta) \qquad (18b)$$

where $0 < Th_2 < 1$ (e.g., $Th_2 = 0.25$); and $MA(\Delta)$ is the EWMA.

The quantity $Th_2 \times MA(\Delta)$ is a change parameter EWMA threshold. The EWMA of the change parameters is a weighted average that assigns weight to the most recently generated change parameter relative to change parameters generated in the past and is given by:

$$MA(\Delta_i) = \lambda \Delta_i + (1-\lambda) MA(\Delta_{i-1})$$

where $MA(\Delta_0)$ is the mean of historical change parameters;

$\Delta_i$ is the change parameter of the i-th most recent previous and next time window; and $0 < \lambda < 1$ is a constant that determines the weight at which older change parameters enter into calculation of the EWMA (i.e., a large value of $\lambda$ gives more weight to recent change parameters and less weight to older change parameters).

In FIG. 36A, dashed lines 3624 and 3626 represent thresholds in Equations (17a) and (17b). Change parameters 3628 and 3630 satisfy the two conditions. Change parameter 3630 satisfies one condition but not the other. Change parameters with values less than dashed line 3624 do not satisfy either condition. Because the change parameters 3628 and 3630 satisfy the two conditions, the corresponding previous and next time windows 3634 and 3636 are time intervals that contain edges of the square pulse 3602.

An absolute difference is computed between each pair of consecutive metric values with time stamps in a time interval $w_p \cup w_n$ identified as having an edge. The largest absolute difference between consecutive pairs of metric values in the time interval is given by $$|z_{i+1} - z_i| = \max\{|z_{j+1} - z_j|\}_{j=1}^{J-1} \qquad (19)$$

where $z_j \in w_p \cup w_n$ for $j = 1, \ldots, J$; and $J$ is the number of metric values in the time interval $w_p \cup w_n$.

When $z_{i+1} - z_i > 0$, the edge is an upward or increasing edge and time $t_{i+1}$ is the time of the upward edge. When $z_{i+1} - z_i < 0$, the edge is a downward or decreasing edge and time $t_i$ is the time of the downward edge.

FIG. 36B shows a plot of the square pulse 3602 of metric values and time intervals 3638 and 3640 that correspond to previous and next time intervals 3634 and 3636, respectively. Line segments between metric values represent absolute differences. Line segment 3642 between metric values 3644 and 3646 is the largest difference between consecutive pairs of metric values in the time interval 3638. Line segment 3648 between metric points 3650 and 3652 is the largest difference between consecutive pairs of metric values in the time interval 3640. Time stamps 3654 and 3656 of the metric values 3646 and 3652 are the edges of the square pulse 3602.

Returning to FIG. 19, the pulse wave model 1910 estimates the pulse width and period for the pulse wave stream of metric data. The pulse width can be estimated as a difference in time between consecutive upward and downward edges. The period can be estimated as a difference in time between two adjacent upward (or downward) edges.

Figure 37A:
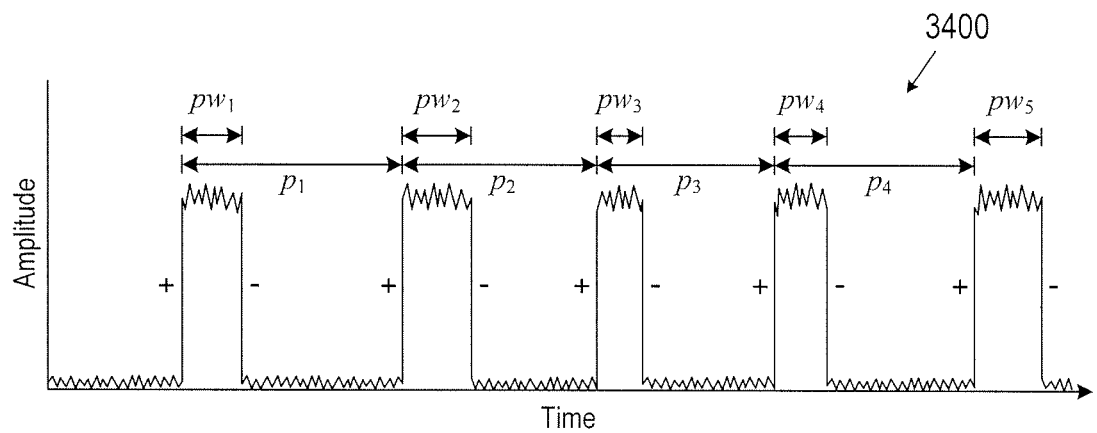
FIG. 37A shows pulse widths and periods of a stream of pulse wave metric data.

FIG. 37A shows pulse widths and periods of the stream of metric data 3400. Each edge has a corresponding 3-tuple ($t_s$, A, sign), where $t_s$ represents the time stamp of the pulse edge, A is the amplitude of the pulse edge, and "sign" indicates whether pulse is upward denoted by "+" or downward denoted by "−". Pulse widths denoted by $pw_1$, $pw_2$, $pw_3$, $pw_4$, and $pw_5$ are computed as a difference between time stamps of consecutive upward and downward edges. Periods denoted by $p_1$, $p_2$, $p_3$, $p_4$, and $p_5$ are computed as a difference between time stamps of two consecutive upward (or downward) edges. The latest pulse widths and periods are recorded in corresponding circular buffer back-sliding histograms described below with reference to FIG. 37B.

Recent mode tracking may be used to determine robust periodic model parameter estimates. Recent mode tracking is implemented with a circular buffer back-sliding histogram to track recent distributions. The periodic parameters are stored in a circular buffer. When a latest periodic parameter is determined, the periodic parameter is input to the circular buffer to overwrite the oldest periodic parameter stored in the buffer. The back-sliding histogram is updated by incrementing the count of the histogram bin the latest periodic parameter belongs to and by decrementing the count of the histogram bin the oldest periodic parameter belongs to. The mode tracker outputs the histogram bin with the largest count when the count is greater than a histogram threshold defined as $Th_{hist} = C \times total\_count$, where $0 < C < 1$ (e.g., C equals 0.2, 0.3, 0.4, or 0.5) and total_count is the total count of periodic parameters recorded in the histogram. For each histogram bin, the count of periodic parameters in the histogram bin, denoted by Count(bin), is compared with the histogram threshold. When the following condition is satisfied $$\text{Count(bin)} > Th_{hist} \qquad (20)$$

the latest periodic parameter with a count added to the bin with Count(bin) that satisfies Equation (26) is used to forecast periodic metric data. On the other hand, if none of the counts of the histogram bins are greater than the histogram threshold, then forecasting of the metric data is not carried out with any of the periodic parameters of the histogram bins and the metric data in the historical window does not have a periodic pattern.

Figure 37B:
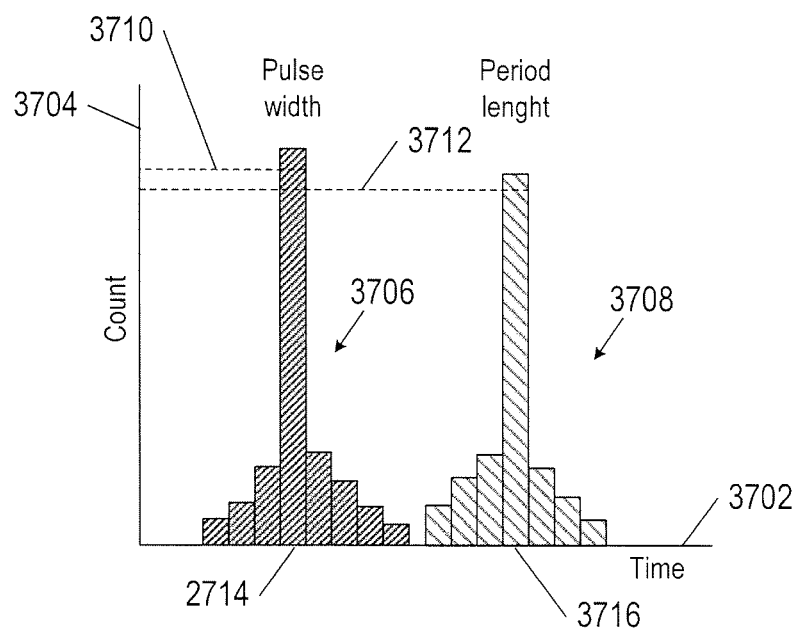
FIG. 37B shows a plot of an example histogram of periodic parameters for a pulse wave model.

FIG. 37B shows a plot of an example histogram of periodic parameters for the pulse wave model. Horizontal axis 3702 represents a time bin axis. Vertical axis 3704 represents counts. Histogram 3706 represents a back-sliding histogram of pulse widths and histogram 3708 represents a back-sliding histogram of periods for pulse-wave metric data for seasonal model. Dashed line 3710 represents a histogram threshold for pulse widths. Dashed line 3712 represents a histogram of threshold for periods. In the example of FIG. 37B, the count of pulse widths in histogram bin 3714 is greater than the histogram threshold 3710 and the count of periods in histogram bin 3716 is greater than the histogram threshold 3712. In this case, the most recent pulse width and period counted in corresponding historical bins 3714 and 3716 are pulse wave period parameters used to forecast pulse wave metric data.

Returning to FIG. 29, if the sequence of non-trendy metric data is not pulse-wave metric data, the metric data may be seasonal metric data and a seasonal period is determined in seasonal model 2911. The seasonal model 2911, begins by applying a short-time discrete Fourier transform ("DFT") given by:

$$Z(m, k/N) = \sum_{i=1}^{N} z_i w(i - m)\exp(-j2\pi ki/N) \quad (21)$$

where m is an integer time shift of a short-time window;

j is the imaginary constant $\sqrt{-1}$;

k=0, . . . , N–1 is a frequency spectrum sample;

N is the number of data points in a subset of the historical window (i.e., N≤n); and w(i–m) is a window function.

The window function w(i–m) is function that tapers toward both ends of the short-time window. For example, the window function can be a Hann function, a Hamming function, or Gaussian function. The spectrum Z(m,k/N) is a complex valued function of in and k. The power spectral density ("PSD") is given by:

$$PSD(m, k/N) = |Z(m, k/N)|^2 \quad (22)$$

where $k = 0, \ldots, N/2$;

$f_k = \frac{2k}{N} f_c$; and $f_c$ is the Nyquist frequency.

The PSD is the power of the frequency spectrum at N/2+1 frequencies. The PSD values PSD(m, k/N) form a periodogram over a domain of frequency samples k (i.e., $f_k$) for each time shift m.

The short-time DFT may be executed with a fast Fourier transform ("FFT"). Ideally, a high-resolution FFT comprising a large window size and high sampling rate would be used to compute a PSD in each historical window of the FFT to provide complete frequency spectrum information in the historical window. By finding a maximum PSD point at each time shift m and curve fitting, various seasonal patterns and reconstructed metric values can ideally be forecast with an inverse FFT. However, computing a high-resolution FFT and storing the full PSD for a sequence of non-trendy metric data is computationally expensive and time consuming in a resource constrained management system that already receives thousands of different streams of metric data and in which real time forecasts are needed to respond to rapidly to changing demands for computational resources in a distributed computing system.

Methods described herein avoid the slowdown created by a high-resolution FFT by:

1) using an FFT in a short-time window with a small number of metric values (e.g., a short-time window may have N=64, 128 or 256 sequential non-trendy metric values of the limited history) for three different coarse sampling rates, 2) extracting a single principal frequency from each PSD and tracking a most recent mode of the principal frequency, and 3) performing a local auto-correlation function ("ACF") search in the time domain to refine estimation of a principal period that corresponds to the principal frequency of the metric data to compensate for resolution lost with coarse sampling rates and spectral leakage.

The FFT is applied to subsequences of the sequence of non-trendy metric data, each subsequence comprising N metric values sampled from the sequence of non-trendy metric data using a different sampling rate. Each subsequence of metric values is searched for a periodic pattern. For example, the example sequence of non-trendy metric data 3500 shown in FIG. 35 appears to have a short periodic pattern and a longer periodic pattern. The period determined for the shorter sampling rate has higher priority in forecasting than a period obtained for a longer sampling rate.

Figure 38:
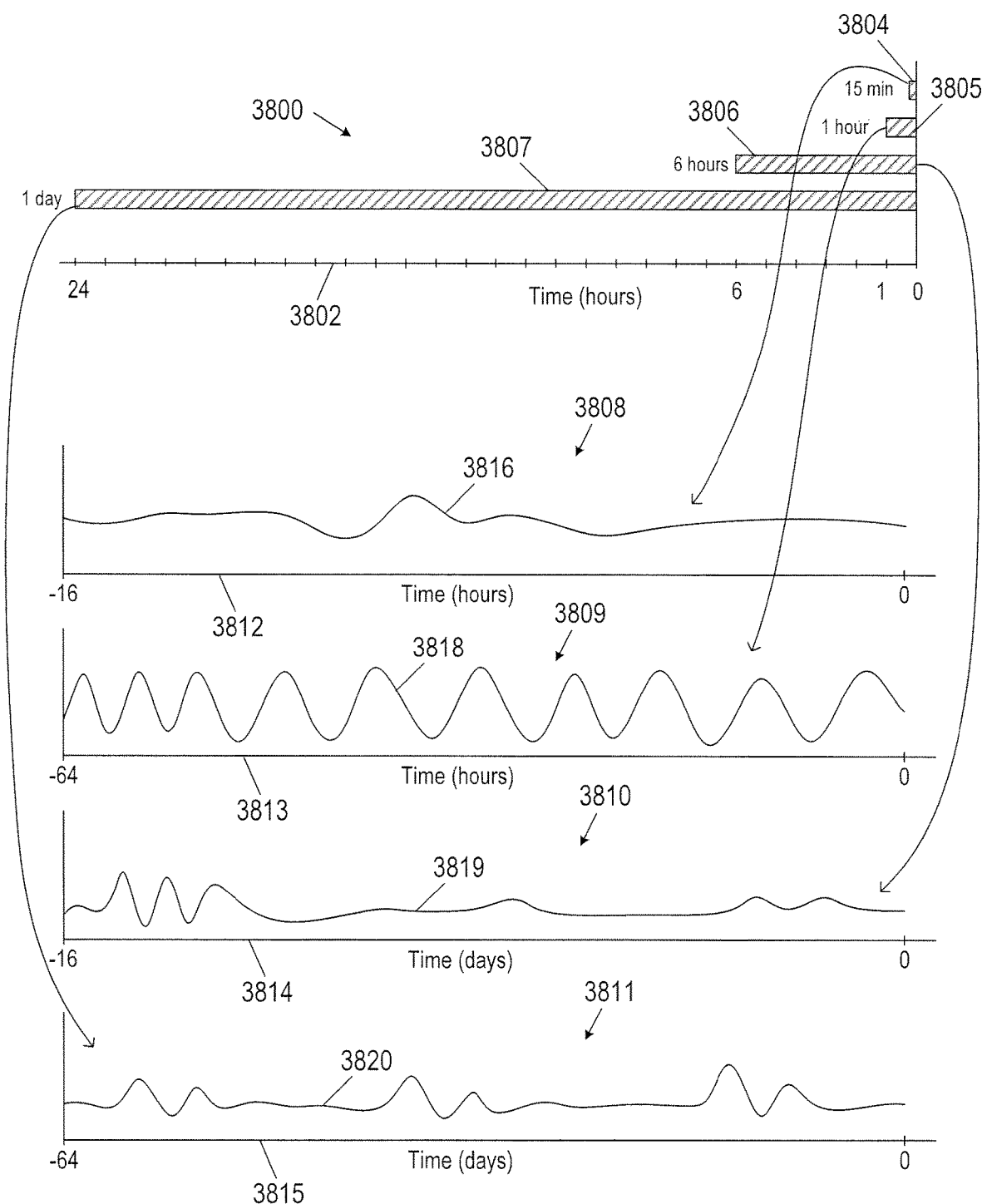
FIG. 38 shows a bar graph of four different examples of sampling rates and associated subsequences of the same sequence of metric data.

FIG. 38 shows a bar graph 3800 of four different examples of sampling rates and associated with different subsequences of samples of the same sequence of non-trendy metric data. Horizontal axis 3802 represent time in hours. Hash-marked bars 3804-3807 represent durations of three different sampling rates applied to the same stream of metric data to collect three different subsequences of non-trendy metric data over three different time intervals. Each subsequence contains N=64 sequential non-trendy metric values of the larger sequences of non-trendy metric data. Plots 3808-3811 are example plots of subsequences of metric data resampled from the sequence of non-trendy metric data over four different time intervals and the four different sampling rates represented by the bar graph 3700. In plots 3808-3811, horizontal axes 3812-3815 represent different time intervals. Time zero along each axis represents the current time. In plot 3808, horizontal axis 3812 represents a time interval of 16 hours. Curve 3816 represents a subsequence of metric data sampled from the sequence of non-trendy metric data over a 16-hour time interval at the sampling rate of 15 minutes. In plot 3808, horizontal axis 3813 represents a time interval of 64 hours. Curve 3818 represents a subsequence of metric data sampled from the sequence of non-trendy metric data over a 64-hour time interval at the sampling rate of 1 hour. In plot 3810, horizontal axis 3814 represents a time interval of 16 days. Curve 3819 represents a sequence of metric data sampled from the sequence of non-trendy metric data over a 16-day time interval at the sampling rate of 6 hours. In plot 3811, horizontal axis 3815 represents a time interval of 64 days. Curve 3820 represents metric data sampled from the sequence of non-trendy metric data over a 64-day time interval at the sampling rate of 24 hours. The different sampling rates applied to the same sequence of non-trendy metric data over different time intervals reveal different frequency patterns or seasonal periods within the sequence of non-trendy metric data. Subsequences of metric data 3818 exhibits a seasonal period. Subsequences of metric data 3816, 3819, and 3820 exhibit no discernible periodic pattern. If it is the case that different periods are present in two or more subsequences of metric data, the period associated with the shorter sampling rate has higher priority in forecasting than the period associated with the longer sampling rate. The principal frequency or period of the subsequence of metric data with shortest associated sampling rate is determined. Methods for determining the principal frequency or period of a sequence of non-trendy metric data are described below with reference to FIGS. 39-40.

Figure 39:
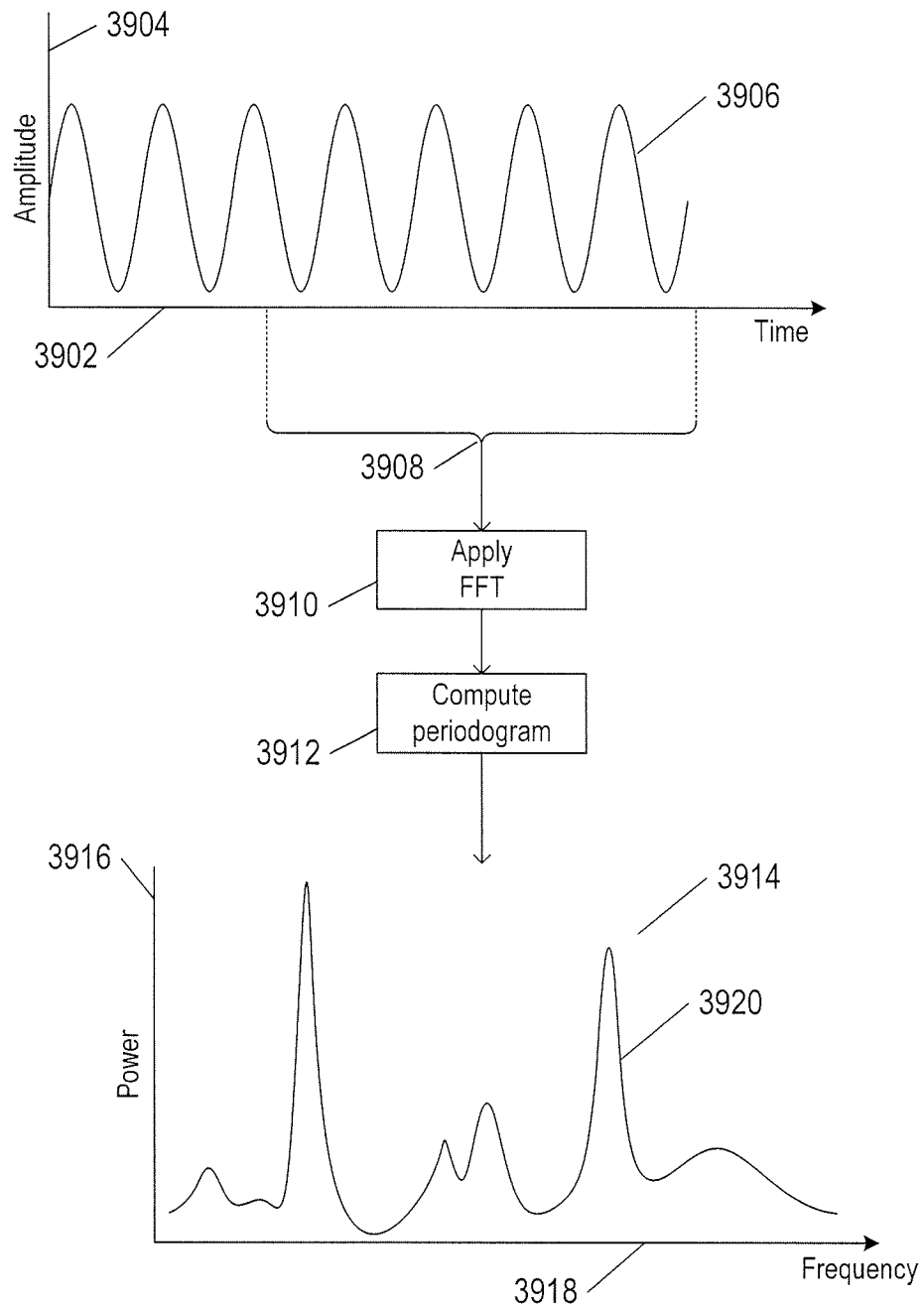
FIG. 39 shows an example of a periodogram computed for a time window of seasonal metric data.

FIG. 39 shows an example of a periodogram computed for seasonal metric data in a time window. In FIG. 39, horizontal axis 3902 represents time. Vertical axis 3904 represents a range of metric data amplitudes. Curve 3906 represents a sequence of non-trendy metric data. Bracket 3908 represents a moving time window. For each location of the time window 3908, an FFT 3910 is applied to a number N of the latest metric values followed by computation of a periodogram 3912. As more metric data is received and sampled at the sampling rate, the FFT is applied to the subsequence of metric data in a current time window followed by computation of a PSD. FIG. 39 shows example plot of a periodogram 3914. Axis 3916 represents a range of frequencies. Axis 3918 represents a range of power. Curve 3920 represents the power spectrum of the seasonal metric data in the time window 3908.

For each periodogram, an approximate area of the periodogram is computed. For example, the approximate area of a periodogram can be computed using the Trapezoid Rule:

$$PSD_{Area} = \frac{N}{2} \sum_{k=1}^{N/2} \left( PSD\left(\frac{k-1}{N}\right) - PSD\left(\frac{k}{N}\right) \right) \quad (23)$$

Other methods may be used to compute the area of a periodogram, such as Simpson's rule and Romberg's method. Candidate principal frequencies of a periodogram are identified from the approximate area of the periodogram using the following threshold condition:

$$\underset{k}{\mathrm{argmax}}\left\{\left( PSD\left(\frac{k}{N}\right) * K_{trap}\left(\frac{k}{N}\right)\right)\right\} > Th_{princ} * \sum_{k=0}^{N/2} PSD\left(\frac{k}{N}\right) \quad (24)$$

where

"*" means convolution, $Th_{princ} = PSD_{Area}/Q$; and $$K_{trap}\left(\frac{k}{N}\right) = C_1 PSD\left(\frac{k-1}{N}\right) + C_2 PSD\left(\frac{k}{N}\right) + C_3 PSD\left(\frac{k+1}{N}\right)$$

The parameter Q is a positive integer (e.g., Q=3, 4, or 5) and $K_{trap}(k/N)$ is called a normalized three-point trapezoid window. The parameters $C_1$, $C_2$, and $C_3$ are normalized to 1. For example, $C_1=C_3=0.25$ and $C_2=0.5$. If none of the frequencies of the periodogram satisfies the condition given by Equation (19), the subsequence of the sequence of non-trendy metric data does not have a principal frequency in the time window of the FFT and is identified as non-periodic.

Figure 40A:
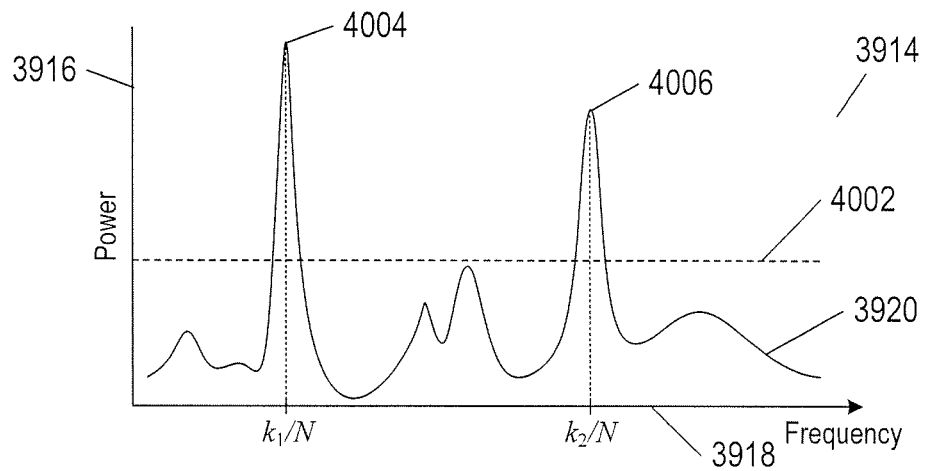
FIG. 40A shows a plot of the periodogram shown in FIG. 39.

FIG. 40A show a plot of the periodogram 3914 shown in FIG. 39. Frequencies of the power spectrum 3920 are denoted by k/N. The area under the curve 3920 may be approximated by Equation (21). Dashed line 4002 represents the principal frequency threshold $Th_{princ}$. In this example, the periodogram reveals two strong peaks 4004 and 4006 above the threshold 4008 with corresponding frequencies $k_1/N$ and $k_2/N$. However, which of the two peaks 4004 and 4006 is the principal frequency cannot be determined directly from the periodogram alone.

Each PSD value PSD(k/N) of a periodogram is the power in the spectral domain at a frequency k/N or equivalently at a period N/k in the time domain. Each DFT bin corresponds to a range of frequencies or periods. In particular, Z(k/N) bin corresponds to periods in the time interval $$\left[\frac{N}{k}, \frac{N}{k-1}\right).$$

The accuracy or discovered candidate principal frequencies based on the periodogram deteriorates for large periods because of the increasing width of the DFT bins (N/k). In addition, spectral leakage causes frequencies that are not integer multiples of the DFT bin width to spread over the entire frequency spectrum. As a result, a periodogram may contain false candidate principal frequencies. However, a periodogram may provide a useful indicator of candidate principal frequencies.

In certain implementations, the principal frequency of the periodogram is determined by computing an autocorrelation function ("ACF") within each neighborhood of candidate periods that correspond to candidate principal frequencies of the periodogram. The autocorrelation function over time lags τ is given by:

$$ACF(\tau) = \frac{1}{N} \sum_{i=1}^{N} \hat{z}_i \hat{z}_{i+\tau} \quad (25)$$

The ACF is time-domain convolution of the subsequence of non-trendy metric values $\hat{z}_i$ in the short-time window of the FFT. Given the candidate principal frequencies of the periodogram that satisfy the threshold requirements of the condition in Equation (24), the ACF is used to determine which of the corresponding candidate periods in the time domain is a valid principal period. A candidate period with an ACF value located near a local maximum of the ACF (i.e., located within a concave-down region) is a valid period. A candidate period with an ACF value located near a local minimum of the ACF (i.e., located within a concave-up region) is not a valid period and is discarded. For a period with an ACF value that lies on a concave-down region of the ACF, the period is refined by determining the period of a local maximum ACF value of the concave-down region. The period of the local maximum is the principal period used to forecast seasonal metric data.

Figure 40B:
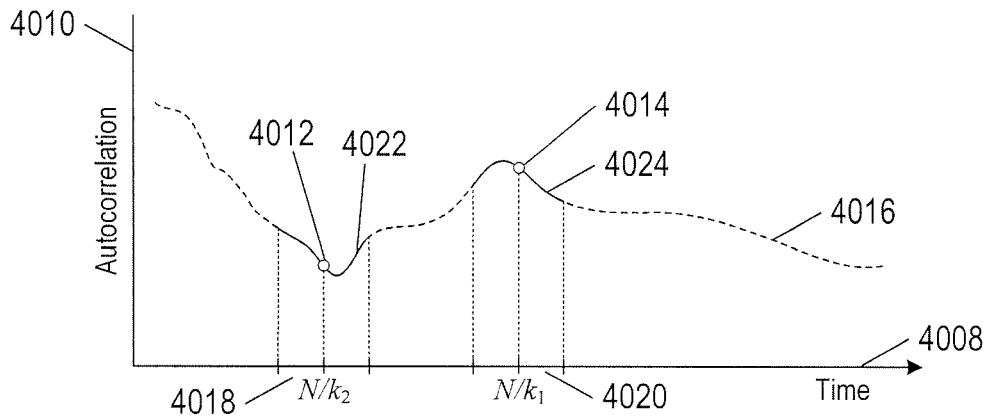
FIG. 40B shows a plot of an example autocorrelation function that corresponds to the periodogram shown in FIG. 40A.

FIG. 40B shows a plot of an example ACF that corresponds to the periodogram shown in FIG. 40A. Horizontal axis 4008 represents time. Vertical axis 4010 represents a range of ACF values. Dashed curve 4012 represents ACF values computed according to Equation (23) over a time interval. Periods $N/k_1$ and $N/k_2$ represent candidate periods that correspond to candidate principal frequencies $k_2/N$ and $k_1/N$ in FIG. 40A. Open points 4012 and 4014 are ACF values at candidate periods $N/k_1$ and $N/k_2$. Rather than computing the full ACF represented by dashed curve 4016 over a large time interval, in practice, the ACF may be computed in smaller neighborhoods 4018 and 4020 of the candidate periods as represented by solid curves 4022 and 4024. The ACF value 4014 is located on a concave-down region of the ACF and corresponds to the largest of the two candidate principal frequencies. The other ACF value 4012 is located on a concave-up region of the ACF and corresponds to the smallest of the two candidate principal frequencies.

A neighborhood centered at the candidate period $N/k$ is represented by:

$$NBH_{N/k} = \left[a, \ldots, \frac{N}{k}, \ldots, b\right] \quad (26)$$

In certain implementations, the end points for the neighborhoods may be given by:

$$a = \frac{1}{2}\left(\frac{N}{k+1} + \frac{N}{k}\right) - 1$$

and $$b = \frac{1}{2}\left(\frac{N}{k} + \frac{N}{k-1}\right) + 1$$

The upward or downward curvature of the ACF in the neighborhood of a candidate period is determined by computing a linear regression model for a sequence of points t between the endpoints of the neighborhood $NBH_{N/k}$. A split period within the search interval $R_{N/k}$ is obtained by minimizing a local approximation error for two line segments obtained from linear regression as follows:

$$t_{split} = \underset{p}{\mathrm{argmin}}(\mathrm{error}(S(a, t)) + \mathrm{error}(S(t + 1, b))) \quad (27)$$

where t is point in the neighborhood $NBH_{N/k}$;

$S(a,t)$ is a first line segment fit to points between point a and point t of the search interval $NBH_{N/k}$;

$S(t+1, b)$ is a second line segment fit to points between point t+1 and point b of the search interval $NBH_{N/k}$;

error($S(a,t)$) is the error between the $S(a,t)$ and ACF values between point a and point t; and error($S(t+1, b)$) is the error between $S(t+1, b)$ and ACF values between point t+1 and point b.

If the slopes of the first line segment $S(a, t_{split})$ and the second line segment $S(t_{split}+1, b)$ are correspondingly negative and positive, then the ACF value is in a concave-up region of the ACF and the corresponding period is discarded. If the slopes of the first line segment $S(a, t_{split})$ and second line segment $S(t_{split}+1, b)$ are correspondingly positive and negative, then the ACF value is in a concave-down region of the ACF and the corresponding candidate period is kept. Once a candidate period of a concave-down region has been identified, the local maximum ACF may be located at the end point of the first line segment $S(a,t_{split})$ or located at the start point of the second line segment $S(t_{split}+1, b)$. Alternatively, a hill-climbing technique, such as gradient ascent, is applied to determine the local maximum ACF of the concave-down region. The period that corresponds to the ACF local maximum is the principal period and is seasonal parameter used to forecast seasonal metric data over a forecast interval.

Figure 40C:
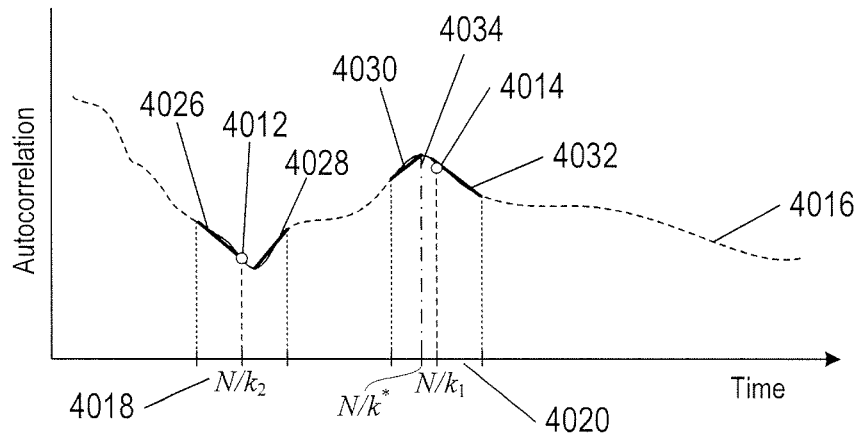
FIG. 40C shows examples of line segments computed from autocorrelation function values in neighborhoods.

FIG. 40C shows examples of line segments computed from ACF values in the neighborhoods 4018 and 4020. First and second line segments 4026 and 4028 in the neighborhood 4018 have negative and positive slopes, respectively. As a result, the candidate period $N/k_2$ is in a concave-up region of the ACF and is discarded. On the other hand, first and second line segments 4030 and 4032 in the neighborhood 4020 have positive and negative slopes, respectively. As a result, the candidate period $N/k_1$ is in a concave-down region of the ACF. The local maximum 4034 with principal period $N/k^*$ may be at the end of the first line segment or beginning of the second line segment or determined by applying a hill-climbing technique. The principal period is a seasonal parameter.

In other implementations, rather than checking each candidate period of the candidate frequencies that satisfy the condition in Equation (24) in neighborhoods of the ACF, only the candidate period that corresponds to the largest candidate frequency is checked using the ACF to determine if the candidate period is a principal period.

The principal frequency computed for each time interval as described above with reference to FIGS. 40B-40C is recorded in a principal frequency back-sliding circular buffer that maintains a fixed number of the most recently generated principal frequencies. A count for each principal frequency, denoted by Count($f_i$), where $f_i$ is the i-th principal frequency (i.e., $f_i=k_i/N$), is maintained. When a new principal frequency is computed for a most recent time window and added to the principal frequency circular buffer, the oldest principal frequency stored in the buffer is deleted. The count of the new principal frequency is incremented and the count of the principal frequency of the oldest principal frequency is decremented. The counts of the principal frequencies are rank ordered from largest to smallest. The principal frequency with the largest count that satisfies the following condition is the principal frequency and the corresponding principal period is used to forecast seasonal data:

$$\mathrm{Count}_1(f_i) > N_f \times \mathrm{Count}_2(f_j) \quad (28)$$

where $\mathrm{Count}_1(f_i)$ is the largest count;

$\mathrm{Count}_2(f_j)$ is the second largest count; and $N_f$ is threshold count factor (e.g., $N_f$ equals 2, 3, or 4).

The quantity $N_f \times \mathrm{Count}_2(f_j)$ is called a principal frequency threshold. If the condition given by Equation (28) is not satisfied, then there is no seasonal pattern (i.e., no principal period) in the metric data.

Returning to FIG. 29, block 2912 represents determining an appropriate performance model for forecasting metric data and detecting anomalous behavior in new metric data over a forecast interval. Let $\hat{z}_{n+l}$ represent forecast metric values for lead times $t_{n+l}$ in a forecast interval with l=1, ..., L. The following three conditions are considered in computing a forecast model in block 2912. Depending on the stream of metric data, the forecast model may be a stochastic process model, pulse wave model, or a seasonal model:

(1) When the stream of metric data in the historical window is neither a pulse wave nor a seasonal stream, the stream is regarded as stochastic. In this case, metric data are forecast in block 2912 based on the stochastic process model with the smallest accumulated residual error as follows:

$$\hat{z}_{n+l} = T_{n+l} + z_{n+l}^{(m)} \quad (29)$$

Figure 41A:
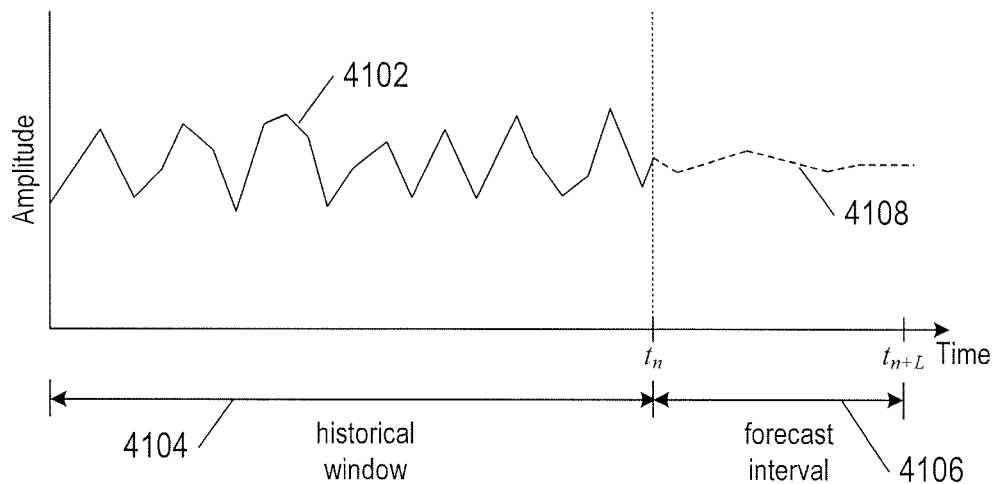
FIG. 41A shows a plot of example stochastic metric data and forecast metric data over a forecast interval.

FIG. 41A shows a plot of example stochastic metric data and forecast metric data over a forecast interval. Jagged curve 4102 represents a non-seasonal, non-pulse-wave sequence of metric data over historical window 4104. At time stamp $t_n$, a forecast is requested for a forecast interval 4106. The parameters of the stochastic process models are computed from the sequence of metric data in the historical window 4106 as described above. Jagged dashed-line curve 4108 represents forecast metric data computed using Equation (29) at lead times in the forecast interval 4106.

(2) When the stream of metric data in the historical window is characterized by a pulse wave, the pulse wave pattern is forecast in block 2912 using parameters of a back-sliding histogram determined as described above with reference to FIGS. 37A-37B:

$$\tilde{z}_{n+l} = T_{n+l} + a_{n+l} + S(A, pw, p) \quad (30)$$

where $$S(A, pw, p) = \begin{cases} A & t_s + mp \le t_{n+l} \le t_s + m(p+pw) \\ 0 & t_{n+l} < t_s + mp \text{ and } t_s + m(p+pw) < t_{n+l} \end{cases}$$

$$m = 1, 2, \ldots \text{ for } t_s + mp \le t_{n+L}.$$

Figure 41B:
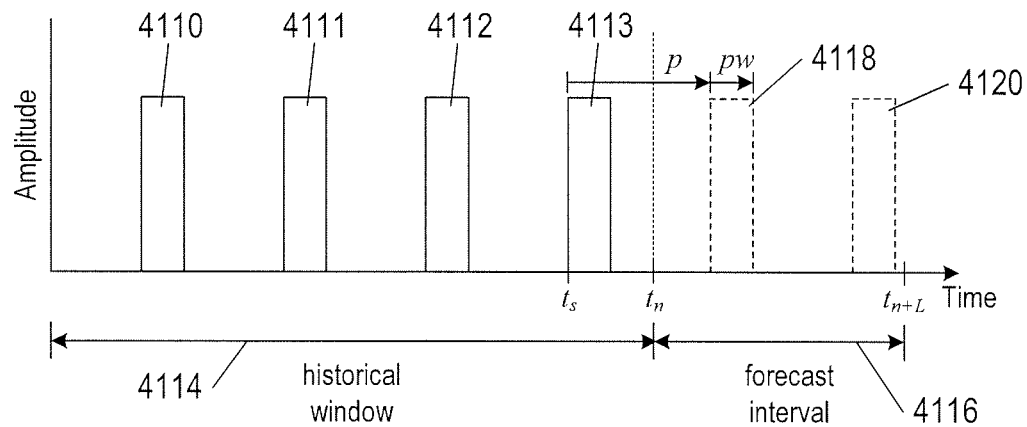
FIG. 41B shows a plot of example pulse-wave metric data and forecast metric data over a forecast interval.

FIG. 41B shows a plot of example trendy, pulse-wave metric data and forecast metric data over a forecast interval. Pulses 4110-4113 represent a sequence of pulse wave metric data over historical window 4114. At time stamp $t_n$, a forecast is requested for a forecast interval 4116. Upward edges of forecast pulses in the forecast interval 3114 are given by $(t_s+mp, A+T_{n+l}+a_{n+l})$ and downward edges of forecast pulses in the forecast model are given by $(t_s+m(p+pw), A+T_{n+l}+a_{n+l})$. Dashed-line pulses 4118 and 4120 represent two forecast pulses of metric data computed using Equation (30) over the forecast interval 4116.

(3) When the stream of metric data in the historical window is seasonal, metric data are forecast in block 2912 using a seasonal period model with principal period P as follows:

$$\tilde{z}n+l = T_{n+l}a_{n+l} + S_{(n+l) \bmod P} \quad (31)$$

where

P is the principal period (i.e., $P=N/k^*$); and $S_{(n+l) \bmod P} = z_{(n-P+l) \bmod P}$.

Figure 41C:
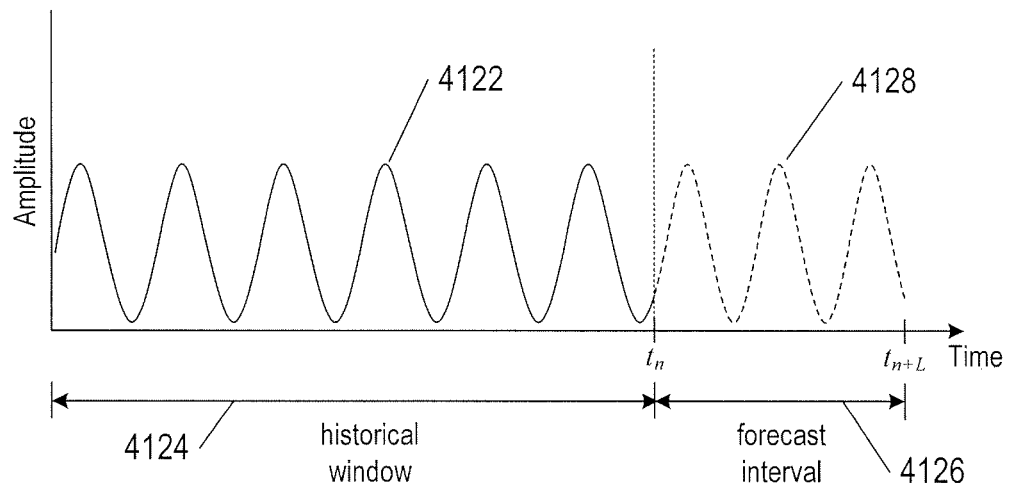
FIG. 41C shows a plot of example seasonal metric data and forecast metric data over a forecast interval.

FIG. 41C shows a plot of example seasonal metric data and forecast metric data over a forecast interval. Sinusoidal curve 4122 represents seasonal metric data over the historical window 4124. At time stamp $t_n$, a forecast is requested for a forecast interval 4126. The principal period of the seasonal periodic model is computed from the sequence of metric data in the historical window 4124 as described above with reference to FIGS. 39-40C. Dashed curve 4128 represents forecast metric data computed using Equation (31) over the forecast interval 4126.

Forecast Confidence Intervals Model

The forecast confidence intervals model 2704 in FIG. 27A is computed in block 2913 of FIG. 29. A forecast confidence intervals model comprises upper and lower confidence bounds centered on forecast metric values in a forecast interval. An upper confidence bound is given by $$uc_{n+l} = \tilde{z}_{n+l} + C\sigma(l) \quad (32a)$$

and a lower confidence bound is given by $$lc_{n+l} = \tilde{z}_{n+l} - C\sigma(l) \quad (32b)$$

where

C is a confidence interval coefficient; and $\sigma(l)$ is an estimated standard deviation of the l-th lead time in the forecast interval.

The upper and lower confidence bounds are limits of a confidence interval denoted by $[lc_{n+l}, uc_{n+l}]$ and centered on a forecast metric value $\tilde{z}_{n+l}$. The confidence interval coefficient C corresponds to a probability that a metric value in the forecast interval will lie in the confidence interval $[lc_{n+l}, uc_{n+l}]$. Examples of confidence interval coefficients are provided in the following table:

| Coefficient (C) | Percentage (%) |
| --- | --- |
| 2.58 | 99 |
| 1.96 | 95 |
| 1.64 | 90 |
| 1.44 | 85 |
| 1.28 | 80 |
| 0.67 | 50 |

For example, a 95% confidence gives a confidence interval $[\tilde{z}_{n+l}-1.96\sigma(l), \tilde{z}_{n+l}+1.96\sigma(l)]$. In other words, there is a 95% chance that the n+l-th metric value will lie within the confidence interval.

When forecasting is executed using one of the stochastic models, as described above with reference to Equation (29), the estimated standard deviation $\sigma(l)$ in Equations (32a)-(32b) is given by:

$$\sigma(l) = \sqrt{\sigma_a^2 \sum_{j=1}^{l-1} \psi_j^2} \quad (33)$$

where the $\psi_j$'s are weights.

The estimated standard deviation of Equation (33) increases parabolically as the lead time index l increases. The weights $\psi_j$ in Equation (33) are recursively computed based on the autoregressive and moving-average weight parameters described above with reference to Equation (7a). When forecasting is executed using an AR model represented by Equation (13), the weights of Equation (33) are computed recursively using:

$$\psi_j = \sum_{i=1}^{p} \phi_i \psi_{j-i} \quad (34a)$$

where $\psi_0 = 1$.

When forecasting is executed using an ARMA model represented by Equation (7a), the weights of Equation (33) are computed recursively using:

$$\psi_j = \sum_{i=1}^{p} \phi_i \psi_{j-i} - \theta_j \quad (34b)$$

where $\theta_j = 0$ for $j > q$.

When forecasting is executed using an ARIMA model represented by Equation (14), the weights of Equation (33) are computed recursively as follows:

$$\psi_j = \sum_{i=1}^{p+d} \phi_i \psi_{j-i} - \theta_j \quad (34c)$$

When forecasting is executed using one of the stochastic models, pulse wave model, or the seasonal period model, as described above with reference to Equations (29)-(31), the estimated standard deviation σ(l) may be a residual standard deviation computed as follows:

$$\sigma(l) = \sigma = \sqrt{\frac{1}{n-1}\sum_{i=1}^{n}(\tilde{z}_n - z_n)^2} \quad (35)$$

where $\tilde{z}_n$ are forecast metric values computed using Equation (29) or (31) in the historical window. When a new metric value satisfies the condition $$lc_{n+l} \le z_{n+l} \le uc_{n+l} \quad (36)$$

the new metric value is normal. On the other hand, when a new metric value satisfies either of the conditions $$lc_{n+l} > z_{n+l} \quad (37a)$$

$$z_{n+l} > uc_{n+l} \quad (37b)$$

the new metric value is abnormal, which triggers an alert identifying the resource or object associated with the stream of metric data as exhibiting anomalous behavior.

Figure 42A:
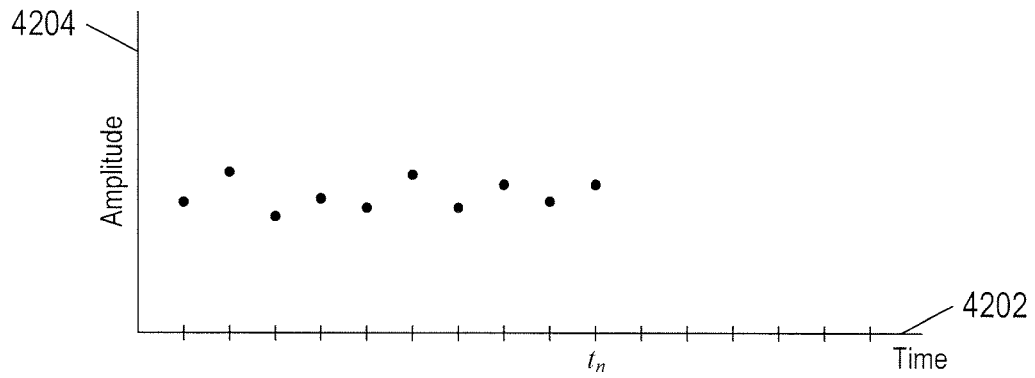
FIGS. 42A-42C show an example of a forecast confidence intervals model constructed for stochastic metric data.
Figure 42B:
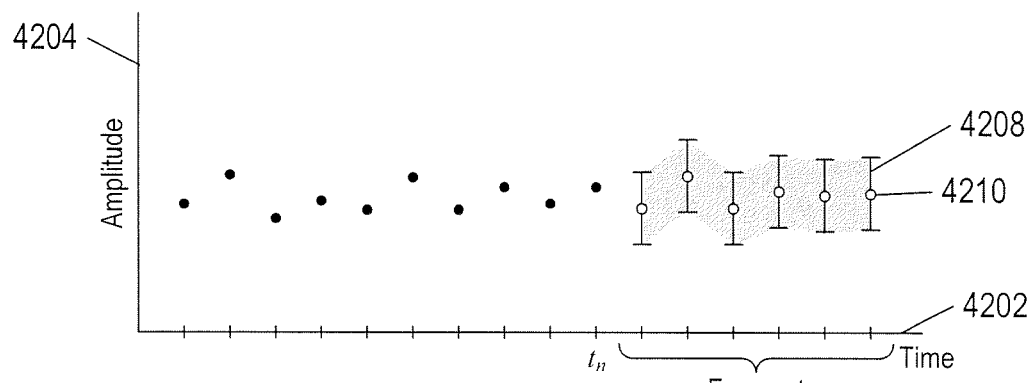
Figure 42C:
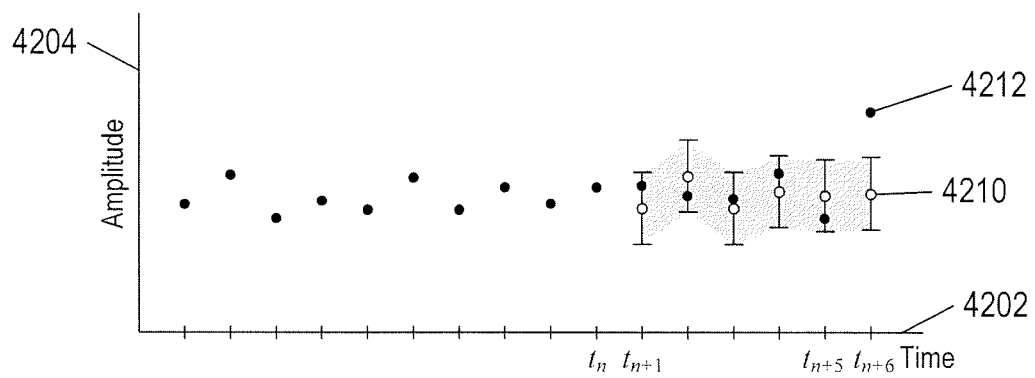

FIGS. 42A-42C show an example of a forecast confidence intervals model constructed for stochastic metric data. In FIGS. 42A-42C, horizontal axis 4202 is a time axis, vertical axis 4204 is a range of metric value, and solid dots represent metric values generated by a metric source. FIG. 42A shows a sequence of metric data in a historical window that ends at time stamp $t_n$. FIG. 42B shows forecast metric values represented by open dots computed in a forecast interval 4206 using one of the stochastic models described above. Confidence intervals are centered at each forecast metric value, such as confidence interval 4208 centered on forecast metric value 4210. In FIG. 42C, as new metric values with time stamps greater than time stamp $t_n$ are received and added to the sequence of metric data, each new metric value is compared to the upper and lower confidence bounds of the confidence interval to detect anomalous metric values. For example, metric values between time stamps $t_{n+1}$ and $t_{n+5}$ are within the confidence interval, but a metric value 4212 at time stamp $t_{n+6}$ is outside the confidence interval 4208, triggering an alert that identifies the resource associated with the stream of metric data as exhibiting anomalous behavior. The time stamp $t_{n+6}$ is identified as a point in time when anomalous behavior at the associated resource begins.

Figure 43A:
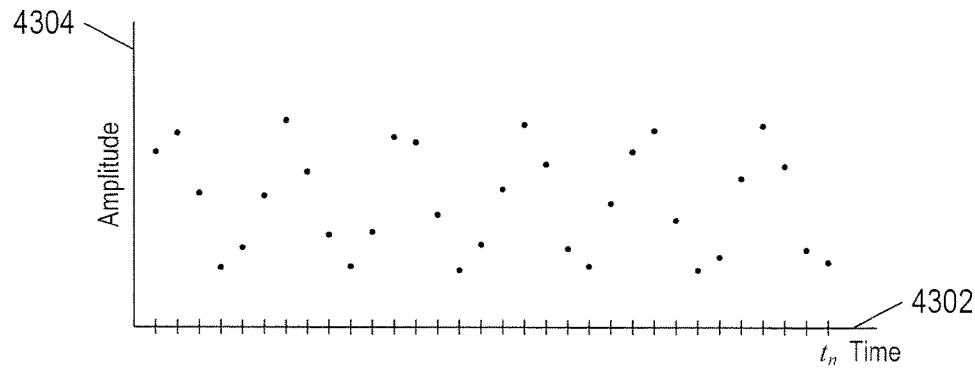
FIGS. 43A-43C show an example of a forecast confidence intervals model constructed for seasonal metric data.
Figure 43B:
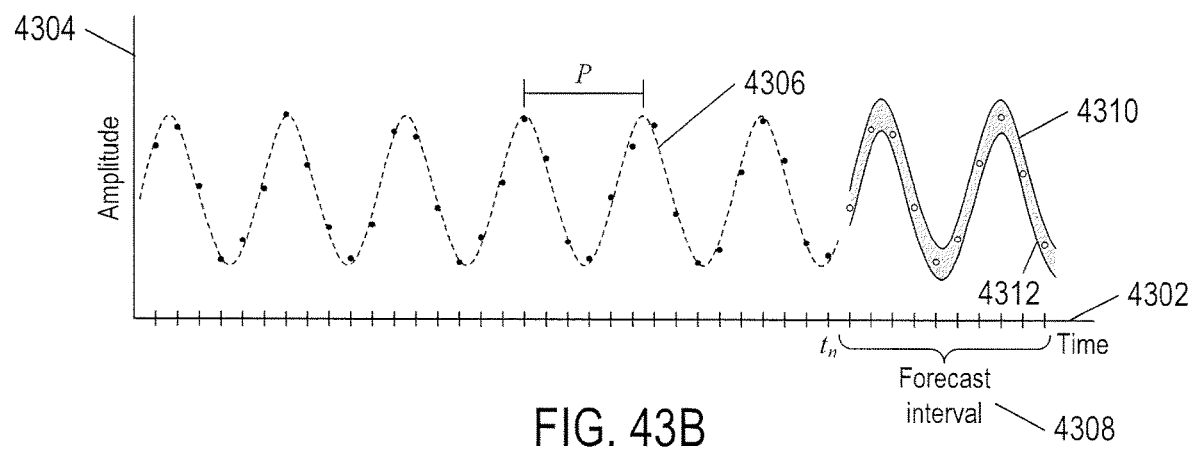
Figure 43C:
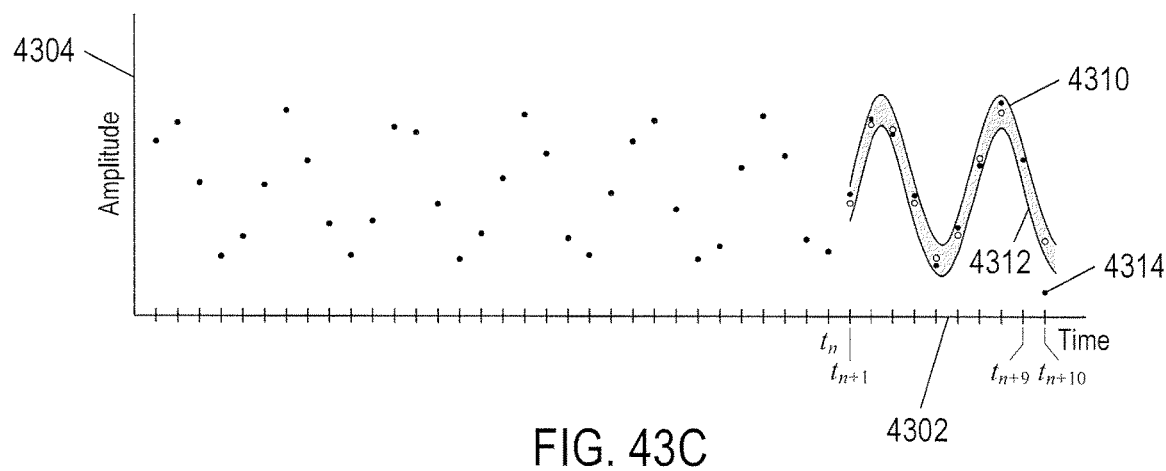

FIGS. 43A-43C show an example of a forecast confidence intervals model constructed for seasonal metric data. In FIGS. 43A-43C, horizontal axis 4302 is a time axis, vertical axis 4304 is a range of metric values, and solid dots represent metric values generated by a metric source. FIG. 43A shows a sequence of metric data in a historical window that ends at time stamp $t_n$. In FIG. 43B, dashed curve 4306 represents the sinusoidal behavior of the metric values with a principal period P. Forecast metric values represented by open dots are computed in a forecast interval 4308 for the seasonal model described above. Confidence intervals are centered at forecast metric values. For example, curves 4310 and 4312 represent upper and lower confidence bounds. In FIG. 43C, as new metric values with time stamps greater than time stamp $t_n$ are received and added to the sequence of metric data, each new metric value is compared with the upper and lower confidence bounds to detect anomalous metric values. For example, metric values between time stamps $t_{n+1}$ and $t_{n+9}$ are within the confidence intervals, but a metric value 4314 at time stamp $t_{n+10}$ is outside the lower bound 4312, triggering an alert that identifies the resource or object associate with the stream of metric data as exhibiting anomalous behavior. The time stamp $t_{n+10}$ is identified as a point in time when anomalous behavior at the associated resource begins.

Standard-Score Model

In one implementation, the standard-score model 2705 in FIG. 27A may be a measure of the number of standard deviations that a metric value of a stream of metric data is away from a mean value of related streams of metric data. The related streams of metric data may be associated with the same type of resource or object being observed or measured. For example, consider a number M of the same type of resource, such as CPU's of a cluster of server computers, memory of all the server computers of the distributed computing system, and the M resources of resource pool used by a VDC. The standard-score model is given by $$z_{n,m} = \frac{|z_{n,m} - \mu_n|}{s_i} \quad (38a)$$

where $z_{n,m}$ is a metric value of a stream of metric data at time stamp $t_n$ for an m-th resource of the M related resources or objects;

$\mu_n$ is the mean of M metric values of the M streams of metric data at time stamp $t_n$:

$$\mu_n = \frac{1}{M}\sum_{m=1}^{M} z_{n,m}$$

and $s_n$ is the sample standard deviation of the M metric values of the M streams of metric data at the time stamp $t_i$:

$$s_n = \sqrt{\frac{1}{M-1}\sum_{m=1}^{M}(z_{n,m} - \mu_n)^2}$$

In one implementation, the standard-score model anomaly detector in block 2711 of FIG. 27A uses a standard-score threshold for detecting anomalous metric values given by $$Th_G = \frac{(M-1)}{M}\sqrt{\frac{(t_{\alpha/2M, M-2})^2}{M-2+(t_{\alpha/2M, M-2})^2}} \quad (38b)$$

where $t_{\alpha/2M,M-2}$ is the critical value of a t-distribution of the metric values of the M streams of metric data at the time stamp $t_i$ with M−2 degrees of freedom and a significance level of α/2M.

The critical value of a t-distribution with M−2 degrees of freedom can be computed with a percent point function (i.e., inverse of cumulative distribution function) of the t-distribution. The t-distribution does not exist in closed form and is numerically approximated. When the standard-score model satisfies the condition, $Z_{i,m} > Th_G$, the $z_{i,m}$ metric value indicates anomalous behavior at the resource associated with the m-th stream of metric data. The time stamp $t_i$ is identified as a point in time when anomalous behavior at the associated resource begins. When the standard-score model satisfies the $Z_{i,m} \le Th_G$, the $z_{i,m}$ metric value indicates normal behavior at the resource. In another implementation, the standard-score model anomaly detector in block 2711 of FIG. 27A may be implemented with using upper and lower bounds that are based on the standard-score threshold in Equation (38b). An upper bound for each metric value of the M streams of metric data is given by:

$$ub_{i,m} = \mu_i + s_i Th_G \qquad (38c)$$

and a lower bound is given by $$ul_{i,m} = \mu_i - s_i Th_G \qquad (38d)$$

When the metric value, satisfies the condition, $ul_{i,m} \leq z_{i,m} \leq ub_{i,m}$, the metric value indicates normal behavior for the associated resource or object. When the metric value, $z_{i,m}$, satisfies $ul_{i,m} > z_{i,m}$ or $z_{i,m} > ub_{i,m}$ the metric value is abnormal, which triggers an alert identifying the resource or object associated with the stream of metric data as exhibiting anomalous behavior. The corresponding time stamp $t_i$ is identified as a point in time when anomalous behavior at the associated resource begins.

Figure 44:
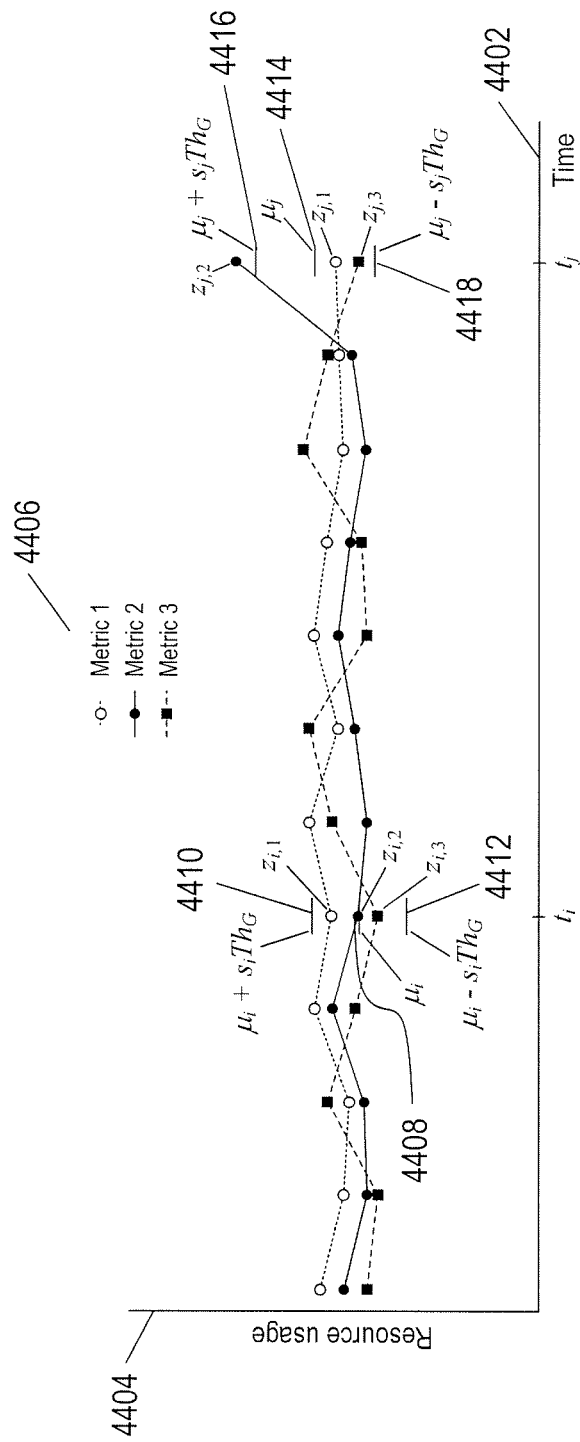
FIG. 44 shows a plot of three example streams of metric data for three related resources or objects.

FIG. 44 shows a plot of three example streams of metric data for three (i.e., M=3) related resources of an object. Horizontal axis 4402 is time. Vertical axis 4404 is a range of resource usage for the three resources. FIG. 44 includes a legend 4606 of line patterns and symbols that identify the three streams of metric data. At time stamp $t_i$, line 4408 represents the mean $\mu_i$ of the metric values $z_{i,1}$, $z_{i,2}$, and $z_{i,3}$. The metric values $z_{i,1}$, $z_{i,2}$, and $z_{i,3}$ lie between upper and lower bounds represented by lines 3410 and 3412, respectively. At a later time stamp $t_j$, line 4414 represents the mean $\mu_j$ of the metric values $z_{j,1}$, $z_{j,2}$, and $z_{j,3}$. The metric values $z_{j,1}$ and $z_{j,3}$ lie between the upper and lower bounds represented by lines 4416 and 4418, respectively. However, the metric value $z_{j,2}$ is greater than the upper bound 4416, which triggers an alert indicating an anomaly in the stream of metric data and anomalous behavior at the associated resource. The corresponding time stamp $t_j$ is identified as a point in time when anomalous behavior at the associated resource associated with the metric 2 begins.

In another implementation, the standard-score model 2705 in FIG. 27A may be a measure of the number of standard deviations that a metric value of a stream of metric data is away from other metric values in the stream of metric data. For each stream of metric data, the standard-score model based on the K most recently generated metric values in a stream of metric data is given by $$Z_n = \frac{|z_n - \mu|}{s} \qquad (39a)$$

where $z_n$ is a metric value of a stream of metric data at time stamp $t_n$;

$\mu$ is the mean of the K most recently generated metric values in the stream of metric data:

$$\mu = \frac{1}{K} \sum_{i=1}^{K} z_{n-k+i}$$

and s is the sample standard deviation of the K most recently generated metric values in the stream of metric data:

$$s = \sqrt{\frac{1}{K-1} \sum_{i=1}^{K} (z_{n-K+1} - \mu)^2}$$

In one implementation, the standard-score model anomaly detector in block 2711 of FIG. 27A uses a standard-score threshold for detecting anomalous metric values given by $$Th_G = \frac{(K-1)}{K} \sqrt{\frac{(t_{\alpha/2K, K-2})^2}{K - 2 + (t_{\alpha/2K, K-2})^2}} \qquad (39b)$$

where $t_{\alpha/2K, K-2}$ is the critical value of a t-distribution of the metric values of the stream of metric data at the time stamp $t_n$ with K−2 degrees of freedom and a significance level of α/2K.

The critical value of a t-distribution with K−2 degrees of freedom can be computed with a percent point function (i.e., inverse of cumulative distribution function) of the t-distribution. The t-distribution does not exist in closed form and is numerically approximated. When the standard-score model satisfies the condition, $Z_n > Th_G$, the $z_n$ metric value indicates anomalous behavior at the resource associated with the m-th stream of metric data. The time stamp $t_i$ is identified as a point in time when anomalous behavior at the associated resource begins. When the standard-score model satisfies the $Z_n \leq Th_G$, the $z_n$ metric value indicates normal behavior at the resource. In another implementation, the standard-score model anomaly detector in block 2711 of FIG. 27A may be implemented with using upper and lower bounds that are based on the standard-score threshold in Equation (39b). An upper bound for each metric value of the stream of metric data is given by:

$$ub_n = \mu + s Th_G \qquad (39c)$$

and a lower bound is given by $$ul_n = \mu - s Th_G \qquad (39d)$$

When the metric value, $z_n$, satisfies the condition, $ul_n \leq z_n \leq ub_n$, the metric value indicates normal behavior for the associated resource or object. When the metric value, $z_n$, satisfies $ul_n > z_n$ or $z_n > ub_n$, the metric value is abnormal, which triggers an alert identifying the resource or object as exhibiting anomalous behavior. The corresponding time stamp $t_n$ is identified as a point in time when anomalous behavior at the associated resource begins.

Distance Model

The distance model 2706 in FIG. 27A is a multivariate measure of how many standard deviations a point in a multidimension space is away from the mean of points in the space, where each point represents metric values with the same time stamp. The distance model may be used to detect anomalous behavior that may not necessarily be detectable in a single stream of metric data but appears as anomalous behavior in multiple related streams of metric data. Consider Q objects of a distributed computing system and P different resources of the Q objects. Let indices s1, s2, . . . sP represent P streams of metric data associated with the P resources. The distance model is given by $$md(\vec{z}_{q,i}) = (\vec{z}_{q,i} - \vec{\mu}_i)^T S^{-1} (\vec{z}_{q,i} - \vec{\mu}_i) \qquad (40)$$

where $\vec{z}_{q,i} = (z_{q,i}^{s1}, z_{q,i}^{s2}, \ldots, z_{q,i}^{sP})^T$ represents a usage tuple formed from metric values of the P streams at a time stamp $t_i$ and the q-th object;

$\vec{\mu}_i = (\mu_i^{s1}, \mu_i^{s2}, \ldots, \mu_i^{sP})^T$ represents mean usage tuple of the P streams of the at the time stamp $t_i$ for the Q objects; $S^{-1}$ is the inverse of a covariance matrix formed from the usage tuples; and superscript T denotes the matrix transpose operator.

The usage tuple, $\vec{z}_{q,i}$, and the mean usage tuple, $\vec{\mu}_i$, are points in a P-dimensional resource space of resources used by the Q objects. Each element of the mean usage tuple is computed for each stream (i.e., for p=1, 2, ..., P) and over the number of objects as follows:

$$\mu_i^{sp} = \frac{1}{Q} \sum_{q=1}^{Q} z_{q,i}^{sp} \quad (41)$$

For example, the objects may be ten (i.e., Q=10) VMs that form a VDC running in a distributed computing system or a cluster of ten server computers used to run a distributed application. Suppose CPU usage, memory usage, network usage, and data storage are the resources that have been selected for monitoring the behavior of the ten objects over time. Usage of the four resources by each object is represented by a four-tuple, $\vec{z}_{q,i} = (z_{q,i}^{cpu}, z_{q,i}^{mem}, z_{q,i}^{net}, z_{q,i}^{ds})^T$, with q=1, 2, ..., 10, where $z_{q,i}^{cpu}$ is CPU usage $z_{q,i}^{mem}$ is memory usage, $z_{q,i}^{net}$ is network usage, and $z_{q,i}^{ds}$ is data storage by the q-th resource at the time stamp $t_i$.

The distance model measures the distance from a usage tuple relative to the mean usage tuple in a P-dimensional resource space. The mean usage tuple is a point in the resource space where the mean usage of the metric values at the time stamp $t_i$ intersect. The larger the value of the distance model, md($\vec{z}_{q,i}$), the farther away the usage tuple, $\vec{z}_{q,i}$, is from the mean usage tuple $\vec{\mu}_i$. Anomalous behavior is detected by the distance model anomaly detector 2712 in FIG. 27A when the distance model of Equation (40) is greater than a distance-model threshold as represented by the following condition:

$$md(\vec{z}_{q,i}) \geq Th_D \quad (42)$$

where $Th_D$ is the distance-model threshold.

The distance-model threshold is a hyper-dimensional parameter that is tuned for different use cases. For streams of metric data with metric values distributed according to a normal distribution, the distance-model threshold may be estimated using a chi-squared distribution with a degree of freedom equal to the number of streams of metric data. However, in many cases, streams of metric data do not follow a normal distribution. The distance-model threshold is a hyper-dimensional parameter that is tuned over time for different use cases. When anomalous behavior is detected by a violation of Equation (42), an alert identifying the resources associated with the q-th object are identified as exhibiting anomalous behavior. The corresponding time stamp $t_i$ is identified as a point in time when anomalous behavior at the associated resources begins.

Figure 45A:
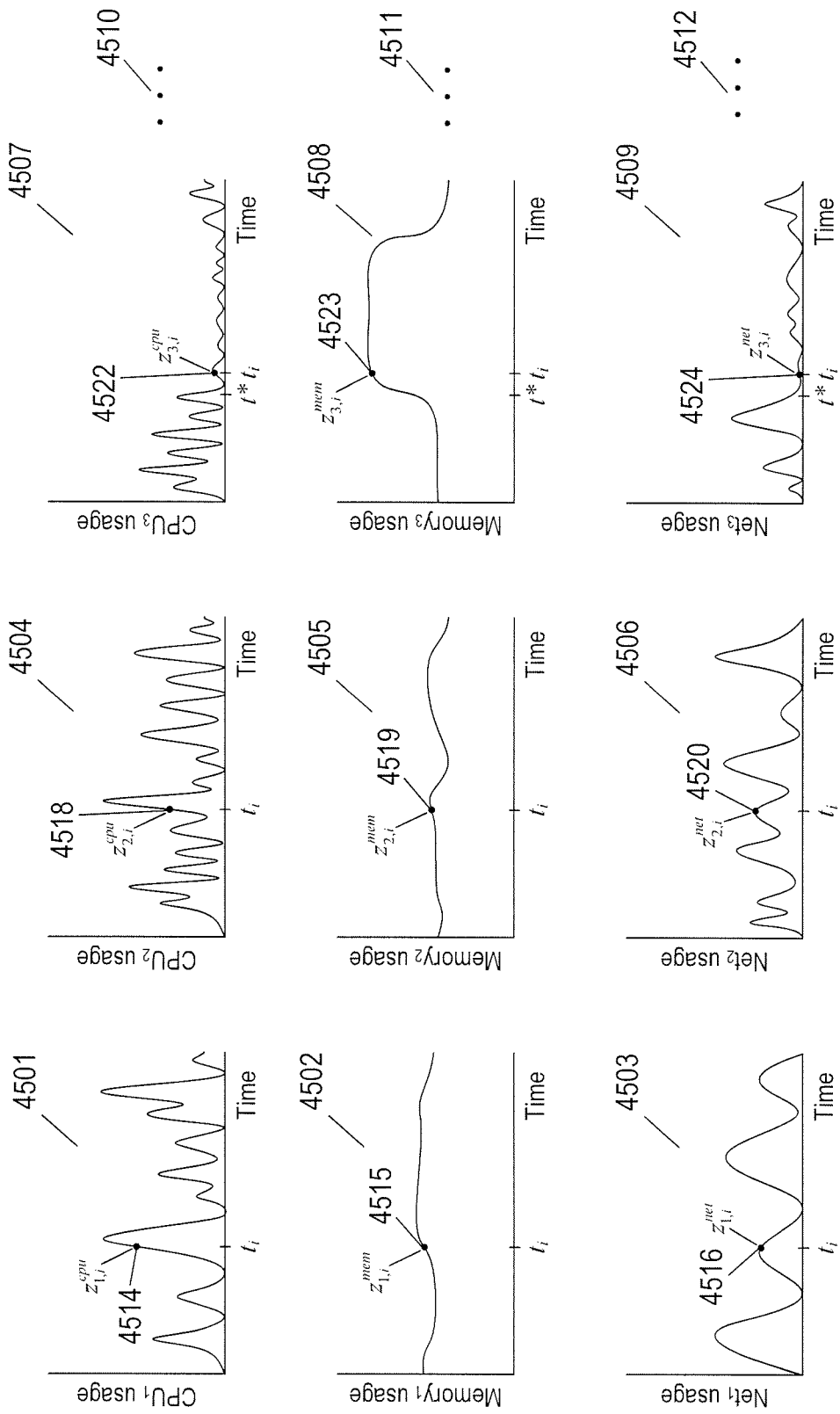
FIG. 45A shows separate plots of CPU usage, memory usage, and network usage.

FIG. 45A shows separate plots of CPU usage, memory usage, and network usage for three of 50 objects of a distributed computing system. Plots 4501-4503 show CPU usage, memory usage, and network usage for a first object. Plots 4504-4506 show CPU usage, memory usage, and network usage for a second object. Plots 4507-4509 show CPU usage, memory usage, and network usage for a third object. Ellipses 4510-4512 represent CPU usage, memory usage, and network usage for the 47 remaining objects not shown. The plots reveal that CPU, memory, and network usage for the first and second objects appear correlated but are not correlated with the CPU, memory, and network usage for the third object. For example, at about time stamp t*, the CPU and network usage in plots 4507 and 4509 decrease to nearly zero while memory usage in plot 4508 increases and remains high for a period of time. This behavior is not exhibited by corresponding plots of the first and second objects. Usage tuples of the distance model are created from points with the same time stamp for each object. For example, points 4514-4516 are elements of a usage tuple, $\vec{z}_{1,i} = (z_{1,i}^{cpu}, z_{1,i}^{mem}, z_{1,i}^{net})^T$, for the first object at the time stamp $t_i$. Points 4518-4520 form elements of a usage tuple, $\vec{z}_{2,i} = (z_{2,i}^{cpu}, z_{2,i}^{mem}, z_{2,i}^{net})^T$, for the second object at the time stamp $t_i$. Points 4522-4524 are elements of a usage tuple, $\vec{z}_{3,i} = (z_{3,i}^{cpu}, z_{3,i}^{mem}, z_{3,i}^{net})^T$, for the third object at the time stamp $t_i$.

Figures 45B, 46:
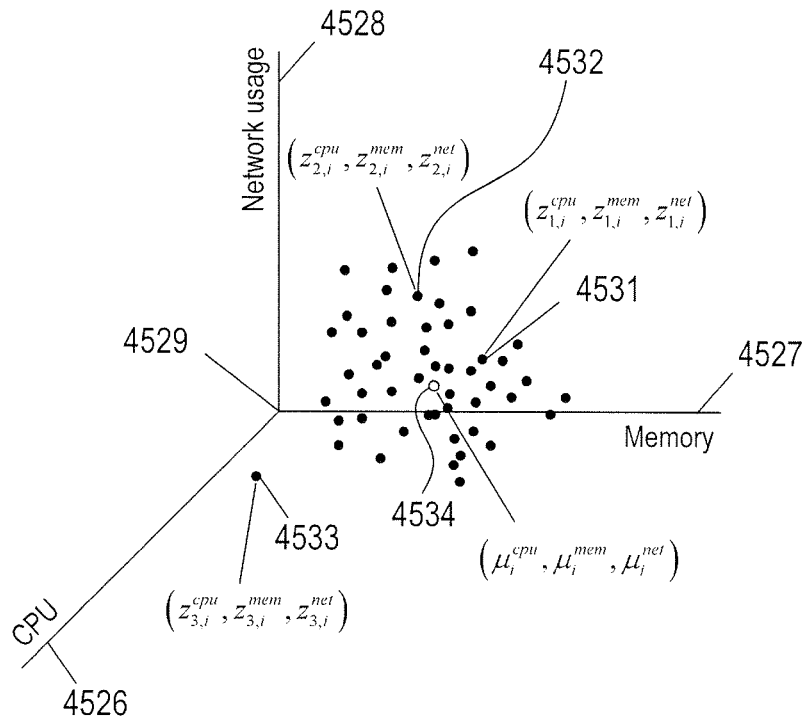
FIG. 45B shows a plot of usage three-tuples for objects at the same time stamp.
FIG. 46 shows an example of a covariance matrix.

FIG. 45B shows a plot of usage tuples for the 50 objects at the same time stamp $t_i$. Axis 4526 represents a range of CPU usage. Axis 4527 represents a range of memory usage. Axis 4528 represents a range of network usage. The axes 4526-4528 intersect at the origin of a three-dimensional resource space for CPU, memory, and network usage. Solid dots represent the CPU, memory, and network usage for the 50 objects at the time stamp $t_i$. For example, points 4531-4533 represent the usage tuples $\vec{z}_{1,i}$, $\vec{z}_{2,i}$ and $\vec{z}_{3,i}$ represented in FIG. 45A. Open dot 4534 represents the mean-usage tuple $\vec{\mu}_i$ at the time stamp $t_i$. Note that 49 usage tuples are clustered around the mean-usage tuple 4534 while the usage tuple $\vec{z}_{3,i}$ is located away from the cluster. When the distance model md($\vec{z}_{3,i}$) $\geq Th_D$, the corresponding time stamp $t_i$ is identified as a point in time when the resources associated with the object exhibit anomalous behavior.

The distance model in Equation (40) is in the form of the Mahalanobis distance. The inverse covariance matrix $S^{-1}$ rescales the distance by removing correlation between the usage tuples and the mean-usage tuple. In other words, the distance model is unitless and scale invariant.

FIG. 46 shows an example of a covariance matrix S for P streams of metric data. The covariance matrix is a symmetric matrix. For each time stamp $t_i$, elements of the covariance matrix are computed according to:

$$\text{cov}(sj, sk) = \frac{1}{Q} \sum_{q=1}^{Q} (x_{q,i}^{sj} - \mu_i^{sj})(x_{q,i}^{sk} - \mu_i^{sk})$$

where $j = 1, 2, \ldots, P$ and $k = 1, 2, \ldots, P$.

The mean-usage tuple $\vec{\mu}_i$ and the inverses covariance matrix $S^{-1}$ may be estimated for streaming metric data. The inverse covariance matrix may be updated by using a running sum of accumulators. The inverse covariance matrix $S^{-1}$ in Equation (40) may be replaced by the Moore-Penrose inverse to obtain an approximate inverse covariance matrix given by:

$$S^+ = S^T(SS^T)^{-1}$$

The Sherman-Morrison formula may be applied to the approximate inverse covariance matrix in order to accommodate real time processing of streaming metric data.

Principal-Frequency Model

The stochastic models, standard-score model, and distance model are used to detect changes that relate to how one or more streams of metric data vary in magnitude over time. However, certain streams oscillate back and forth between high and low metric values over time in a substantially rhythmic manner, which may be an indication of regular predictable and normal behavior or use of a resource or object. However, a sudden increase or decrease in the frequency of oscillation in metric values of a stream of metric data (i.e., change in oscillation frequency) may be an indication of anomalous behavior at a resource or object. The principal-frequency model 2707 in FIG. 27A gives the principal frequency of a seasonal stream of metric data that is being monitored in order to detect changes in the frequency of oscillation.

Figure 47:
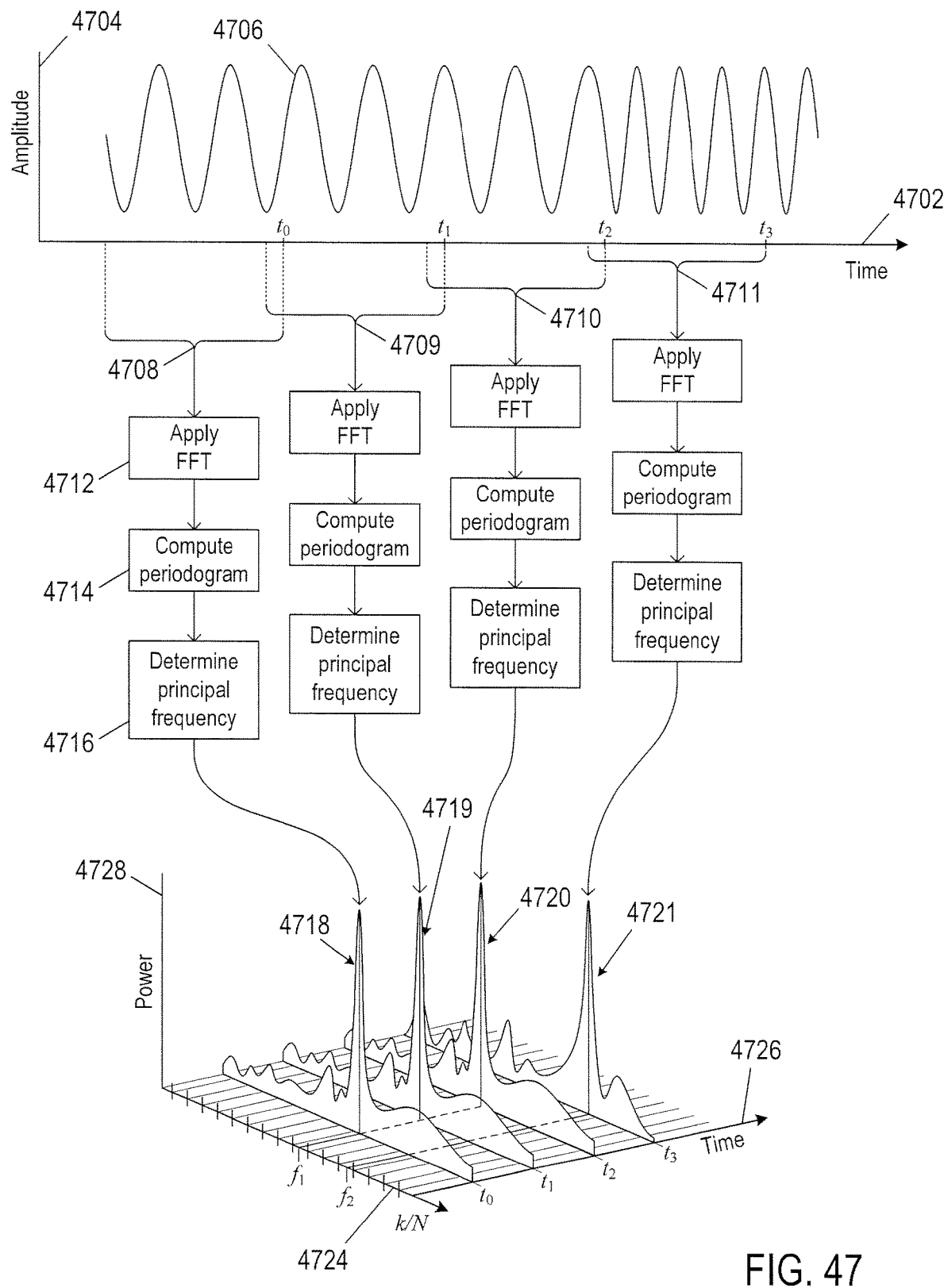
FIG. 47 shows an example of determining a principal frequency in time windows applied to a seasonal stream of metric data.

FIG. 47 shows an example of determining the principal frequency in time windows applied to a seasonal stream of metric data. Horizontal axis 4702 represents time. Vertical axis 4704 represents a range of metric values. Oscillating curve 4706 represents an oscillation in the stream of metric data. Brackets 4708-4711 represent a moving overlapping time window applied to the stream of metric data. For each advance of the time window, an FFT is applied to the new metric values in the latest time window followed by computation of a periodogram and determination of the principal frequency. For example, time window 4708 contains a subsequence of the stream of metric values up to a current time $t_0$. An FFT 4712 is applied to the subsequence followed by computation of a periodogram 4714, as described above with reference to FIG. 39. The principal frequency for metric values in the time window are determined as described above with reference to FIGS. 40A-40C. For new metric values received in subsequent time windows ending at times $t_1$, $t_2$, and $t_3$, the FFT is applied to the metric values in each time window followed by computation of a periodogram and determination of a principal frequency. FIG. 47 shows example plots of periodograms 4718-4721 obtained for each of the corresponding time windows 4708-4711. Axis 4724 represents a range of frequencies. Axis 4726 represents time windows. Axis 4728 represents a range of power. The periodograms 4718-4720 have maximum PSD at a first frequency $f_1$, which is the principal frequency of the stream of metric data in each of the time windows 4708-4710 up to a time $t_2$. However, the stream of metric data 4706 oscillates with a higher frequency after the time $t_2$. As a result, the periodogram 4721 has a maximum PSD at a second frequency $f_2$, which is the principal frequency of the stream of metric data received in the time window 3711 after the time $t_2$.

The principal-frequency model anomaly detector 2713 in FIG. 27A compares the principal frequency of new metric values in a current time window to the principal frequency of metric values in a previous time window. In one implementation, an alert is generated indicating anomalous behavior is observed in the resource or object associated with the stream of metric data, when the following condition is satisfied $$|f_{cur} - f_{prev}| > Th_F \quad (43)$$

where $f_{cur}$ is the principal frequency in a current time window;
$f_{prev}$ is the principal frequency in a previous time window; and
$Th_F$ is a principal frequency threshold.

The corresponding time stamp at the beginning of the current time window is identified as a point in time when anomalous behavior at the associated resources begins.

Event Log Manager

The event log manager 2104 in FIG. 21 performs log message analysis to determine the event type of each log message received and, for each time frame, maintains a record count, or relative frequency, of each event type associated with the application. The event log manager 2104 determines the event type of each log message considering each log message as comprising tokens separated by non-printed characters, referred to as "white space." For example, the date, time, and thread at the beginning of the text contents of a log message, following initial tokenization, become a first token, a second token, and a third token. Next, a token-recognition pass is made to recognize any of the initial tokens as various types of parameters. Parameters are tokens or message fields that are, likely to be highly variable over a set of messages of a particular type. Date/time stamps, for example, are nearly unique for each log message, with two log messages having an identical date/time stamp only in the case that the two log messages are generated within less than a second of one another. Additional examples of parameters include global unique identifiers ("GUIDs"), hypertext transfer protocol status values ("HTTP statuses"), universal resource locators ("URLs"), network addresses, and other types of common information entities that identify variable aspects of an event type. By contrast, the phrase "Error" or "Failure" in a log message likely occur within each of many error and failure recognition log messages. The parametric-valued tokens are discarded leaving the non-parametric text strings, natural language words and phrases, punctuation, parentheses, and brackets. Various types of symbolically encoded values, including dates, times, machine addresses, network addresses, and other such parameters can be recognized using regular expressions or programmatically. Each log message is also subject to textualization in which an additional token-recognition step of the non-parametric portions of the log message is performed in order to remove punctuation and separation symbols, such as parentheses and brackets, commas, and dashes that occur as separate tokens or that occur at the leading and trailing extremities of previously recognized non-parametric tokens. Punctuation, parentheses, and brackets are discarded leaving a textualized log message of interest that comprises only the non-parametric text strings and natural language words and phrases of the original log message. A textualized log message represents an event type. Other textualized log messages with the same non-parametric text strings and natural language words and phrase as the textualized log messages are the same event type.

The event log manager 2104 searches the non-parametric text strings, natural language words, and phrase to identify the different event types and computes relative frequencies of the different event types in each time frame of recorded log messages. The different event types are denoted by event_type$_i$, where i is an event type index. A relative frequency is computed for each event type according to $$D_i = \frac{n(\text{event\_type}_i)}{L} \quad (44)$$

where n(event_type$_i$) is the number of times an event type, event_type$_i$, appears in a time frame; and L is the total number of log messages recorded in the event logs of the distributed application in the time frame. Event types containing errors, failures, faults, or other types of critical status warnings are identified as threatening event types to the performance and functionality of a distributed application and are indications of anomalous behavior occurring at the nodes of the distributed application associated with the threatening event types. A sudden increase or spike in a threatening event type may be an indication that one or more nodes of the distributed application associated with the threatening event type are experiencing anomalous behavior. An alert is generated when the relative frequency of a threatening event type violates a corresponding relative frequency threshold given by:

$$D_i \geq Th_{ET} \quad (45)$$

where $Th_{ET}$ is a relative frequency threshold (i.e., $0 < Th_{ET} < 1$).

Relative frequency thresholds may be defined by administrators and application owners based on the critical status of the corresponding threatening event types.

Anomaly Detection and Troubleshooting

When a problem arises with a distributed application executing in a distributed computing system, the problem typically leaves a trace in the form of changes to the associated metrics and/or the problem may be recorded in log messages of event logs associated with the distributed application. Methods and systems discover nodes comprising the distributed application. Anomaly detection monitors the metrics and event logs associated with the nodes for anomalous behavior in order to identify an approximate point in time when anomalous behavior began to adversely impact performance of the application and generate an alert identifying the approximate point in time when the anomalous behavior started. Troubleshooting techniques described below guide an administrator and/or application owner to investigate the root cause of the anomalous behavior. Appropriate remedial measures may be determined based on the root cause and automatically or manually executed to correct the problem.

Figure 48:
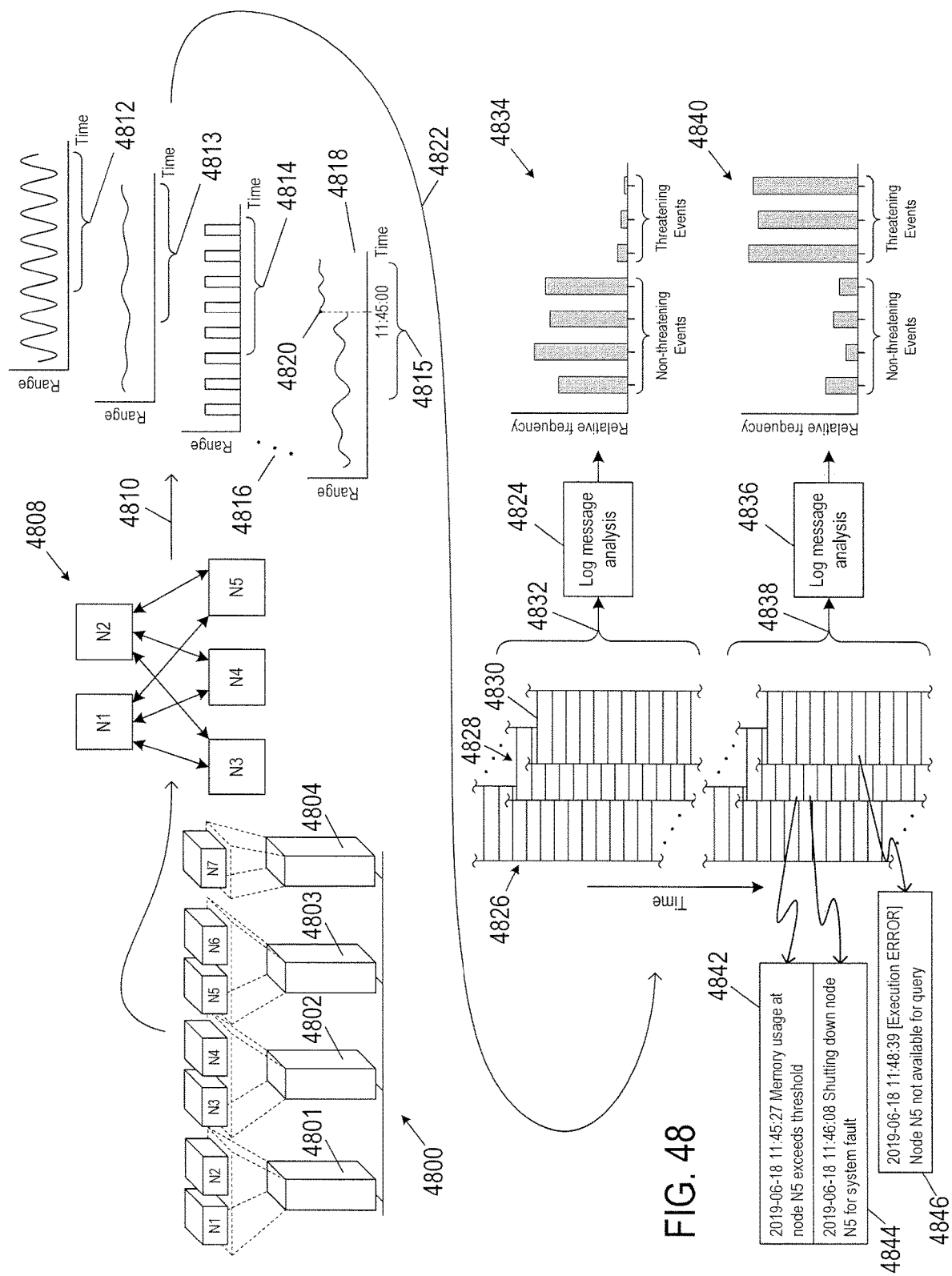
FIG. 48 shows a high-level view of anomaly detection and troubleshooting applied to a multi-node application.

FIG. 48 shows a high-level view of anomaly detection and troubleshooting applied to a multi-node distributed application. In FIG. 48, a cluster of networked server computers 4800 executes seven nodes denoted by N1, N2, N3, N4, N5, N6, and N7. Nodes N1 and N2 execute in server computer 4801. Nodes N3 and N4 execute in server computer 4802. Nodes N5 and N6 executes in server computer 4803. Node N7 executes in server computer 4804. The server computers may be physical server computers or virtual server computers of a VDC. In a first step, represented by directional arrow 4806, the application discovery manager 2102 described above uses the information streamed from agents within the nodes executed on the cluster 4800 to partition the nodes into node groups, each of which represents a different node type. As described above with reference to FIGS. 23B and 24, the application discovery manager 2102 uses the node types and node-to-node connections to organize the nodes into a discrete application 4808 comprising nodes N1, N2, N3, N4, and N5. Although nodes N6 and N7 execute in the cluster 4800, nodes N6 and N7 are not identified as part of the application 4808. In a second step, represented by directional arrow 4810, metrics associated with the application 4808 are identified by the analytics services manager 2106 and the corresponding streams of metric data are passed to metric processors as described above. The streams of metric data are generated by operating systems of the server computers 4801-4803, guest operating systems of the server computers 4801-4803, and the nodes N1, N2, N3, N4, and N5 themselves. The metrics include physical and virtual resource usage, such as memory, cpu, and network usage, and application metrics, such as error rates, response times, and request rates. FIG. 48 shows plots of example streams of metric data associated with the application 4808. Univariate and multivariate performance models described above are determined in a time frame comprising intervals 4812-4815 of the most recently generated metric values of the streams of metric data. Ellipsis 4816 represents additional streams of metric data not shown. The example stream of metric data 4818 represents memory usage by node N5 at the server computer 4803 and shows anomalous behavior at a point in time, 11:45:00, as indicated by a sharp increase 4820 in memory usage. The anomalous behavior may have been identified using one or more of the forecast model, the standard-score model, and the distance model described above. When the point in time of an anomalous event is identified, an alert is generated. In a third step, represented by directional arrow 4822, the event log manager 2104, shown in FIG. 21, performs log message analysis on log messages recorded within the time frame in event logs associated with the distributed application 4808. For example, log message analysis 4824 is performed on log messages recorded in event logs 4826, 4828, and 4830 associated with the nodes N1, N2, N3, N4, and N5 in a first time frame 4832. Bar graph 4834 shows a plot of relative frequencies of non-threatening event messages and threatening event message recorded in the event fogs 4826, 4828, and 4830 in the time frame 4832. Each bar represents the relative frequency of either a non-threatening or threatening event type. Relative frequencies of non-threatening events are much larger that relative frequencies of threatening events. Log message analysis 4836 is performed on log messages recorded in the same event logs 4826, 4828, and 4830 of the nodes N1, N2, N3, N4, and N5 in a later time frame 4838. Bar graph 4840 shows a plot of relative frequencies of non-threatening event messages and threatening log messages recorded in the event logs 4826, 4828, and 4830 in the time frame 4838. Relative frequencies of non-threatening events are smaller than relative frequencies of threatening events. FIG. 48 shows example log messages that begin to appear in the subsequent time frame 4838. The log message 4842 reveals that memory usages at node N5 has exceeded a threshold (i.e., root cause), which is a potential source of anomalous behavior. Log message 4844 reveals that the node N5 is shutting down, which creates subsequent problems for nodes that communicate with node N5 as revealed by log messages 4846.

Once the root cause of anomalous behavior has been identified, remedial measures may be automatically or manually executed to correct the anomalous behavior. Remedial measures include, but are not limited to, increasing the amount of usable capacity of a resource to application nodes; assigning additional resources to the application nodes that use resources exhibiting anomalous behavior; migrating the node that use the anomalous behaving resource to a different server computer with the same resource having a larger usable capacity than the anomalous behaving resource; and creating one or more additional virtual objects from a template of the virtual object used to run the node, the additional virtual objects to share the workload of the virtual object used to run the node.

Figure 49A:
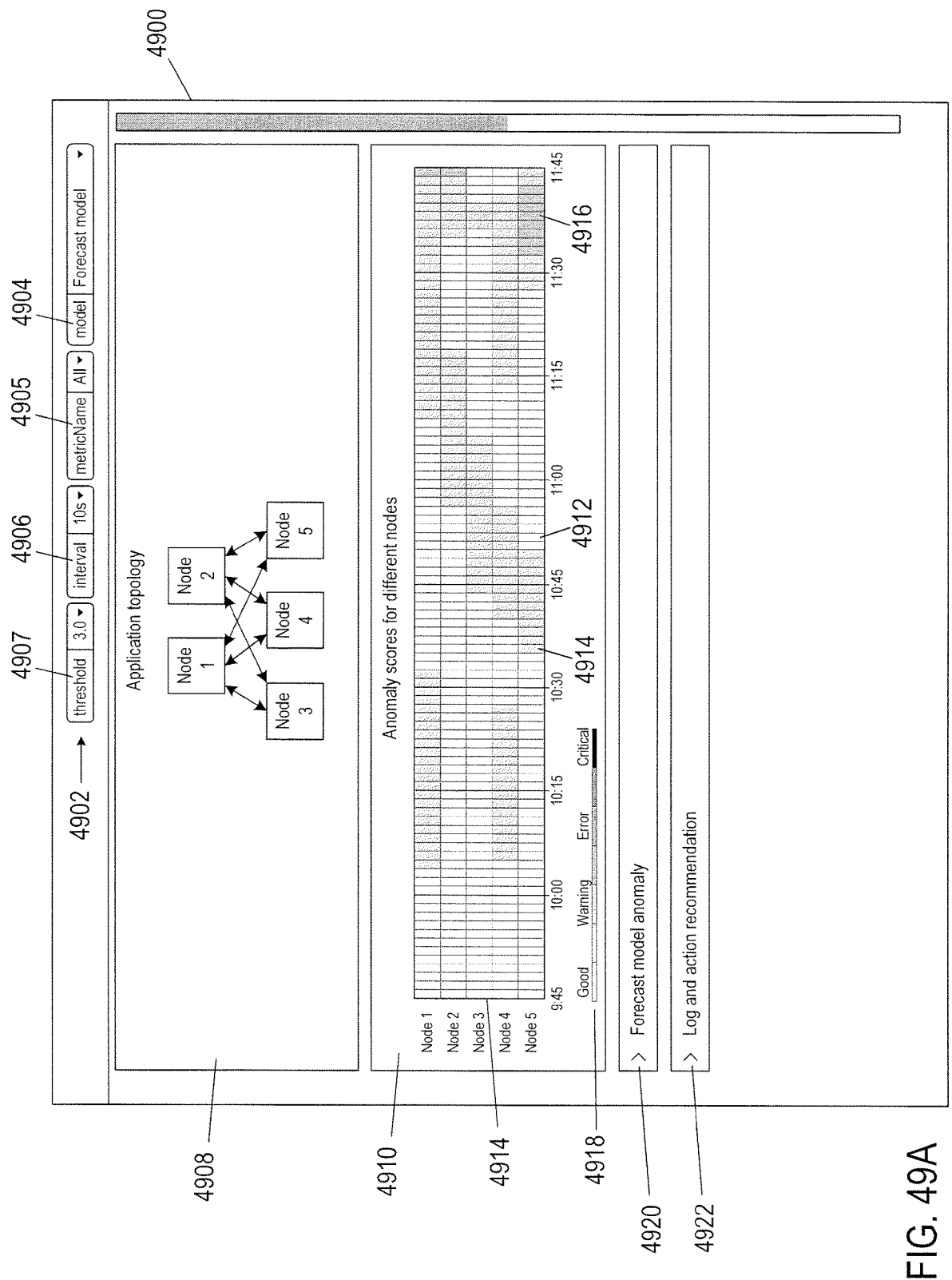
FIGS. 49A-49E show example graphical user interfaces for anomaly detection and troubleshooting applied to a multi-node distributed application.
Figure 49B:
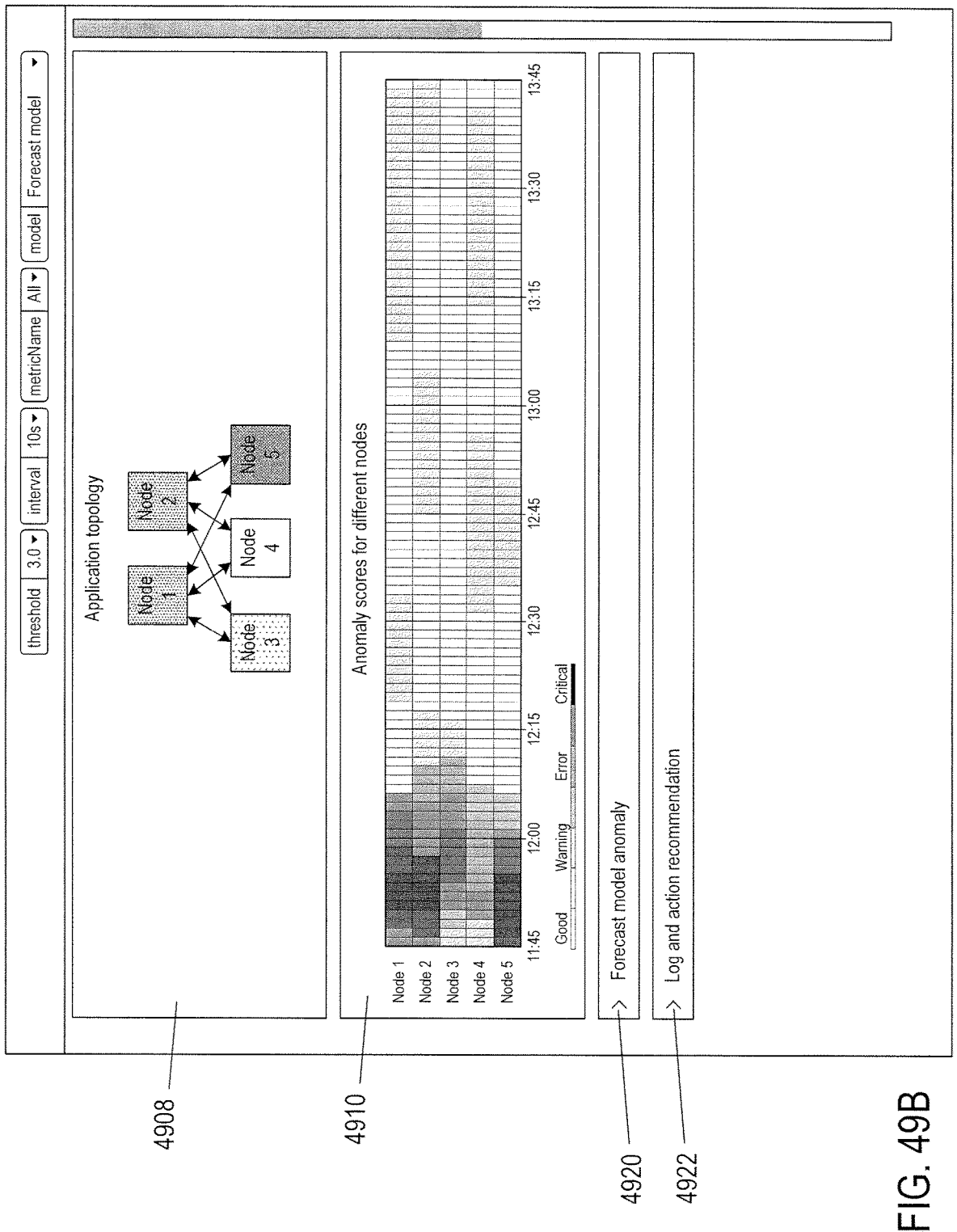
Figure 49C:
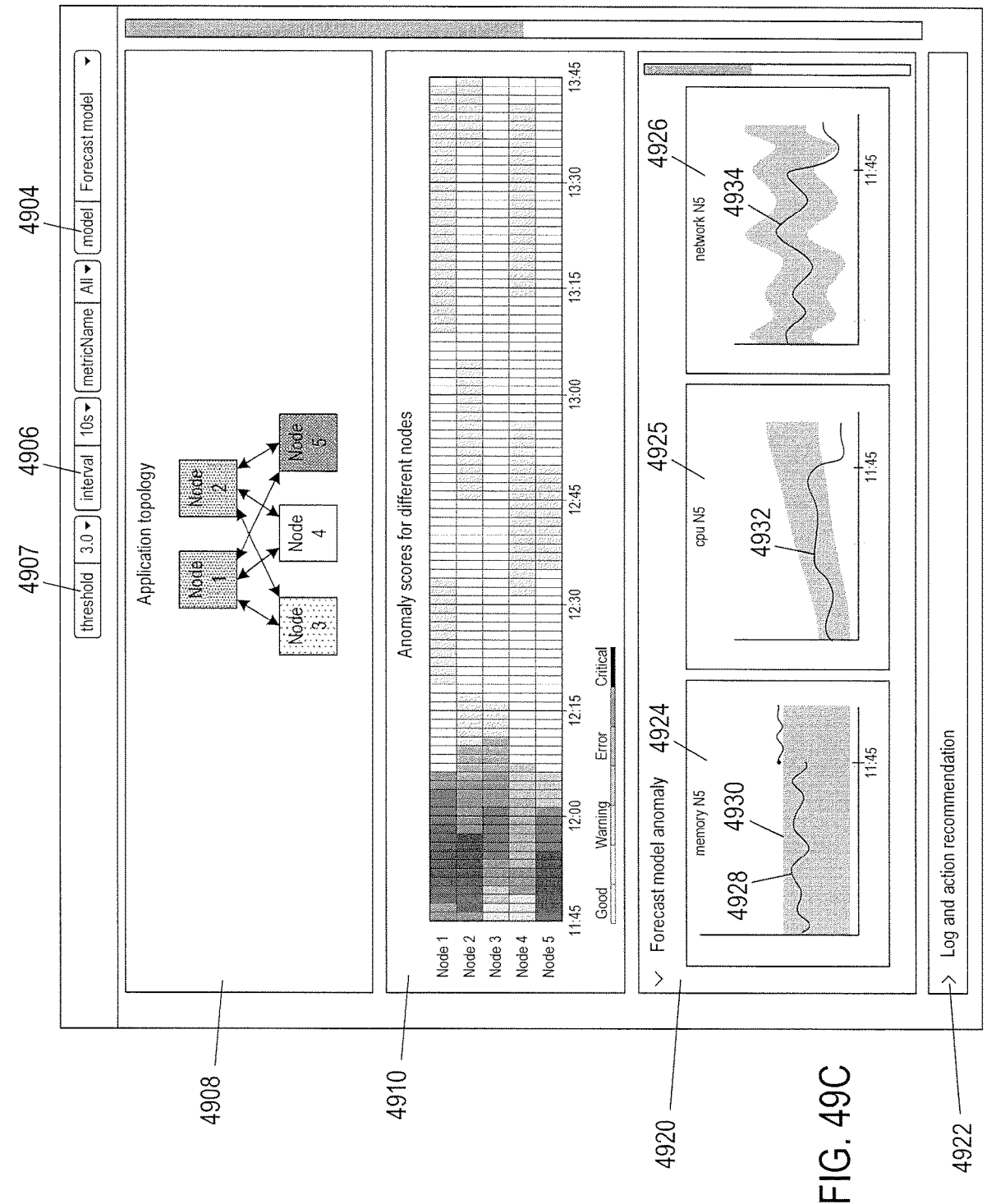

FIGS. 49A-49E show features of an example graphical user interface ("GUI") 4900 for anomaly detection and troubleshooting applied to the multi-node application described above with reference to FIG. 48. The GUI 4900 comprises a settings bar 4902 with buttons 4904-4907 that enable a user to select a performance model, select the metrics associated with the application, duration of the time interval used to detect anomalous behavior, and a threshold for the performance metrics. The GUI 4900 includes an application topology display window 4908 that displays the nodes of the application in square icons and directional arrows that represent node-to-node connections between nodes as described above. The GUI 4900 includes an anomaly scores heat map display window 4910. In the example of FIGS. 49A-49D, the anomaly scores heat map comprises a horizontal time axis 4912, a vertical node axis 4914, and adjacent shaded or colored panels. Each panel represents the state of the node in a time period of about 1 minute and fifteen seconds. The duration of the panels may be longer or shorter in different implementations. Shading or coloring of the panels alerts users to the state of the nodes comprising the application and the severity of anomalous behavior associated with a node. Each panel is shaded according to the magnitude of a value of the selected performance model. Panel shading corresponds to the value of the selected performance model as indicated by a shading spectrum 4918. In FIGS. 49A-49C, increased darkness corresponds to increased criticality of anomalous behavior associated with larger values of the selected performance model applied to resources used by the nodes. In other implementations, the shading associated with the criticality may be reversed. The shading applied to each panel may be determined by a series of thresholds, where each pair of adjacent thresholds corresponds to a shading or color. When the value of the performance model lies within a pair of thresholds, the corresponding shading or color is applied to the panel. The GUI 4900 includes a performance model anomaly window 4920 and a log and action recommendation window 4922.

Figure 49D:
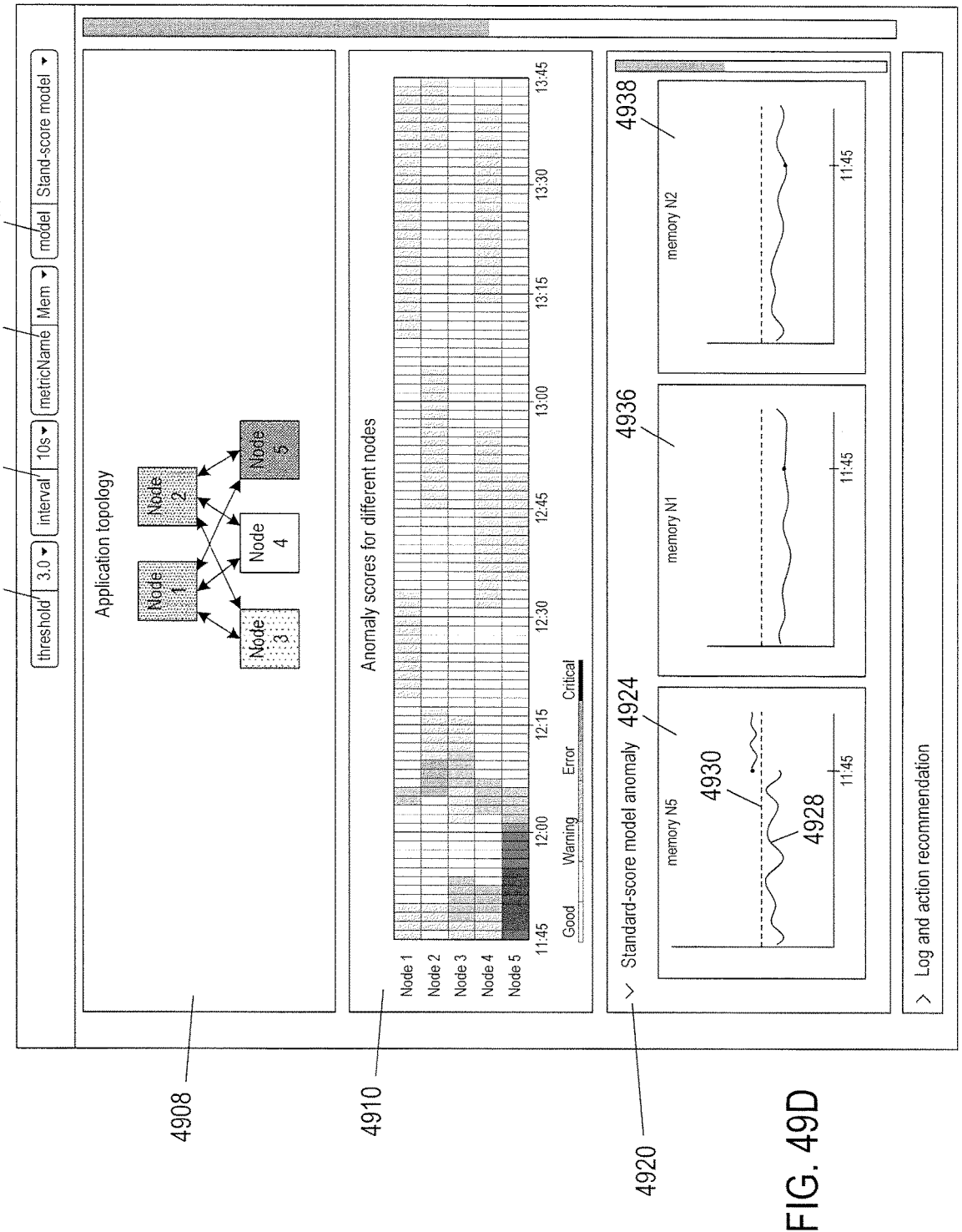
Figure 49E:
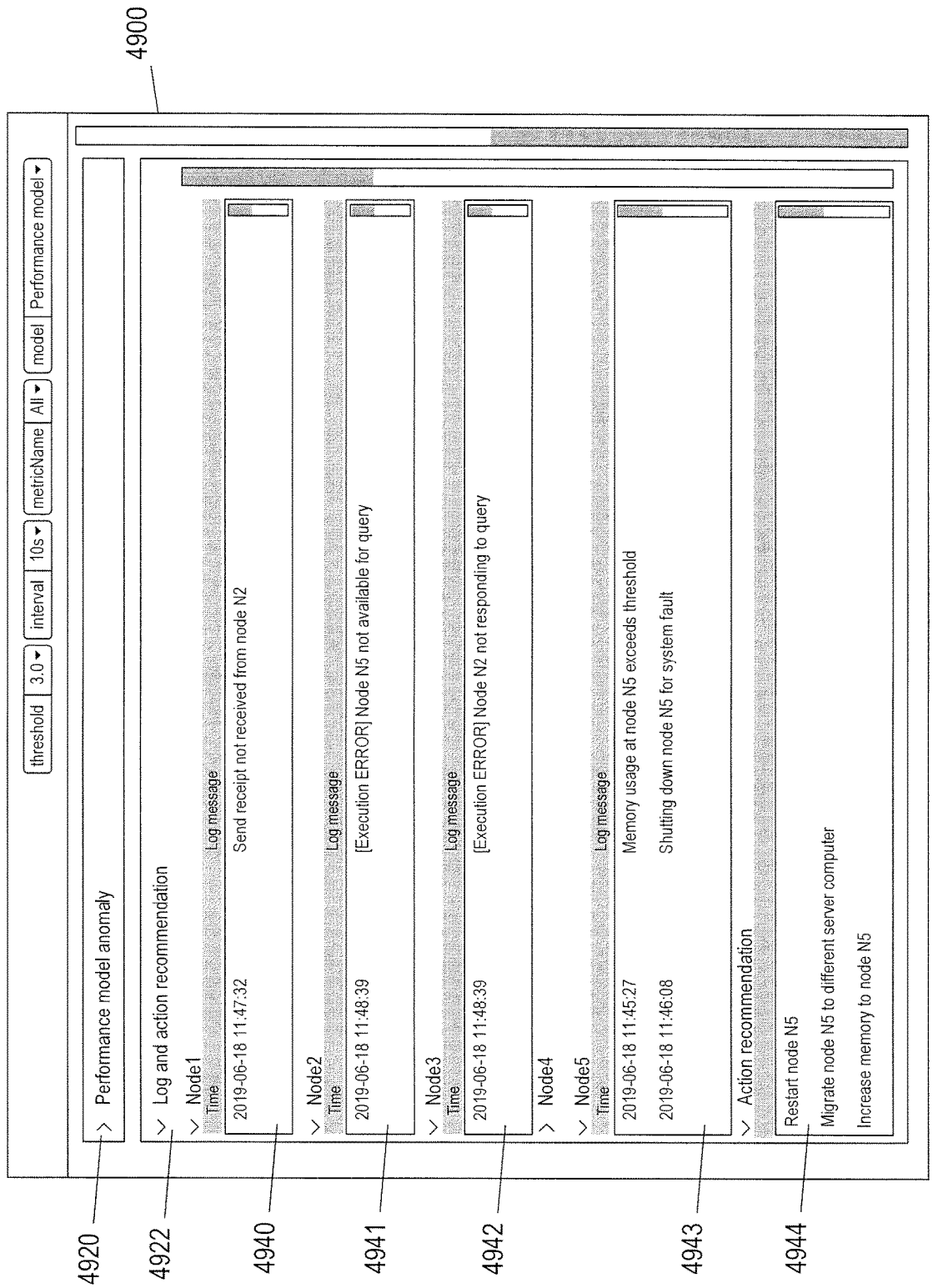

In the example of FIGS. 49A-49C, the forecast model has been selected by a user. In FIG. 49A, panel 4914 indicates node N5 is in a good state and panel 4916 indicates node N5 is in a state between warning and error based on corresponding values of the forecast model. In FIG. 49B, dark shaded panels that begin at about 11:45:00 indicate the start of anomalous behavior that ranges from error to critical for the node N5. Dark shaded panels also appear after 11:45:00 for nodes N1 and N2, indicating that nodes N1 and N2 are exhibiting anomalous behavior. Darker shading is applied to the icons representing nodes N1, N2, and N5 in window 4908 in order to alert a user to anomalous behavior at nodes N1, N2, and N5. In FIG. 49C, a forecast model anomaly window 4920 has been expanded to reveal graphs of the metrics used to calculate the forecast model within the selected time frame 4906 and selected threshold 4907. Graphs 4924-4926 shows a plot of memory, CPU, and network usage for node N5 and associated confidence intervals represented by shading. The memory metric 4928 exceeds a threshold 4930 at 11:45:00 and the CPU metric 4932 and the network metric 4934 drop below lower confidence bounds after 11:45:00. The forecast model anomaly window 4920 includes a scroll bar 4934 that enables the user to view graphs of the resources used to calculate forecast models for nodes N1, N2, N3, and N4. In FIG. 49D, the memory metric 4905 and standard-score model 4904 have been selected. A heat map for the standard-score model is displayed in the anomaly scores heat map display window 4910. The heat map reveals that the standard-score model for the memory associated with the node N5 exhibits anomalous behavior. Expansion of the performance model anomaly window 4920 reveals graphs of memory used to calculate the standard-score model within the time frame 4906 and for the selected threshold 4907. Graphs 4924, 4936, and 4938 show plots of memory usage for nodes N1, N2, and N5. Only the memory associated with node N5 is greater than the threshold 4930. Graphs of distance model and principal-frequency model are produced when the distance and principal-frequency models have been selected. In FIG. 49E, the log and action recommendation window 4922 is expanded and event log windows 4940-4943 of log messages of nodes N1, N2, N3, and N5 recorded in the time frame are displayed. The event log windows 4940-4943 displays the log messages recorded in the time frame described above with reference to FIG. 48. The log messages enable an administrator and/or application owner to troubleshoot the root cause of the anomalous behavior. The log messages may be searched for key words that reveal the anomalous behavior that started at about the time anomalous behavior was detected in metrics. Action recommendation window 4944 is expanded to reveal recommendations for correcting the anomalous behavior exhibited at node N5. Script programs may be used to search the log messages recorded in the time frame for key words and phrases that can be used to identify the type of anomalous behavior and based on the anomalous behavior discovered in the metrics generate one or more recommendations. In other implementations, the user selects and manually executes one of the recommendations.

The methods described below with reference to FIGS. 50-66 are stored in one or more data-storage devices as machine-readable instructions that when executed by one or more processors of the computer system shown in FIG. 1 detect anomalous behavior in a distributed computing system.

Figure 50:
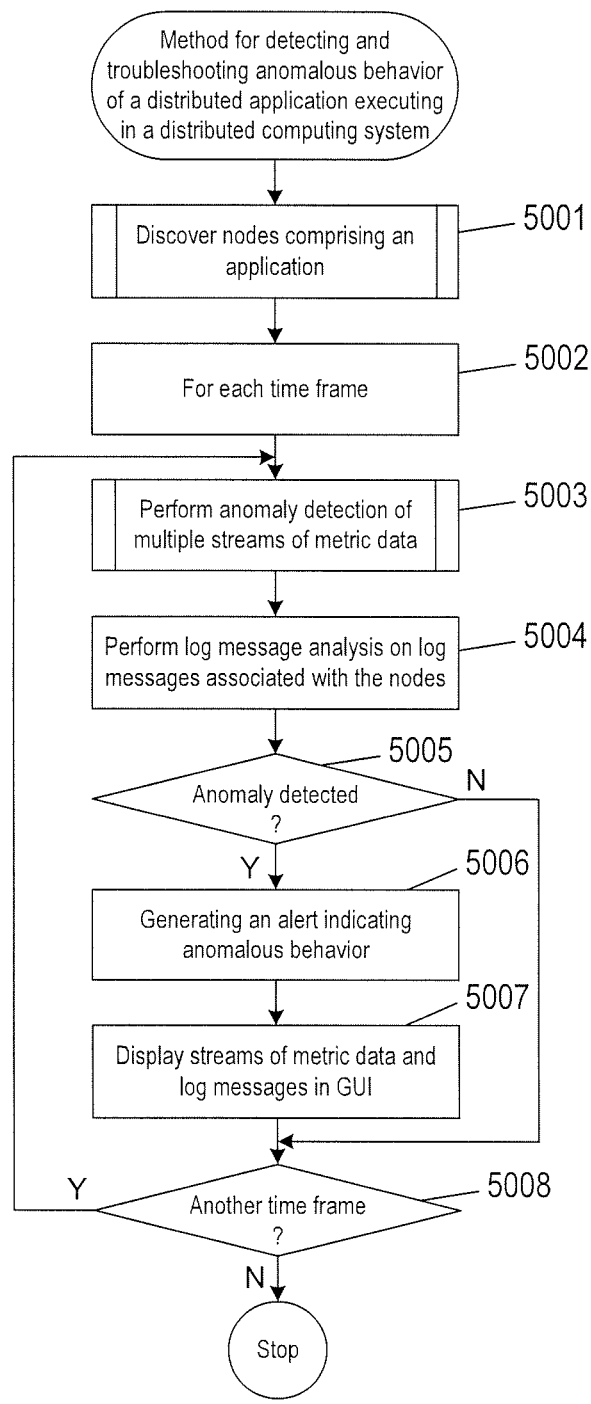
FIG. 50 shows a flow diagram illustrating an example implementation of a "method for detecting and troubleshooting anomalous behavior of an application executing in a distributed computing system."

FIG. 50 shows a flow diagram illustrating an example implementation of a "method for detecting and troubleshooting anomalous behavior of a distributed application executing in a distributed computing system." In block 5001, a "discover nodes comprising an application" procedure is performed on the distributed application. A loop beginning with block 5002 repeats the computational operations represented by blocks 5003-5007 for each time frame. In block 5003, a "perform anomaly detection of multiple streams of metric data" procedure is performed on the streams of metric data associated with the nodes of the distributed application. In block 5004, log message analysis is performed on log messages generated by event sources associated with nodes of the distributed application by the event log manager as described above with reference to Equations (44) and (45). In decision block 5005, when an anomaly is detected in one or more of the streams of metric data and/or relative frequencies of threatening event types of the log messages violates an associated threshold, control flows to block 5006. In block 5006, an alert indicating anomalous behavior is generated as described above with reference to FIG. 48. The alert may be displayed in a GUI as described above with reference to FIGS. 49A-49E. In block 5007, the streams of metric data and log messages recorded in block 5005 are displayed in a GUI that enables an administrator, application owner, or data center tenant to view the metrics and log messages associated with the anomalous behavior. In decision block 5008, blocks 5003-5007 are repeated for another time frame.

Figure 51:
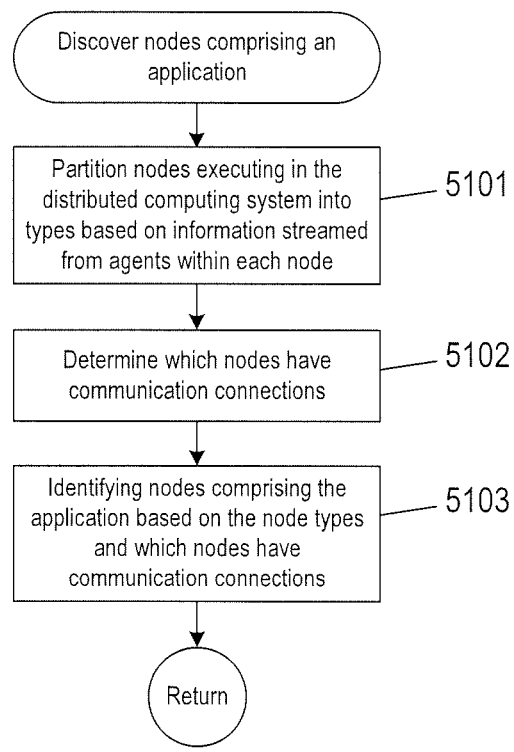
FIG. 51 shows a flow diagram illustrating an example implementation of "discover node comprising an application" step referred to in FIG. 50.

FIG. 51 shows a flow diagram illustrating an example implementation of "discover node comprising an application" step 5001 of FIG. 50. In block 5001, the nodes executing in the distributed computing system are partitioned into type based on information streamed from agents within each node as described above with reference to FIG. 24. In block 5002, nodes having communication connections are determined as described above with reference to FIG. 24. In block 5003, nodes comprising the application are identified as described above with reference to FIG. 24.

Figure 52:
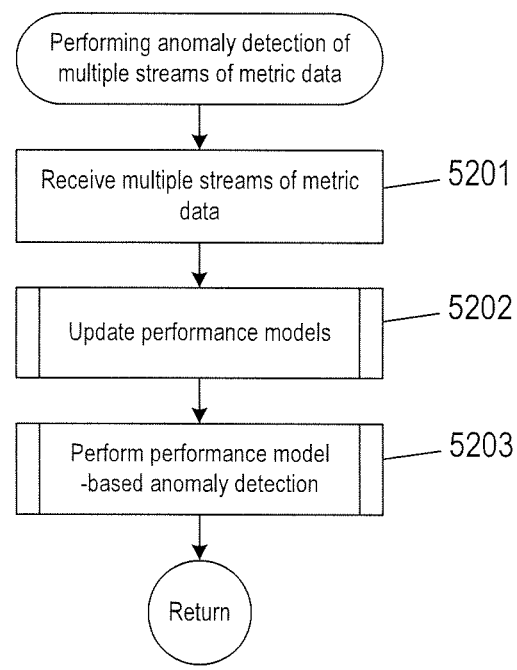
FIG. 52 shows a flow diagram illustrating an example implementation of "perform anomaly detection of multiple streams of metric data" step referred to in FIG. 50.

FIG. 52 shows a flow diagram illustrating an example implementation of "perform anomaly detection of multiple streams of metric data" step 5003 of FIG. 50. In block 5201, multiple streams of metric data are received. In block 5202, an "update performance models" procedure is performed. In block 5203, a "perform performance model-based anomaly detection" is performed.

Figure 53:
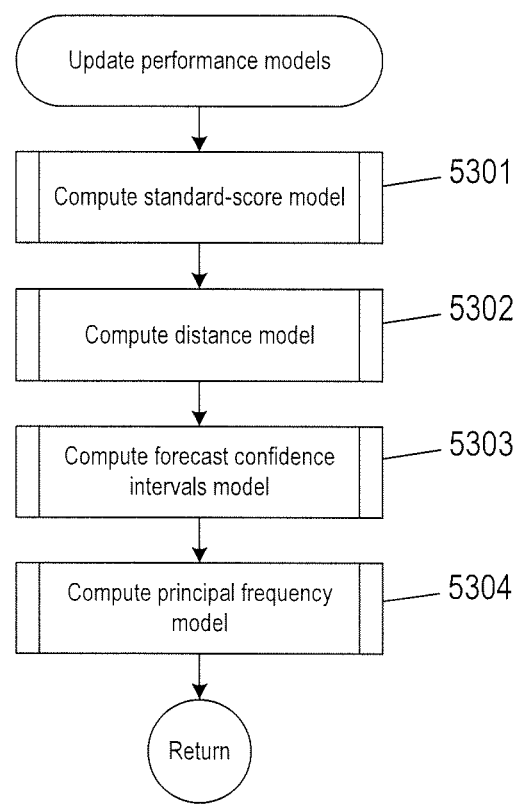
FIG. 53 shows a flow diagram illustrating an example implementation of the "update performance models" step referred to in FIG. 52.

FIG. 53 shows a flow diagram illustrating an example implementation of the "update performance models" step 5202 of FIG. 52. In block 5301, a "compute standard-score model" procedure is performed. In block 5302, a "compute distance model" procedure is performed. In block 5303, a "compute forecast confidence intervals models" procedure is performed. In block 5304, a "compute principal frequency model" procedure is performed.

Figure 54:
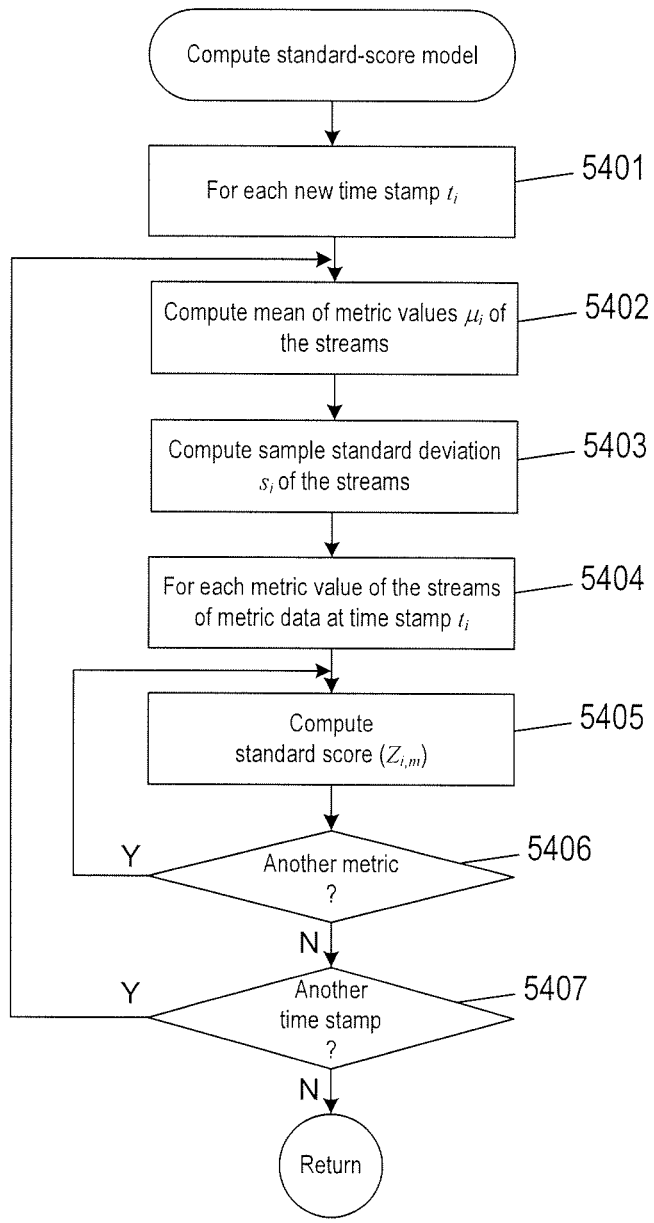
FIG. 54 shows a flow diagram illustrating an example implementation of the "compute standard-score model" step referred to in FIG. 53.

FIG. 54 shows a flow diagram illustrating an example implementation of the "compute standard-score model" step 5301 of FIG. 53. A loop beginning with block 5401 repeats the computational operations represented by blocks 5402-5407 for each new time stamp $t_i$. In block 5402, the mean of metric values at the time stamp $t_i$ is computed for M streams of metric data as described above with reference to Equation (38a). In block 5403, the sample standard deviation of metric values at the time stamp $t_i$ is computed for the M streams of metric data as described above with reference to Equation (38a). A loop beginning with block 5404 repeats the computational operations represented by blocks 5405-5406 for each metric value of the M streams of metric data at the time stamp $t_i$. In block 5405, the standard-score model is computed for the metric value as described above with reference to Equation (38a). In decision block 5406, operations represented by block 5405 are repeated for another metric. In decision block 5407, operations represented by blocks 5402-5409 are repeated for a next new time stamp.

Figure 55:
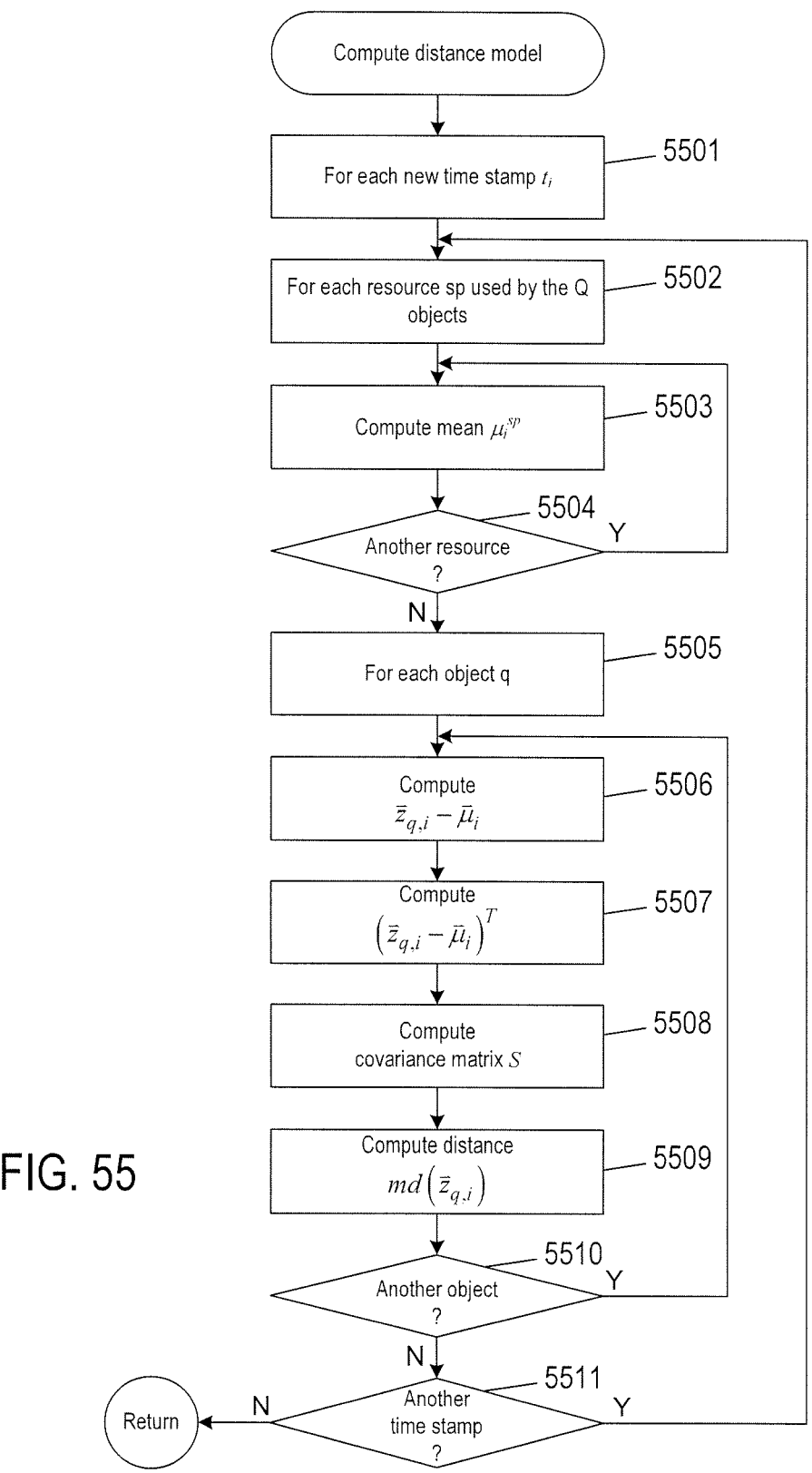
FIG. 55 shows a flow diagram illustrating an example implementation of the "compute distance model" step referred to FIG. 53.

FIG. 55 shows a flow diagram illustrating an example implementation of the "compute distance model" step 5302 of FIG. 53. A loop beginning with block 5501 repeats the computational operations represented by blocks 5502-5513 for each new time stamp $t_i$. A loop beginning with block 5502 repeats the computational operation represented by block 5503 for each stream of metric data associate with a resource. In block 5503, mean usage of a resource is computed for an element of the mean usage P-tuple. In decision block 5504, the computational operation represented by block 5503 is repeated for another resource. A loop beginning with block 5505 repeats the computational operation represented by blocks 5506-5510 for each object. In block 5506, the difference between the usage P-tuple formed from metric values of the P streams and the mean usage P-tuple obtained in blocks 5502-5504 is computed. In block 5507, the difference computed in block 4106 is transposed. In block 5508, a covariance matrix S is computed as described above with reference to FIG. 46. In block 5509, the distance is computed is computed as described above with reference to Equation (40). In decision block 5510, the computational operations represented by blocks 4106-4109 are repeated for another object. In decision block 5511, the computational operations represented by blocks 5502-5510 are repeated for another time stamp.

Figure 56:
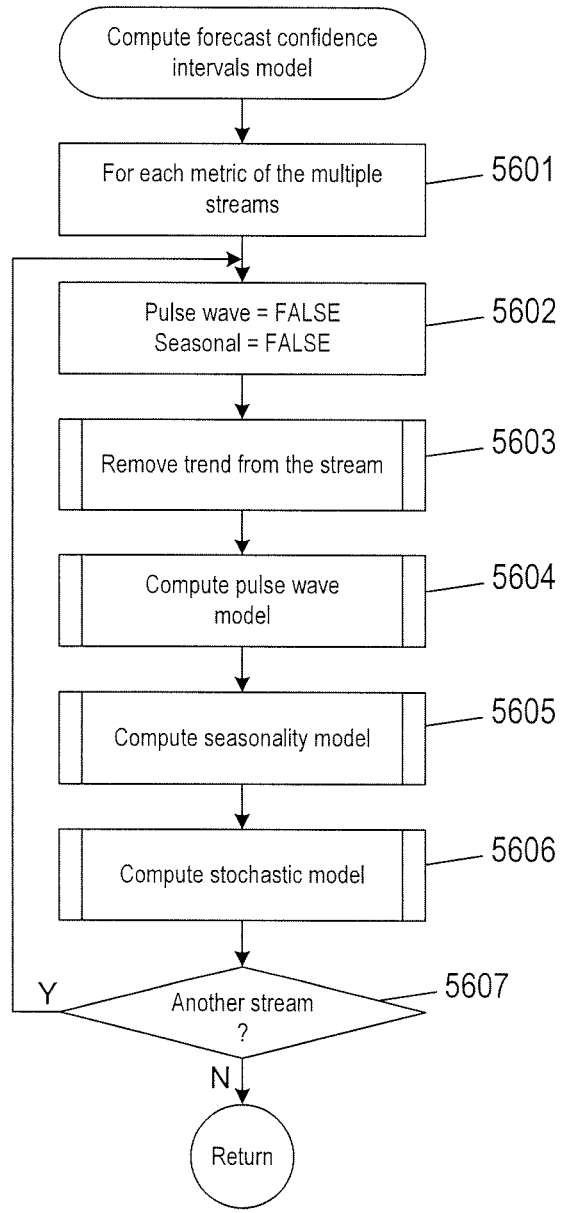
FIG. 56 shows a flow diagram illustrating an example implementation of the "compute forecast confidence intervals model" step referred to in FIG. 53.

FIG. 56 shows a flow diagram illustrating an example implementation of the "compute forecast confidence intervals model" step 5303 of FIG. 53. A loop beginning with block 5601 repeats the computational operations represented by blocks 5602-5608 each metric of the multiple streams of metric data. In block 5602, logical variables "Pulse wave" and "Seasonal" are set to FALSE. In block 5603, a "remove trend from the stream" procedure is performed. In block 5604, a "compute pulse wave model" procedure is performed. In block 5605, a "compute seasonality model" procedure is performed. In block 5606, a "compute stochastic model" procedure is performed. In decision block 5607, the computational operations represented by blocks 5602-5606 are repeated for another stream of metric data.

Figure 57:
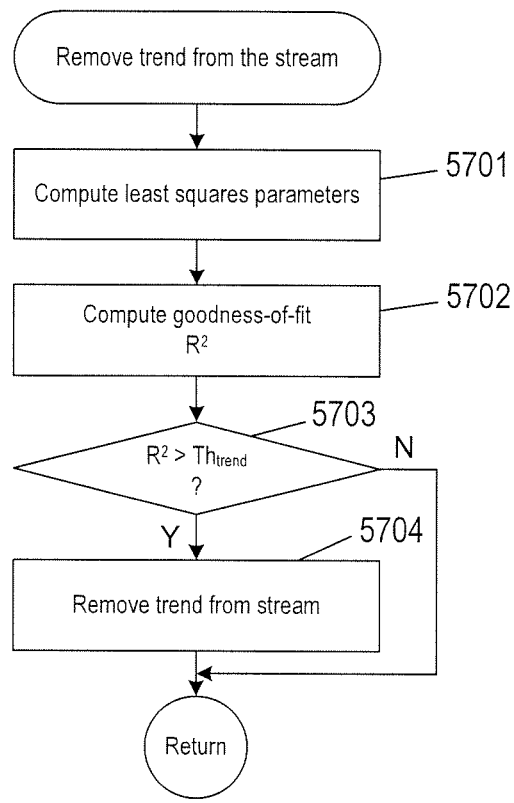
FIG. 57 shows a flow diagram illustrating an example implementation of the "remove trend from the stream" step referred to in FIG. 56.

FIG. 57 shows a flow diagram illustrating an example implementation of the "remove trend from the stream" step 5702 of FIG. 57. In block 5701, least squares parameters for the sequence of metric data in the historical window, as described above with reference to Equations (3c) and (3d). In block 5702, a goodness-of-fit parameter is computed as described above with reference to Equation (4). In decision block 5703, when the goodness-of-parameter is greater than a threshold, control flows to block 5704. In block 5704, a trend computed using the least squares parameters is subtracted from the metric data in the historical window, as described above with reference to Equation (5) and FIGS. 30B and 30C.

Figure 58:
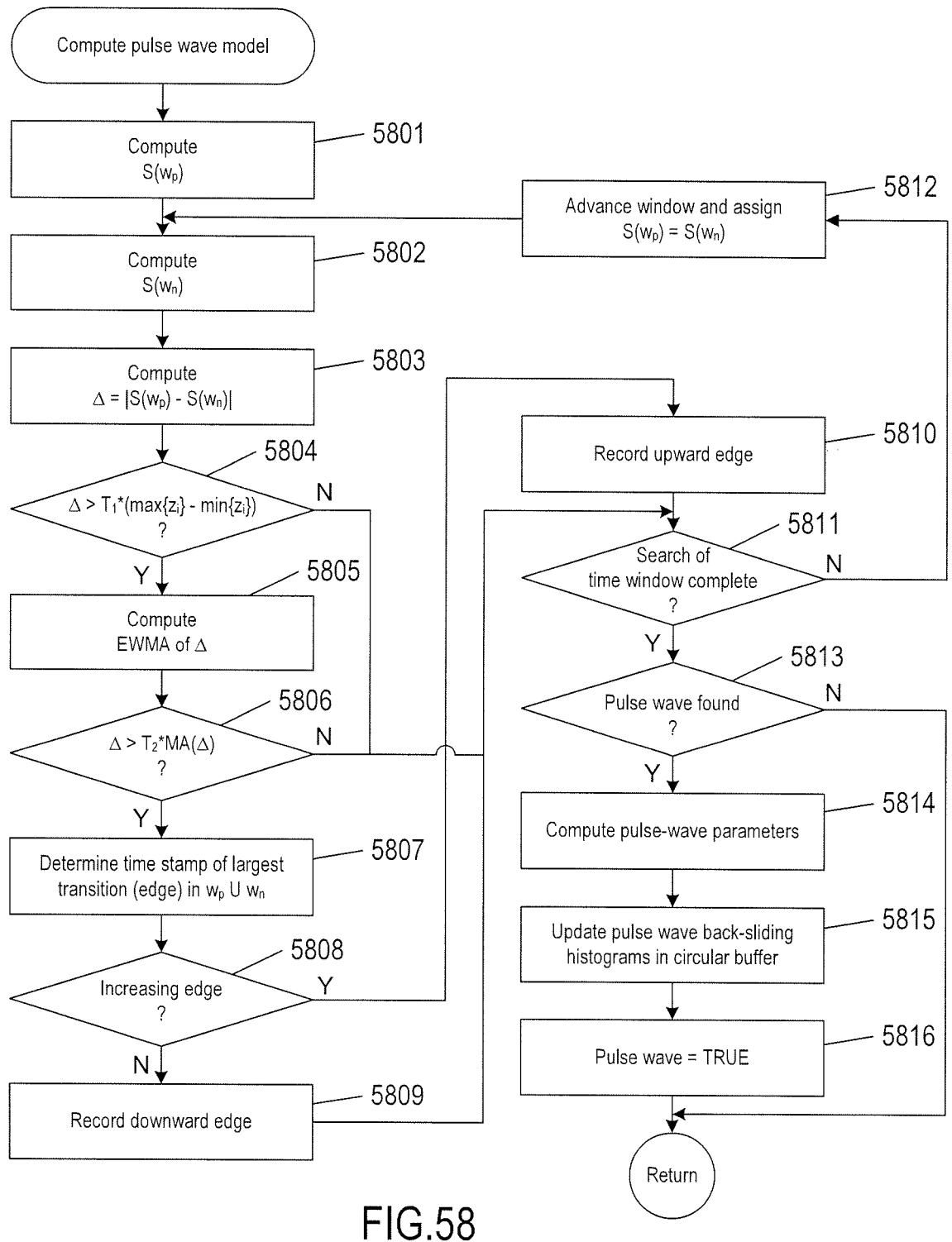
FIG. 58 shows a flow diagram illustrating an example implementation of the "compute pulse wave model" step referred to in FIG. 56.

FIG. 58 shows a flow diagram illustrating an example implementation of the "compute pulse wave model" step 5604 of FIG. 56. In block 5801, an average of metric data values in a previous time window is computed as described above with reference to Equation (16a). In block 5802, an average of metric data values in a previous time window is computed as described above with reference to Equation (16b). In block 5803, a change parameter is computed based on an absolute difference between the averages of metric data values as described above with reference to Equation (17). In decision block 5804, when the change parameter is greater than a maximum amplitude range threshold computed as described above with reference to Equation (18a), control flows to block 5805. Otherwise, control flows to decision block 5811. In block 5805, an EWMA of change parameters is computed with the change parameter computed in block 5803 as the most recent change parameter. In decision block 5806, when the change parameter is greater than an EWMA threshold as described above with reference to Equation (18b), control flows to block 5807. Otherwise, control flows to decision block 5811. In block 5807, a largest absolute difference between consecutive pairs of metric data values is determined for metric data values in a time interval formed from the previous and next time windows as described above with reference to Equation (19). In block 5808, when the metric data values of the largest absolute difference between consecutive metric data values is increasing (i.e., $z_{i+1} - z_i > 0$), the edge is an upward edge and control flows to block 5810. Otherwise, the largest absolute difference between consecutive metric data values is decreasing (i.e., $z_{i+1} - z_i < 0$), control flows to block 5809. In block 5809, a downward edge is recorded for time $t_1$. In block 5810, an upward edge is recorded for time $t_{i+1}$. In decision block 5811, when the duration of the time window of the historical window is complete control flows to decision block 5812. Otherwise, control flows to block 5813. In block 5812, the previous and next time windows are advanced as described above with reference to FIG. 26A and the average of metric data values in the next time window assigned to the average of metric data values of the previous time window. In decision block 5813, when upward and/or downward edges have been identified as described above with reference to blocks 5808-5810, control flows to block 5814. In block 5814, pulse width and period of a pulse wave are computed as described above with reference to FIG. 27A. In block 5815, pulse wave back-sliding histograms of pulse width and period are updated as described above with reference to FIG. 27B. In block 5816, "Pulse wave" is set to TRUE.

Figure 59:
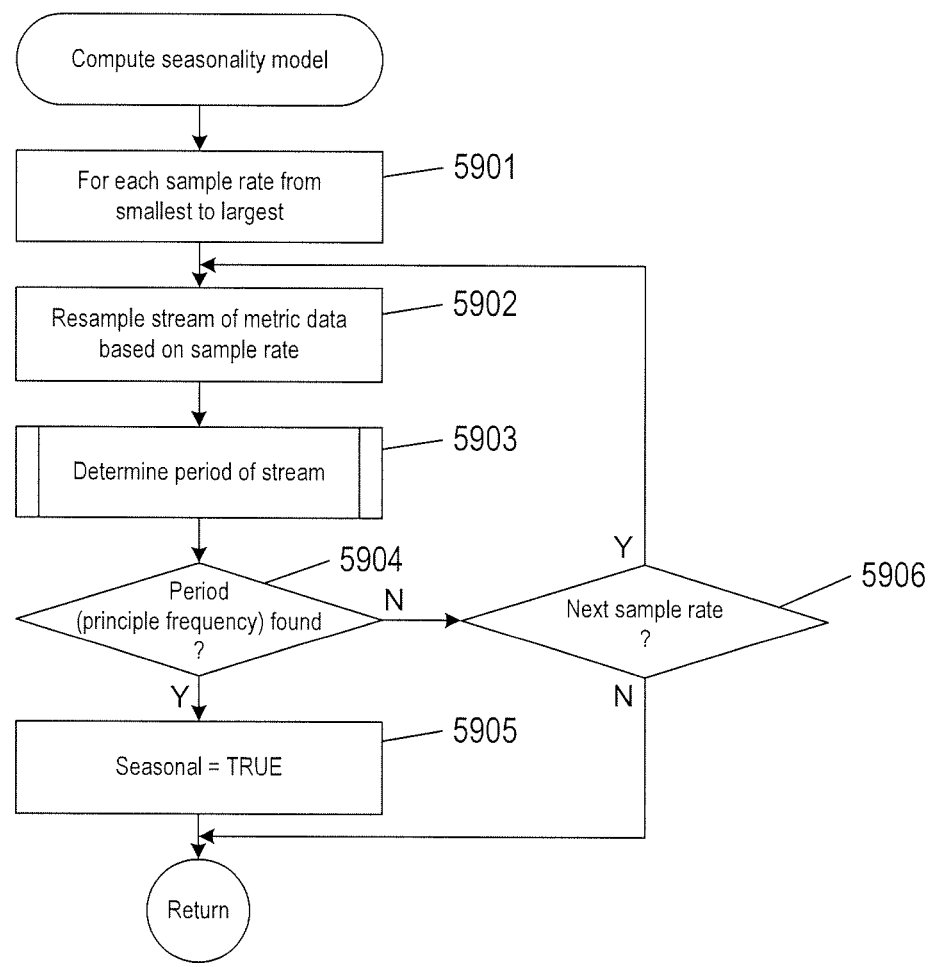
FIG. 59 shows a flow diagram illustrating an example implementation of the "compute seasonality model" step referred to in FIG. 56.

FIG. 59 shows a flow diagram illustrating an example implementation of the "compute seasonality model" step

5605 of FIG. 56. A loop beginning with block 5901 repeats the computational operations represented by blocks 5902-5906 for different sampling rates as described above with reference to FIG. 38. In block 5902, metric data in the historical window is resampled according to the sample rate as described above with reference to FIG. 39. In block 5903, a routine "determine period of stream" is called to determine the period of the metric data in the time window. In decision block 5904, when a period for the metric data has been determined in block 5903, control flows to block 5905. In block 5905, "Seasonal" is set to TRUE. In decision block 5906, the computational operations represented by blocks 5902-5904 are repeated for another sample rate.

Figure 60:
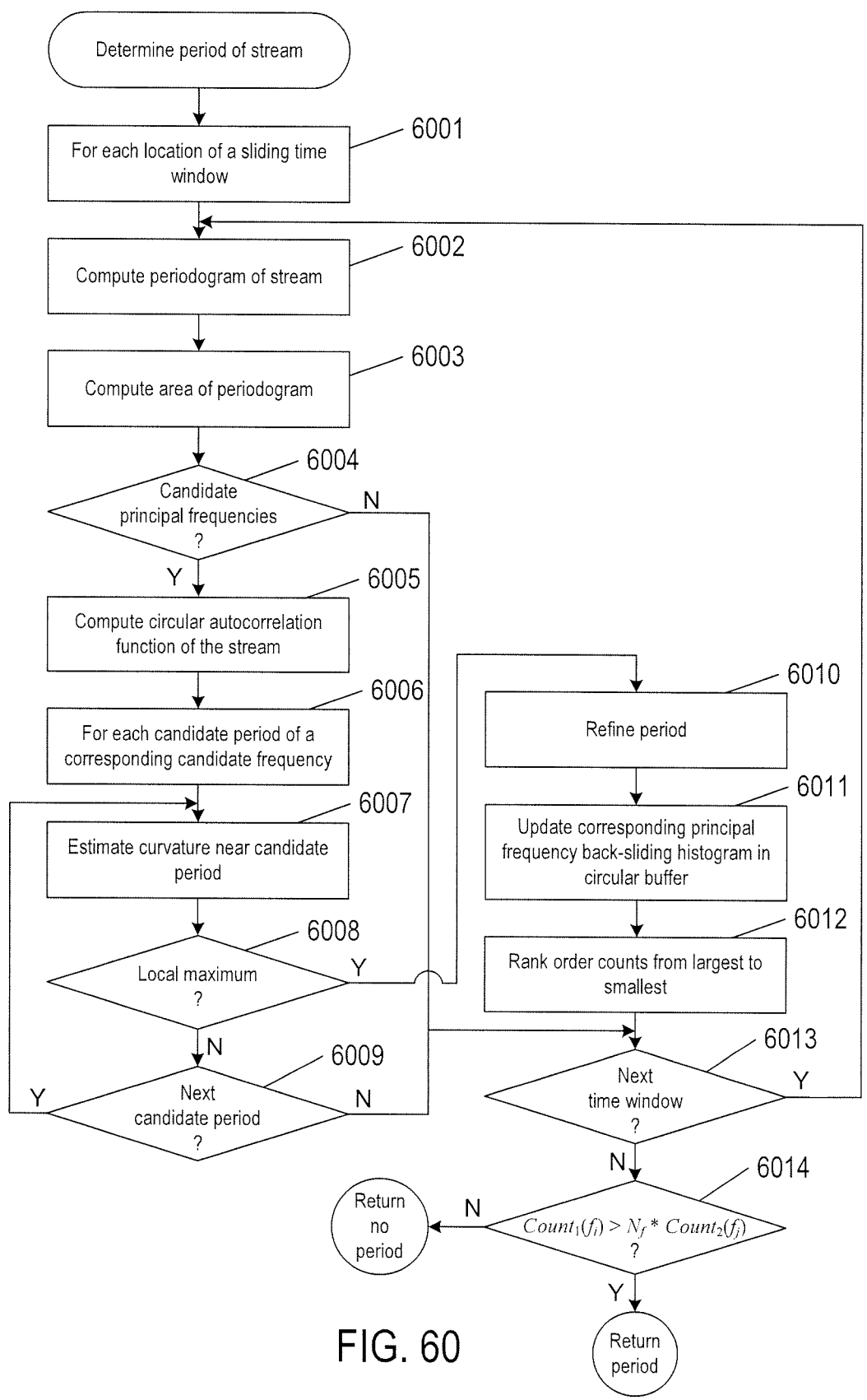
FIG. 60 shows a flow diagram illustrating an example implementation of the "determine period of stream" step referred to in FIG. 59.

FIG. 60 shows a flow diagram illustrating an example implementation of the "determine period of stream" step 5903 of FIG. 59. A loop beginning with block 6001 repeats the computational operations represented by blocks 6002-6013 for each time window as described above with reference to FIG. 39. In block 6002, a periodogram is computed for the time window as described above with reference to Equations (21)-(22) and FIG. 39. In block 6003, the area of the periodogram is computed as described above with reference to Equation (23). In decision block 6004, if no frequencies of the periodogram satisfy the condition of Equation (24), then no candidate principal frequencies exist in the periodogram, the process does not return a seasonal period for the time window, and control flows to block 6013. In block 6005, a circular autocorrelation function is computed in neighborhoods of candidate periods that correspond to the candidate principal frequencies, as described above with reference to Equation (25) and FIG. 40B. A loop beginning with block 6006 repeats the computational operations of blocks 6007-6009 for each candidate period. In block 6007, curvature near a candidate period is estimated as described above with reference to Equation (26). In decision block 6008, when the curvature corresponds to a local maximum, control flows to block 6009. In block 6010, the period is refined to the period that corresponds to the maximum ACF value in the neighborhood and the period is returned as the principal period, as described above with reference to FIG. 40C. In decision block 6009, operations represented by blocks 6007-6009 are repeated for another candidate period. Otherwise, no principal period (i.e., principal frequency) is returned. In block 6011, a principal frequency back-sliding histogram stored in a circular buffer is updated. In block 6012, the frequency counts of the frequencies in the principal frequency back-sliding histogram are rank ordered from largest to smallest. In decision block 6013, computational operations represented by blocks 6002-6012 are repeated for another location of the time window in the historical window of resampled metric data. In decision block 6014, when the condition described above with reference to Equation (28) is satisfied, the principal period that corresponds to principal frequency is returned.

Figure 61:
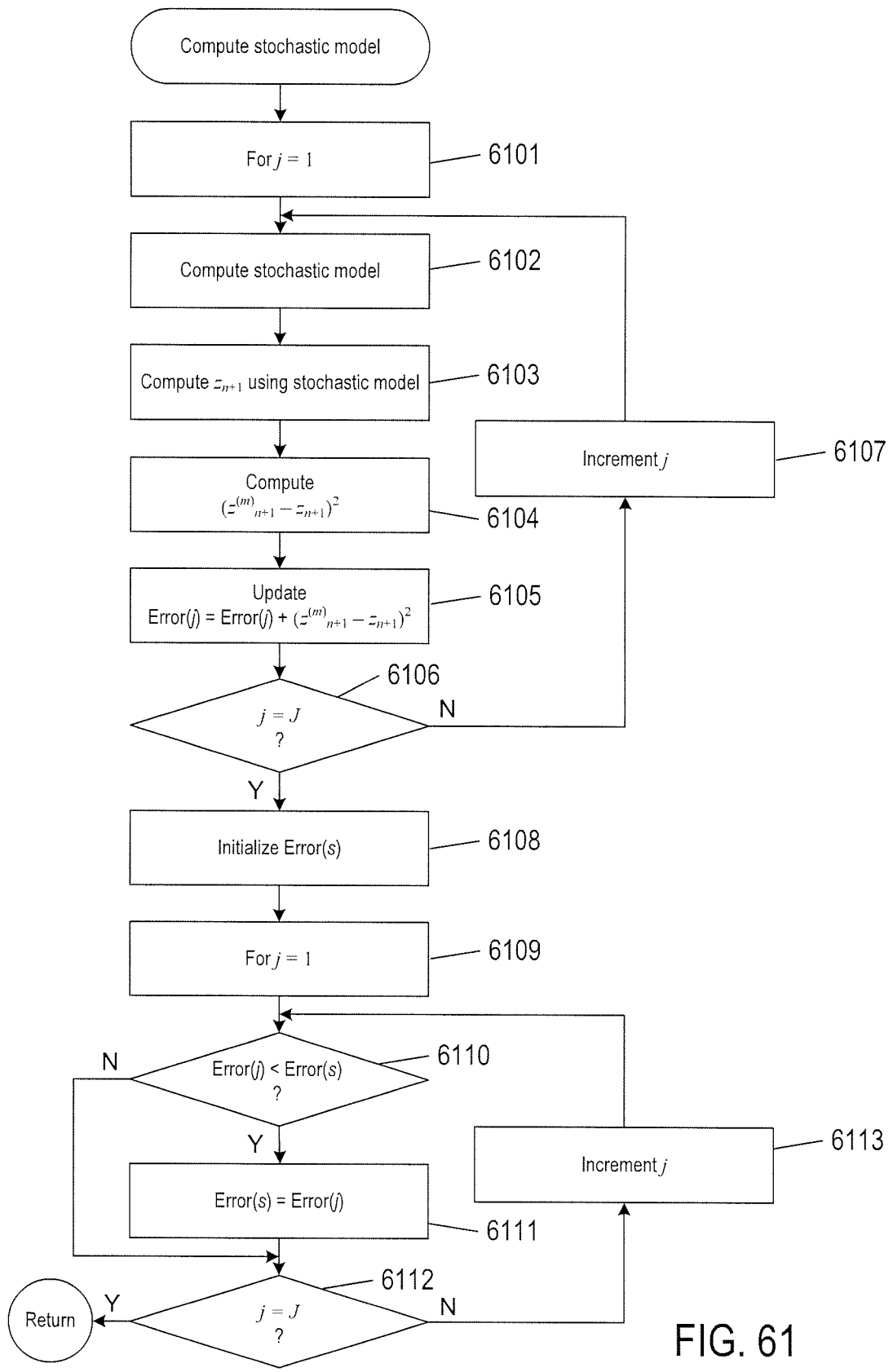
FIG. 61 shows a flow diagram illustrating an example implementation of the "compute stochastic model" step referred to in FIG. 56.

FIG. 61 shows a flow diagram illustrating an example implementation of the "compute stochastic model" step 5606 of FIG. 56. A loop beginning with block 6101 repeats the computational operations represented by blocks 6102-6107 for each j, where J is the number of different stochastic models. In block 6102, weight parameters of a stochastic process model are computed based on previous values of the non-trendy metric data in the historical window, as described above with reference to FIG. 31. In block 6103, when a new non-trendy (e.g., detrended) metric value is received, estimated metric value is computed using each of the stochastic process models as described above with reference to Equation (10) and FIG. 31. In block 6104, a residual error is computed for each of the stochastic process models as described above with reference to Equation (11). In block 6105, an accumulated residual error is computed for the stochastic model as described above with reference to Equation (11). In decision block 6106, when weight parameters and accumulated residual errors have been computed for each of stochastic process models, control flow to block 6108. Otherwise, the parameter j is incremented in block 4907. In block 6108, a minimum residual error is initialized (e.g., Error(s)=100). A loop beginning with block 6109 repeats the computational operations of blocks 6110-6112 for each stochastic process model to identify the stochastic process model with the smallest accumulated residual error. In decision block 6110, when the accumulated residual error of the j-th stochastic process model is less than the minimum residual error, control flows to block 6111. Otherwise, control flows to decision block 6112. In block 6111, the minimum residual error is set equal to the accumulated residual error. In decision block 6112, when accumulated residual errors for all J of the stochastic residual models have been considered control returns to FIG. 56. In block 4713, the parameter j is incremented.

Figure 62:
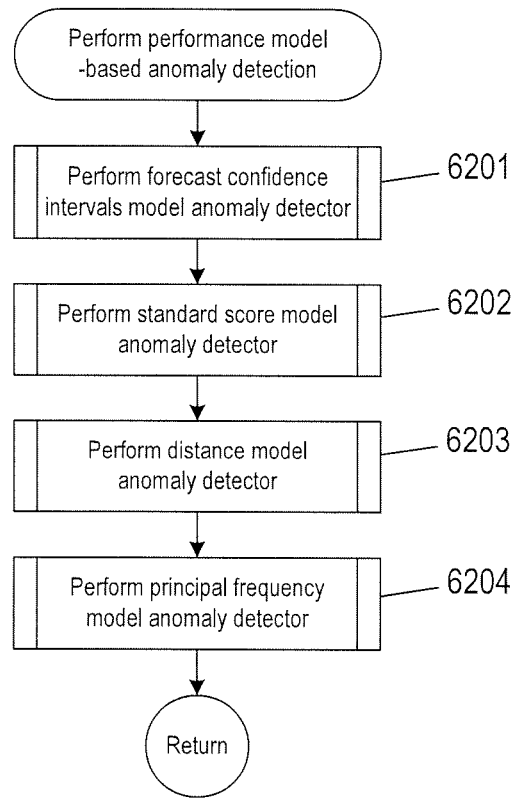
FIG. 62 shows a flow diagram illustrating an example implementation of the "perform performance model-based anomaly detection" step referred to in FIG. 52.

FIG. 62 shows a flow diagram illustrating an example implementation of the "perform performance model-based anomaly detection" step 5203 of FIG. 52. In block 6201, an "perform forecast confidence intervals model anomaly detection" procedure is performed. In block 6202, an "perform standard-score model anomaly detection" procedure is performed. In block 6203, an "perform distance model anomaly detection" procedure is performed. In block 6204, an "perform principal frequency model anomaly detection" procedure is performed.

Figure 63:
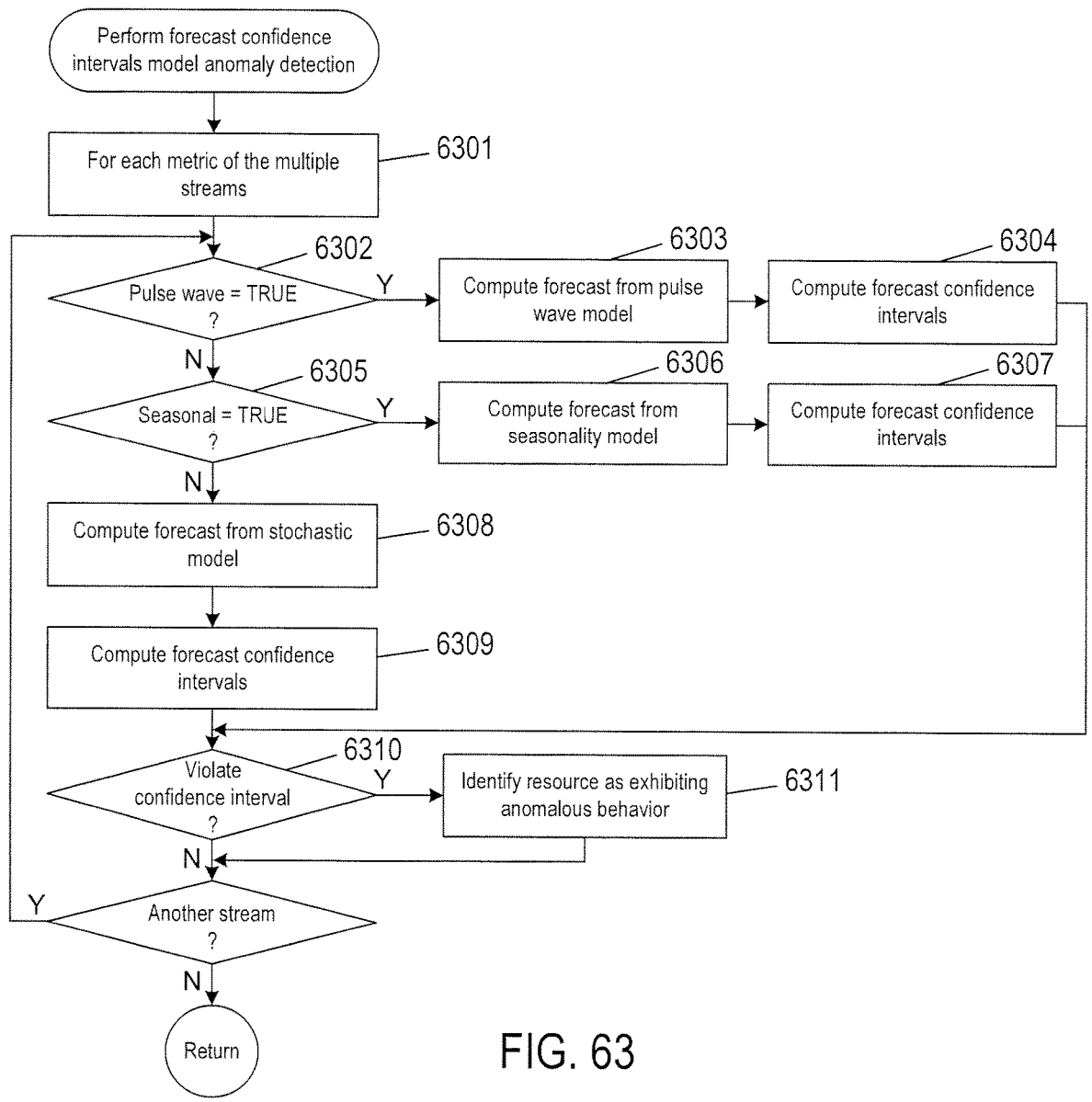
FIG. 63 shows a flow diagram illustrating an example implementation of the "perform forecast confidence intervals model anomaly detection" step referred to in FIG. 62.

FIG. 63 shows a flow diagram illustrating an example implementation of the "perform forecast confidence intervals model anomaly detection" step 6201 of FIG. 62. A loop beginning with block 6301 repeats the computational operations represented by blocks 6302-6309 for each stream of the multiple streams of metric data. In decision block 6302, when "Pulse wave" equals TRUE, control flows to block 6303. In block 6303, a forecast is computed from the pulse wave model as described above with reference to Equation (30) and FIG. 41B. In block 6304, forecast confidence intervals are computed as described above with reference to Equations (32a), (32b) and (35). In decision block 6305, when "Seasonal" equals TRUE, control flows to block 6306. In block 6306, a forecast is computed from the seasonality model as described above with reference to Equation (31) and FIG. 41C. In block 6307, forecast confidence intervals are computed as described above with reference to Equations (32a), (32b) and (35). In block 6308, a forecast is computed from the stochastic model as described above with reference to Equation (29) and FIG. 41A. In block 6309, forecast confidence intervals are computed as described above with reference to Equations (32a)-(35). In decision block 6310, when the metric value violates the forecast confidence interval control flows to block 6311. In block 6311, the resource associated with the metric that the violates the forecast confidence interval is identified as exhibiting anomalous behavior. In decision block 6312, the operations represented by blocks 6302-6311 are repeated for another metric in the streams of metric data.

Figure 64:
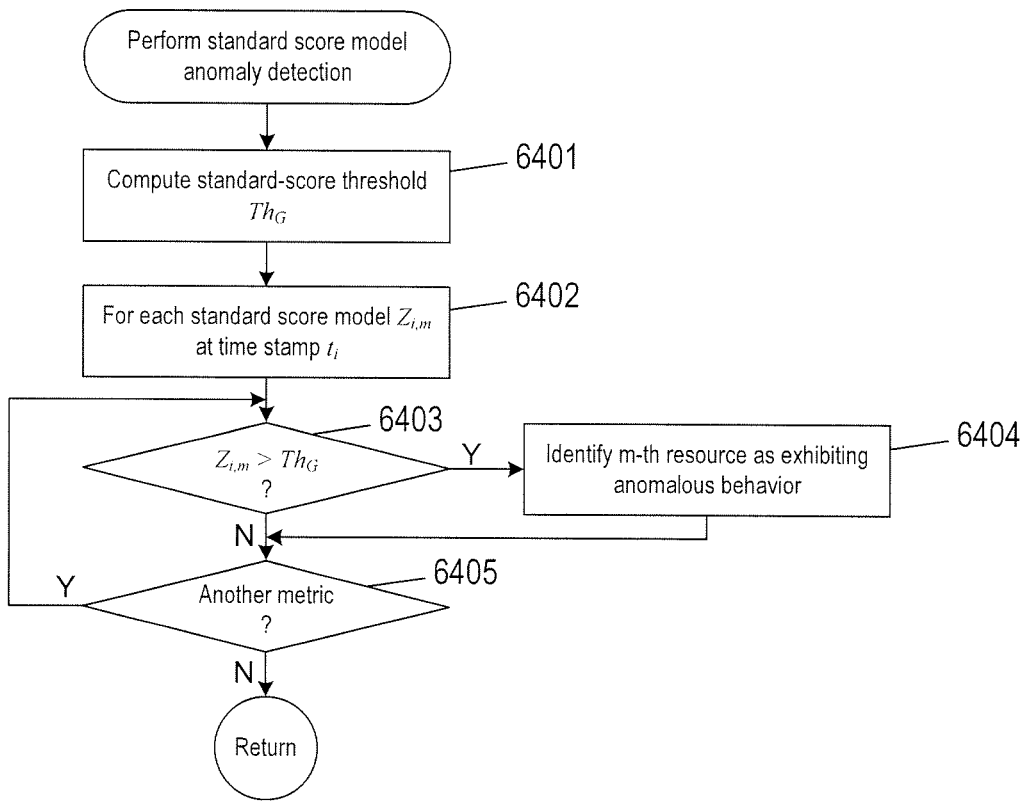
FIG. 64 shows a flow diagram illustrating an example implementation of the "perform standard-score model anomaly detection" step referred to in FIG. 62.

FIG. 64 shows a flow diagram illustrating an example implementation of the "perform standard-score model anomaly detection" step 6202 of FIG. 62. In block 6401, a standard-score threshold is computed as described above with reference to Equation (38b). A loop beginning with block 6402 repeats the computational operations represented by blocks 6403-6404 for each standard-score model. In decision block 6403, when the standard-score model is greater than the standard-score threshold control flows to block 6404. In block 6404, the resource associated with the standard-score model is identified as exhibiting anomalous behavior. In decision block 6405, block 6403 is repeated for another metric.

Figure 65:
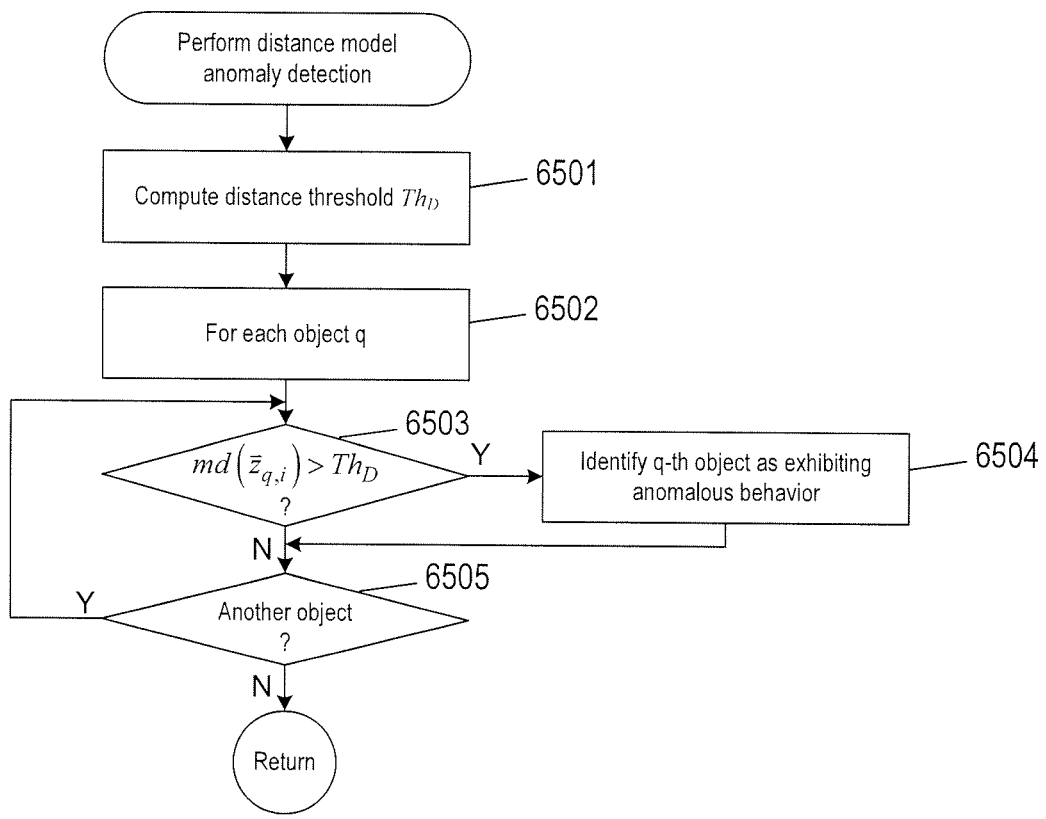
FIG. 65 shows a flow diagram illustrating an example implementation of the "perform distance model anomaly detection" step referred to in FIG. 62.

FIG. 65 shows a flow diagram illustrating an example implementation of the "perform distance model anomaly detection" step 6203 of FIG. 62. In block 6501, a distance threshold is computed as described above with reference to Equation (42). A loop beginning with block 6502 repeats the computational operations represented by blocks 6503-6504 for each object. In decision block 6503, when the distance model is greater than the distance threshold, control flows to block 6504. In block 6504, the object associated with the distance model is identified as exhibiting anomalous behavior. In decision block 6505, block 6503 is repeated for another object.

Figure 66:
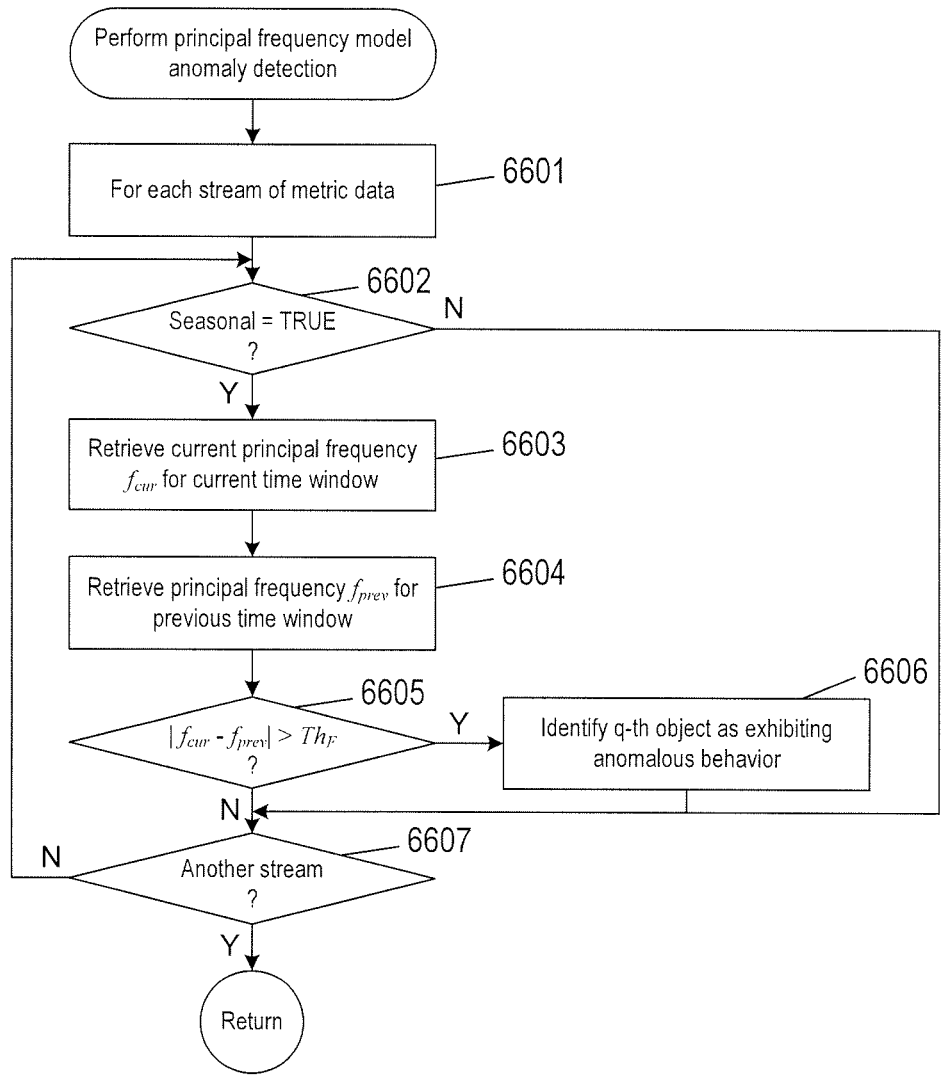
FIG. 66 shows a flow diagram illustrating an example implementation of the "perform principal frequency model anomaly detection" step referred to in FIG. 62.

FIG. 66 shows a flow diagram illustrating an example implementation of the "perform principal frequency model anomaly detection" step 6204 of FIG. 62. A loop beginning with block 6601 repeats the computational operations represented by block 6602-6606 for each stream of metric data. In decision block 6602, when seasonal equals TRUE, control flows to block 6603. In block 6603, a current principal frequency is retrieved for the current time window. In block 6604, a previous principal frequency is retrieved for a previous time window. In decision block 6605, when the condition given by Equation (43) is satisfied, control flows to block 6606. In block 6606, the resource associated with the stream of metric data is identified as exhibiting anomalous behavior. In decision block 6607, the operations represented by blocks 6602-6606 are repeated for another stream of the metric data.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A process stored in one or more data-storage devices and executed using one or more processors of a computer system that detects and corrects anomalous behavior of an application executing in a distributed computing system, the process comprising:
   discovering nodes that comprise the application and execute software of the application based on communication connections that transmit information between nodes;
   constructing performance models that identify different types of anomalies in multiple streams of metric data associated with the nodes;
   applying the performance models to the multiple streams of metric data associated with the nodes in a time frame to detect anomalous behavior of the application and an approximate point in time when the anomalous behavior began, the time frame containing most recently generated metric values of the streams of metric data;
   performing log message analysis on log messages associated with the nodes to detect anomalous behavior in relative frequencies of event types of the log messages generated in the time frame;
   in response to detecting anomalous behavior in at least one of the one or more streams of metric data and/or the relative frequencies of event types, displaying an alert, the approximate point in time, the streams of metric data and log messages associated with the anomalous behavior of the application in the time frame and one or more recommended remedial measures for correcting the anomalous behavior in a graphical user interface; and
   executing one or more of the remedial measures in the distributed computing system to correct the anomalous behavior of the application, wherein the remedial measures include increasing amount of usable capacity of a resource to an application node, assigning additional resources to an application node, migrating one or more virtual objects, and creating one or more additional virtual objects from a template of a virtual object.

2. The process of claim 1 wherein discovering the nodes that comprise the application comprises:
   partitioning nodes executing in the distributed computing system into types based on information streamed from agents within each node;
   determining which nodes have communications connections; and
   identifying the nodes that comprise the application and execute software of the application based on the node types and nodes with communication connections.

3. The process of claim 1 wherein performing anomaly detection on the multiple streams of metric data comprises:
   for each time frame,
      receiving multiple streams of metric data generated by metric sources of objects executing the nodes,
      updating a performance model based on most recently received metric values of the streams of metric data, and
      detecting changes in one or more of the streams of metric data based on the updated performance model.

4. The process of claim 3 wherein updating the performance model comprises:
   for new metric values of the streams of metric data,
      computing a mean of the recently received metric values;
      computing a sample standard deviation of the recently received metric values; and
   for each new metric value of the streams of metric data, computing a standard-score model based on the recently received metric value, the mean, and the sample standard deviation.

5. The process of claim 3 wherein updating the performance model comprises:
   computing a mean usage tuple from new metric values of the streams of metric data, each element of the mean-usage tuple corresponding to the mean usage of a resource of the distributed computing system used by the objects;
   forming a usage tuple from the new metric values of the resources;
   computing a covariance matrix of the new metric values of the resources; and
   computing a distance model from the usage tuple to the mean-usage tuple based on the usage tuple, the mean-usage tuple, and the covariance matrix.

6. The process claim 3 wherein updating the performance model comprises:
for each stream of the multiple streams of metric data,
computing forecast metric values in a forecast interval; and
computing a forecast confidence interval for each of the forecast metric values.

7. The process of claim 3 wherein updating the performance model comprises:
for each stream of the streams of metric data,
determining if the stream of the metric data is a seasonal stream of metric data;
if the stream of metric data is a seasonal stream of metric data, computing a principal frequency of the stream of metric data based on new metric values in a current time window; and
computing an absolute difference between the principal frequency in the current time window and a principal frequency in a previous time window.

8. The process of claim 1 wherein performing anomaly detection to detect changes in one or more of the streams of metric data based on the updated performance model comprises:
determining a threshold based on the performance model; and
when one or more streams of the metric data violates the threshold, identifying the resource in the graphical user interface as exhibiting anomalous behavior.

9. The process of claim 1 wherein performing log message analysis syn the log messages comprises:
determining an event type for each log message;
computed a relative frequency of each event type generated in the time frame; and
generating the alert when the relative frequency of one of the event types is greater than an associated relative frequency threshold.

10. A computer system that detects and corrects anomalous behavior of an application executing in a distributed computing system, the system comprising:
one or more hardware processors;
one or more physical data-storage devices; and
machine-readable instructions stored in the one or more physical data-storage devices that when executed using the one or more hardware processors controls the system to performance operations comprising:
discovering nodes that comprise the application and execute software of the application based on communication connections that transmit information between nodes;
constructing performance models that identify different types of anomalies in multiple streams of metric data associated with the nodes;
applying the performance models to the multiple streams of metric data associated with the nodes in a time frame to detect anomalous behavior of the application and an approximate point in time when the anomalous behavior began, the time frame containing most recently generated metric values of the streams of metric data;
performing log message analysis on log messages associated with the nodes to detect anomalous behavior in relative frequencies of event types of the log messages generated in the time frame; and
in response to detecting anomalous behavior in at least one of the one or more streams of metric data and/or the relative frequencies of event types, displaying an alert, the approximate point in time, the streams of metric data and log messages associated with the anomalous behavior of the application in the time frame and one or more recommended remedial measures for correcting the anomalous behavior in a graphical user interface; and
executing one or more of the remedial measures in the distributed computing system to correct the anomalous behavior of the application, wherein the remedial measures include increasing amount of usable capacity of a resource to an application node, assigning additional resources to an application node, migrating one or more virtual objects, and creating one or more additional virtual objects from a template of a virtual object.

11. The system of claim 10 wherein discovering the nodes that comprise the application comprises:
partitioning nodes executing in the distributed computing system into types based on information streamed from agents within each node;
determining which nodes have communications connections; and
identifying the nodes that comprise the application and execute software of the application based on the node types and nodes with communication connections.

12. The system of claim 10 wherein performing anomaly detection on the multiple streams of metric data comprises:
for each time frame,
receiving multiple streams of metric data generated by metric sources of objects executing the nodes,
updating a performance model based on most recently received metric values of the streams of metric data, and
detecting changes in one or more of the streams of metric data based on the updated performance model.

13. The system of claim 12 wherein updating the performance model comprises:
for new metric values of the streams of metric data,
computing a mean of the recently received metric values;
computing a sample standard deviation of the recently received metric values; and
for each new metric value of the streams of metric data, computing a standard-score model based on the recently received metric value, the mean, and the sample standard deviation.

14. The system of claim 12 wherein updating the performance model comprises:
computing a mean usage tuple from new metric values of the streams of metric data, each element of the mean-usage tuple corresponding to the mean usage of a resource of the distributed computing system used by the objects;
forming a usage tuple from the new metric values of the resources;
computing a covariance matrix of the new metric values of the resources; and
computing a distance model from the usage tuple to the mean-usage tuple based on the usage tuple, the mean-usage tuple, and the covariance matrix.

15. The system claim 12 wherein updating the performance model comprises:
for each stream of the multiple streams of metric data,
computing forecast metric values in a forecast interval; and
computing a forecast confidence interval for each of the forecast metric values.

16. The process of claim 12 wherein updating the performance model comprises:
for each stream of the streams of metric data,
determining if the stream of the metric data is a seasonal stream of metric data;
if the stream of metric data is a seasonal stream of metric data, computing a principal frequency of the stream of metric data based on new metric values in a current time window; and
computing an absolute difference between the principal frequency in the current time window and a principal frequency in a previous time window.

17. The system of claim 10 wherein performing anomaly detection to detect changes in one or more of the streams of metric data based on the updated performance model comprises:
determining a threshold based on the performance model; and
when one or more streams of the metric data violates the threshold, identifying the resource in the graphical user interface as exhibiting anomalous behavior.

18. The system of claim 10 wherein performing log message analysis on the log messages comprises:
determining an event type for each log message;
computed a relative frequency of each event type generated in the time frame; and
generating the alert when the relative frequency of one of the event types is greater than an associated relative frequency threshold.

19. A non-transitory computer-readable medium encoded with machine-readable instructions that control one or more processors of a computer system to perform the operations comprising:
discovering nodes that comprise the application and execute software of the application based on communication connections that transmit information between nodes;
constructing performance models that identify different types of anomalies in multiple streams of metric data associated with the nodes;
applying the performance models to the multiple streams of metric data associated with the nodes in a time frame to detect anomalous behavior of the application and an approximate point in time when the anomalous behavior began, the time frame containing most recently generated metric values of the streams of metric data;
performing log message analysis on log messages associated with the nodes to detect anomalous behavior in relative frequencies of event types of the log messages generated in the time frame; and
in response to detecting anomalous behavior in at least one of the one or more streams of metric data and/or the relative frequencies of event types, displaying an alert, the approximate point in time, the streams of metric data and log messages associated with the anomalous behavior of the application in the time frame and one or more recommended remedial measures for correcting the anomalous behavior in a graphical user interface; and
executing one or more of the remedial measures in the distributed computing system to correct the anomalous behavior of the application, wherein the remedial measures include increasing amount of usable capacity of a resource to an application node, assigning additional resources to an application node, migrating one or more virtual objects, and creating one or more additional virtual objects from a template of a virtual object.

20. The medium of claim 19 wherein discovering the nodes that comprise the application comprises:
partitioning nodes executing in the distributed computing system into types based on information streamed from agents within each node;
determining which nodes have communications connections; and
identifying the nodes that comprise the application and execute software of the application based on the node types and nodes with communication connections.

21. The medium of claim 19 wherein performing anomaly detection on the multiple streams of metric data comprises:
for each time frame,
receiving multiple streams of metric data generated by metric sources of objects executing the nodes,
updating a performance model based on most recently received metric values of the streams of metric data, and
detecting changes in one or more of the streams of metric data based on the updated performance model.

22. The medium of claim 21 wherein updating the performance model comprises:
for new metric values of the streams of metric data,
computing a mean of the recently received metric values;
computing a sample standard deviation of the recently received metric values; and
for each new metric value of the streams of metric data, computing a standard-score model based on the recently received metric value, the mean, and the sample standard deviation.

23. The medium of claim 21 wherein updating the performance model comprises:
computing a mean usage tuple from new metric values of the streams of metric data, each element of the mean-usage tuple corresponding to the mean usage of a resource of the distributed computing system used by the objects;
forming a usage tuple from the new metric values of the resources;
computing a covariance matrix of the new metric values of the resources; and
computing a distance model from the usage tuple to the mean-usage tuple based on the usage tuple, the mean-usage tuple, and the covariance matrix.

24. The medium claim 21 wherein updating the performance model comprises:
for each stream of the multiple streams of metric data,
computing forecast metric values in a forecast interval; and
computing a forecast confidence interval for each of the forecast metric values.

25. The medium of claim 21 wherein updating the performance model comprises:
for each stream of the streams of metric data,
determining if the stream of the metric data is a seasonal stream of metric data;
if the stream of metric data is a seasonal stream of metric data, computing a principal frequency of the stream of metric data based on new metric values in a current time window; and
computing an absolute difference between the principal frequency in the current time window and a principal frequency in a previous time window.

26. The medium of claim 19 wherein performing anomaly detection to detect changes in one or more of the streams of metric data based on the updated performance model comprises:
- determining a threshold based on the performance model; and
- when one or more streams of the metric data violates the threshold, identifying the resource as in the graphical user interface exhibiting anomalous behavior.

27. The medium of claim 19 wherein performing log message analysis on the log messages comprises:
- determining an event type for each log message;
- computed a relative frequency of each event type generated in the time frame; and
- generating the alert when the relative frequency of one of the event types is greater than an associated relative frequency threshold.

* * * * *